(12) United States Patent
Chiga et al.

(10) Patent No.: US 12,201,582 B2
(45) Date of Patent: Jan. 21, 2025

(54) SYSTEM, METHOD, AND DEVICE UTILIZING REVERSIBLE CONNECTOR

(71) Applicant: KPR U.S., LLC, Mansfield, MA (US)

(72) Inventors: Bradley Chiga, Brookline, MA (US); Vinit Patel, Milford, MA (US); Phillip Shaltis, Sharon, MA (US)

(73) Assignee: KPR U.S., LLC, Mansfield, MA (US)

( * ) Notice: Subject to any disclaimer, the term of this patent is extended or adjusted under 35 U.S.C. 154(b) by 636 days.

(21) Appl. No.: 17/328,846

(22) Filed: May 24, 2021

(65) Prior Publication Data
US 2021/0361522 A1 Nov. 25, 2021

Related U.S. Application Data

(60) Provisional application No. 63/028,819, filed on May 22, 2020.

(51) Int. Cl.
*A61H 9/00* (2006.01)
*F16L 37/56* (2006.01)
(Continued)

(52) U.S. Cl.
CPC ............ *A61H 9/0092* (2013.01); *F16L 37/56* (2013.01); *F16L 39/02* (2013.01);
(Continued)

(58) Field of Classification Search
CPC ............ A61H 9/0092; A61H 2201/164; A61H 2201/165; A61H 2201/5071; A61H 9/005; A61H 9/0078; A61H 2201/0103; A61H 2201/0153; A61H 2201/1238; A61H 2201/1635; A61H 2201/1645; A61H 2201/168; A61H 2201/5056;
(Continued)

(56) References Cited

U.S. PATENT DOCUMENTS

| 418,408 | A | * | 12/1889 | Graver | .................... F16L 37/56 137/614.04 |
| 2,200,082 | A | * | 5/1940 | Guarnaschelli | ......... F16L 39/02 166/275 |

(Continued)

FOREIGN PATENT DOCUMENTS

| CN | 1918422 B | 12/2011 |
| CN | 205298920 U | 6/2016 |

(Continued)

*Primary Examiner* — Justine R Yu
*Assistant Examiner* — Christopher E Miller
(74) *Attorney, Agent, or Firm* — ArentFox Schiff LLP

(57) ABSTRACT

A compression garment that is selectively engageable and operable by a controller for inflation via a reversible connector, the compression garment comprising a plurality of bladders and compression garment tubing. The compression garment tubing includes a plurality of garment tubes in fluid communication with the plurality of bladders at a first compression garment tubing end and includes a second compression garment tubing end opposite the first compression garment tubing end. The reversible connector has a first connector portion and second connector portion, the first connector portion and the second connector portion being selectively reversibly connectable together to form the reversible connector.

34 Claims, 41 Drawing Sheets

(51) Int. Cl.
*F16L 39/00* (2006.01)
*F16L 39/02* (2006.01)
*F16L 37/12* (2006.01)

(52) U.S. Cl.
CPC .............. *A61H 2201/164* (2013.01); *A61H 2201/165* (2013.01); *A61H 2201/5071* (2013.01); *F16L 37/12* (2013.01)

(58) Field of Classification Search
CPC ............ A61H 2205/06; A61H 2205/10; A61H 9/00; F16L 39/02; F16L 37/565; F16L 37/56; F16L 39/00
USPC .............. 601/151; 137/614–614.6, 594, 595; 251/149.1–149.6
See application file for complete search history.

(56) References Cited

U.S. PATENT DOCUMENTS

| | | | | |
|---|---|---|---|---|
| 2,359,648 | A * | 10/1944 | Jones | F16L 29/04 251/149.4 |
| 2,438,679 | A * | 3/1948 | Parker | F16L 39/00 285/124.2 |
| 2,818,853 | A * | 1/1958 | Huxley, III | A61H 9/0078 601/44 |
| 3,323,585 | A * | 6/1967 | Cannon | F28D 7/022 29/890.036 |
| 3,640,552 | A * | 2/1972 | Demler, Sr. | F16L 37/252 285/124.5 |
| 4,106,796 | A * | 8/1978 | Asztalos | F16L 59/185 285/123.12 |
| 4,478,436 | A * | 10/1984 | Hashimoto | F16L 39/02 277/615 |
| 4,754,993 | A * | 7/1988 | Kraynick | F16L 37/56 285/915 |
| 4,758,023 | A * | 7/1988 | Vermillion | F16L 11/111 285/903 |
| 4,966,396 | A * | 10/1990 | Dye | A61H 9/0078 D24/129 |
| 5,219,185 | A * | 6/1993 | Oddenino | F02M 37/0052 285/305 |
| 5,401,064 | A * | 3/1995 | Guest | F16L 37/0926 285/123.1 |
| D358,216 | S * | 5/1995 | Dye | D24/206 |
| 6,062,244 | A * | 5/2000 | Arkans | F16K 15/147 137/594 |
| 6,682,102 | B1 * | 1/2004 | Betz | F16L 39/005 285/123.1 |
| 6,692,037 | B1 * | 2/2004 | Lin | F16L 11/22 285/124.1 |
| 7,191,798 | B2 * | 3/2007 | Edelman | A61M 39/223 251/149.6 |
| 7,658,205 | B1 * | 2/2010 | Edelman | A61M 39/1011 251/149.6 |
| 8,425,579 | B1 * | 4/2013 | Edelman | A61F 5/0123 607/104 |
| 9,526,886 | B2 * | 12/2016 | Mastri | A61M 39/105 |
| 11,293,576 | B2 * | 4/2022 | Shih | F16L 37/56 |
| 2004/0068310 | A1 * | 4/2004 | Edelman | A61F 7/02 607/104 |
| 2004/0244848 | A1 * | 12/2004 | Maldavs | F16L 37/35 137/614.04 |
| 2007/0241560 | A1 * | 10/2007 | Malone | F16L 9/19 285/123.3 |
| 2008/0264413 | A1 * | 10/2008 | Doherty | A61M 16/0825 128/202.27 |
| 2008/0287843 | A1 * | 11/2008 | Mros | A61M 39/12 601/152 |
| 2009/0240178 | A1 * | 9/2009 | Hanlon | F16L 37/098 601/151 |
| 2010/0100017 | A1 * | 4/2010 | Maguina | A61H 9/0078 601/151 |
| 2011/0224589 | A1 * | 9/2011 | Bock | A61H 9/0078 601/152 |
| 2011/0225988 | A1 * | 9/2011 | Baust | F16L 13/103 62/50.7 |
| 2014/0171855 | A1 * | 6/2014 | Mastri | A61M 39/1011 604/26 |
| 2015/0057585 | A1 * | 2/2015 | Ladd | A61H 9/0078 601/149 |
| 2015/0216760 | A1 | 8/2015 | Adams et al. | |
| 2015/0320962 | A1 | 11/2015 | Bafile et al. | |
| 2017/0050011 | A1 * | 2/2017 | Zergiebel | A61M 39/105 |
| 2017/0350548 | A1 * | 12/2017 | Tiberghien | F16L 37/34 |
| 2019/0143093 | A1 | 5/2019 | Zumbrum et al. | |
| 2021/0360821 | A1 * | 11/2021 | Gao | H05K 7/20254 |
| 2022/0065379 | A1 * | 3/2022 | Shih | A61H 9/0078 |

FOREIGN PATENT DOCUMENTS

| | | | |
|---|---|---|---|
| CN | 206299836 U | 7/2017 | |
| CN | 206652084 U | 11/2017 | |
| EP | 3034120 B1 | 6/2018 | |
| JP | 61-130696 A | 6/1986 | |
| JP | H01-119148 A | 5/1989 | |
| JP | H11-19147 A | 1/1999 | |
| JP | H11-19148 A | 1/1999 | |
| JP | H1119148 * | 1/1999 | .............. A61H 7/00 |
| JP | 2007-522889 A | 8/2007 | |
| JP | 2015-536794 A | 12/2015 | |
| WO | WO 2020/102390 A1 | 5/2020 | |

* cited by examiner

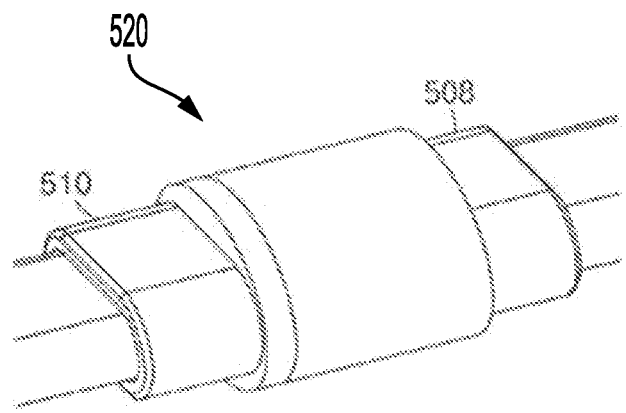
FIG. 5a
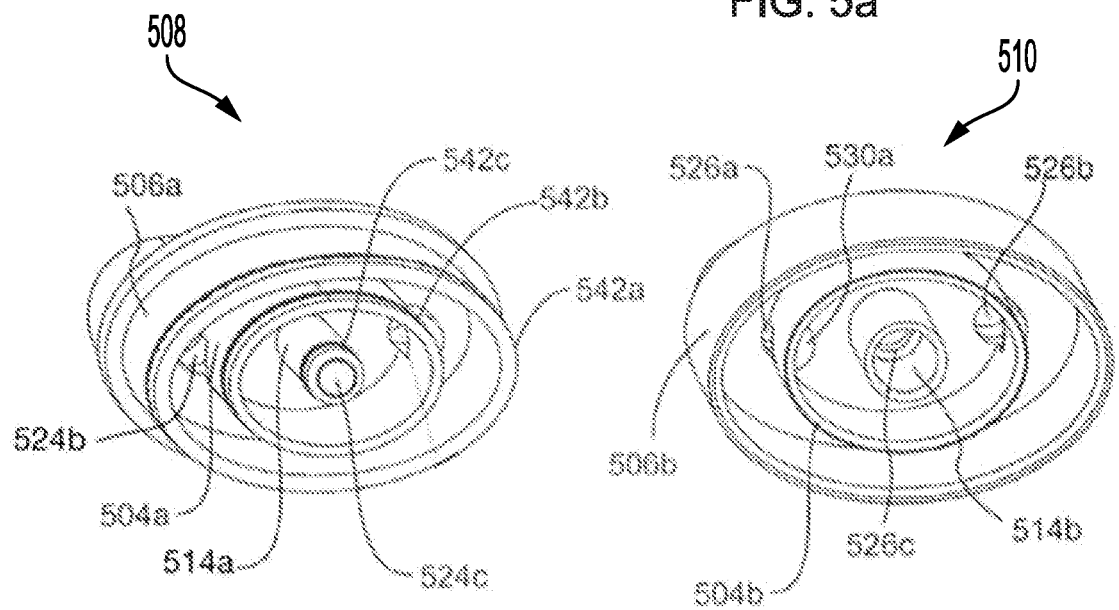
FIG. 5b
FIG. 5c
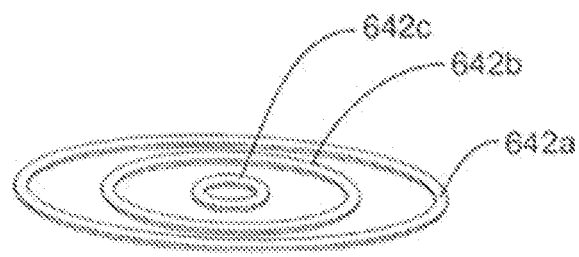
FIG. 6

1608

1608

1610

1610

SYSTEM, METHOD, AND DEVICE UTILIZING REVERSIBLE CONNECTOR

CROSS-REFERENCE TO RELATED APPLICATION

This application claims priority to U.S. Provisional Application No. 63/028,819, filed on May 22, 2020, titled "SYSTEM, METHOD, AND DEVICE UTILIZING REVERSIBLE CONNECTOR." The disclosure of the priority application is hereby incorporated in its entirety by reference.

TECHNICAL FIELD

Aspects of the present disclosure relate to a system, method, and device for inflating a compression garment from a fluid source connected via a reversible connector that provides a single directional fluid flow through multiple fluid channels when the reversible connector is connected in either a first orientation or in a second orientation.

BACKGROUND

Vascular compression systems include a compression garment fluidly connected to a fluid source for cyclically inflating the compression garment when it is worn on a limb of a patient. The cyclical inflation of the compression garment enhances blood circulation and decreases the likelihood of deep vein thrombosis (DVT). A controller controls operation of the fluid source to deliver fluid, e.g., air, to bladders of the compression garment to produce bladder pressure gradient along the compression garment, which moves blood in a desired direction.

In conventional vascular compression systems, the controller provides the fluid, e.g., air, to the compression garment via tubing that may include, for example, three separate tubes. Typically, a connector connects tubing extending from the controller (i.e., controller tubing) and tubing extending from the compression garment (i.e., garment tubing). The garment tubing provides the fluid to multiple bladders (e.g., two, three, four or more) of the compression garment. In the case of three bladders, for example, the three bladders may include a distal bladder positioned around the ankle of the wearer, an intermediate bladder positioned around the calf of the wearer and a proximal bladder positioned around the thigh of the wearer. Due to the close proximity of the three tubes in the tubing, the connector must be appropriately sized to pass the fluid, e.g., air, and limit separation of the three tubes. Typically, the three tubes of the tubing are coupled together in a side by side manner. Conventional connectors used to connect the controller tubing with the garment tubing are only able to connect in a single orientation. In some implementations, the connector is not capable of connecting in more than one orientation or fails to be provide a fluid connection for all three tubes when connected in a second orientation, which could lead to improper functioning of the compression system and/or may cause harm or discomfort to the patient. Thus, there is a need in the art for a connector to connect all tubes (e.g., two, three, four or more) of the controller tubing and the garment tubing in more than one orientation (for example, straight and reverse orientation), while providing fluid flow in a single direction from the fluid source of the controller to the compression garment, regardless of the connection orientation, thereby ensuring proper functioning of the compression system and avoiding the possibility of causing discomfort or harm to the patient.

SUMMARY

Aspects of the present disclosure include a compression garment selectively engageable and operable by a controller for inflation via a reversible connector. The compression garment comprises a plurality of bladders and compression garment tubing including a plurality of garment tubes in fluid communication with the plurality of bladders at a first compression garment tubing end. A second compression garment tubing end is provided opposite the first compression garment tubing end and a first connector portion is located at the second compression garment tubing end. The controller controls communication with a source of fluid flow and comprises controller tubing having a plurality of controller tubes in selective communication with the source of the fluid flow at a first controller tubing end. The controller tubing also includes a second controller tubing end opposite the first controller tubing end and a second connector portion located at the second controller tubing end. The first connector portion of the garment tubing and the second connector portion of the controller tubing are selectively reversibly connectable together to form the reversible connector. A plurality of fluid flow passageways extend within each of the first connector portion and the second connector portion to form a first fluid flow channel when the first connector portion is coupled to the second connector portion in a first orientation. The plurality of fluid flow passageways within the first connector portion and within the second connector portion cooperatively form a second fluid flow channel when the first connector portion is coupled to the second connector portion in a second orientation. A fluid flow between a first one of the plurality of controller tubes and a first one of the plurality of compression garment tubes is communicated in a first fluid flow direction via the first fluid flow channel when the first connector portion and the second connector portion are connected in the first orientation. The fluid flow through the first one of the plurality of compression garment tubes and the first one of the plurality of controller tubes is communicated in the first fluid flow direction via the second fluid flow channel when the first connector portion and the second connector portion are connected in a second orientation.

In another aspect of the present disclosure, a controller is provided that is selectively engageable with a compression garment according to various aspects of the present disclosure.

In another aspect of the present disclosure, a system is provided for applying compression treatment to a limb of a patient, wherein the system comprises a compression garment according to various aspects of the present disclosure and wherein the compression garment is engageable and operable by controller according to various aspects of the present disclosure.

In another aspect of the present disclosure, a compression garment, controller and system are provided for applying compression treatment to a limb of a patient, wherein the compression garment includes at least one, and preferably more than one, inflatable bladder configured to apply compression treatment to the limb of the patient.

In another aspect of the present disclosure, a reversible connector is provided for use in a system for applying compression treatment to a limb of a patient, wherein the system comprises a compression garment and a controller selectively engageable with the compression garment via the reversible connector, wherein the compression garment includes at least one, and preferably more than one, inflatable bladder configured to apply compression treatment to the limb of the patient, and wherein the reversible connector is configured to selectively and operably engage the compression garment to the controller regardless of whether the compression garment includes only one, or more than one, inflatable bladder.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5a shows a perspective view of another example of the reversible connector with the first and second connector portions in an engaged position in accordance with aspects of the present disclosure;

FIG. 5b shows a perspective view of another example of a first connector portion of the reversible connector in accordance with aspects of the present disclosure;

FIG. 5c shows a perspective view of another example of the second connector portion of the reversible connector in accordance with aspects of the present disclosure;

FIG. 6 shows a perspective view of an example of sealing members for the first connector portion of the reversible connector in accordance with aspects of the present disclosure;

DETAILED DESCRIPTION

Various aspects are now described in more detail with reference to the figures. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

The term reversible is used throughout the disclosure as a modifier for a connector or series of connectors. For context, an example of the term reversible connector includes a connector or set of connectors that may be connected in at least two different orientations (e.g., "flipped" or rotated about an axis 180 degrees) without affecting the order of inflation of bladders in a compression garment. The aforementioned example is in contrast to a non-reversible connector, where reversing the connection orientation (e.g., rotating the connector about an axis 180 degrees) affects the order of inflation of the bladders in a compression garment.

Figure 1:
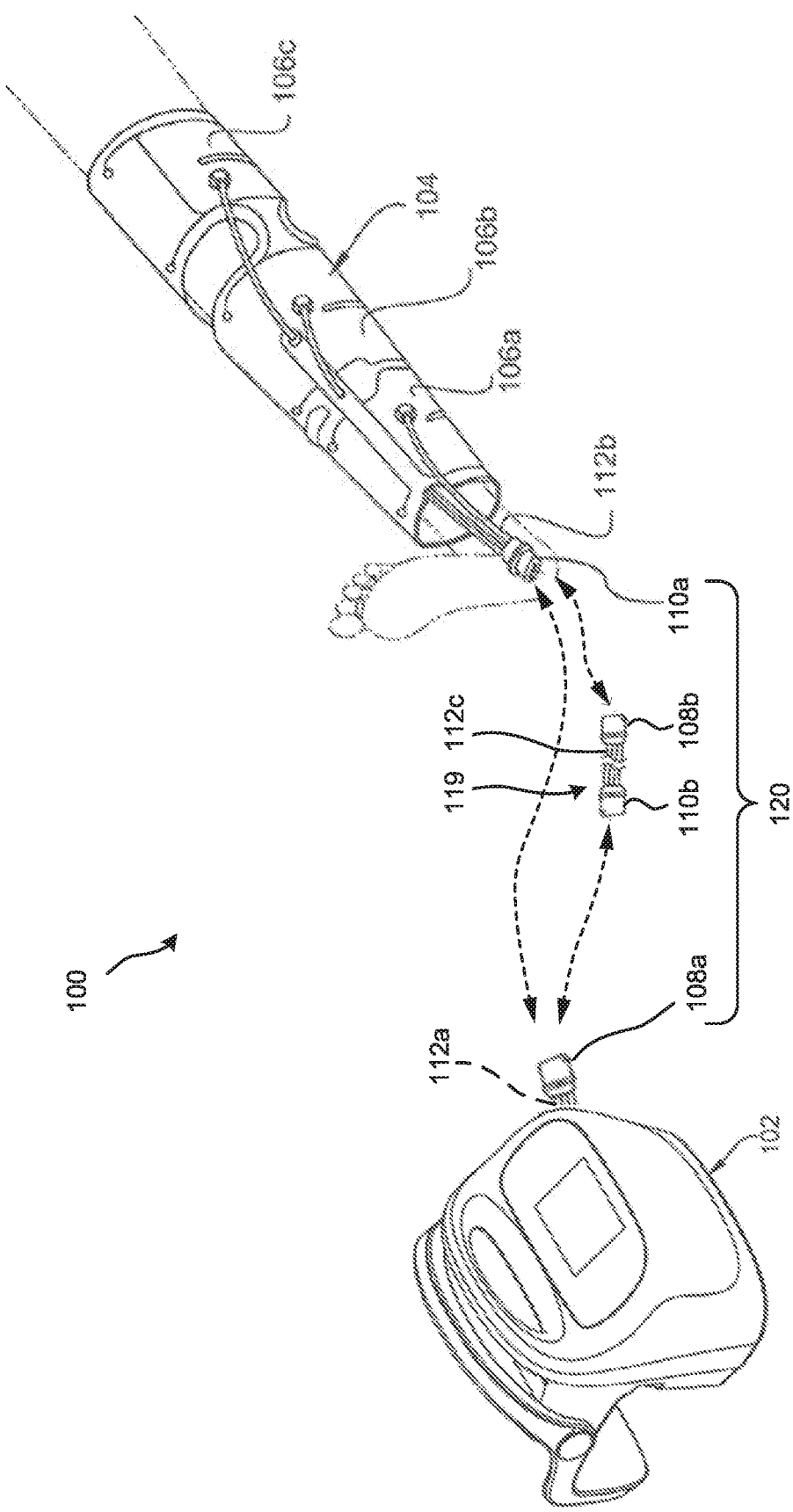
FIG. 1 shows an example perspective view of a compression system including a controller, a reversible connector and a compression garment in accordance with aspects of the present disclosure.

Turning to the figures, where like reference numbers refer to like components, FIG. 1 shows an example compression system 100, various features of which are usable in accordance with aspects of the present disclosure, the compression system 100 including a controller 102 (also interchangeably referred to as a monitor), a compression garment 104, and one or more reversible connector(s) 120. As shown in FIG. 1, the compression garment 104 may be connected to controller 102 by either directly connecting a sleeve side reversible second connector portion 110a (also interchangeably referred to as sleeve side connection portion, second connector portion, compression garment side second connector portion and/or sleeve side reversible connector portion) to a controller side reversible first connector portion 108a (also interchangeably referred to as first connector portion, controller side first connection portion, and/or monitor side first connector portion) or by connecting the two aforementioned connector portions with an extension or adapter 119. The extension or adapter 119 may provide additional distance between the controller 102 and the compression garment 104 and/or adapt a different connector (e.g., with different engagement features of fluid passage configuration) to either one or both of the controller 102 and/or compression garment 104. Throughout the disclosure the terms adapter and extension may be used interchangeably. In one example, the adapter or extension 119 may for example include a first reversible connector portion 108b (also interchangeably referred to as first reversible connection portion or first connector portion) at one end thereof and a second reversible connector portion 110b (also interchangeably referred to as second connector portion) at a second end thereof with connection tubing 112c providing a fluid connection between the two connector portions. The first reversible connector portion 108b and second reversible connector portion 110b may for example be similar to the controller side reversible first connector portion 108a and the sleeve side reversible second connector portion 110a, respectively. Further, while specific examples of the connection of the compression garment 104, controller 102, and/or the adapter 119 are shown, one of ordinary skill in the art would understand that any of the connector portions or connection features described throughout the specification may be used in any known method or configuration of connecting a controller 102 to a compression garment 104. Further, any one or a combination of the controller side reversible first connector portion 108a, the sleeve side reversible second connector portion 110a, the first reversible connector portion 108b and/or second reversible connector portion 110b may be interchangeably referred to simply as a first connector portion or second connector portion throughout the disclosure.

FIG. 1 shows one example of a first connector portion 108a and second connector portion 110a shown in an uncoupled configuration and a compression garment 104. The compression garment 104 is configured to apply sequential compression therapy to a limb of a wearer, for instance, a medical patient requiring compression treatment, and a controller 102 having one or more processors and/or a pump or fluid source and configured to control operation of the compression garment 104. The compression garment 104 may include multiple bladders capable of containing fluid such as air. For example, the compression garment 104 may include a distal inflatable bladder 106a, an intermediate inflatable bladder 106b, and a proximal inflatable bladder 106c. While three bladders are referenced herein, it will be apparent that fewer or more bladders may be used, such as one, two or four, for example, and as will be described in greater detail below, the reversible connector 120 according to various aspects of the present disclosure is configured to operatively engage and couple the compression garment 104 to the controller 102 regardless of whether the compression garment includes only one inflatable bladder 106a, 106b, 106c, or more than one inflatable bladder 106a, 106b, 106c. The compression garment 104 may be secured (e.g., using hook and loop fasteners or ties, among other types of securing mechanisms) around a limb of the wearer and may be adjustable to fit around limbs of different sizes/circumferences.

In some aspects, the controller 102 may include a pump or other fluid source and control operation of the compression garment 104 to perform a compression cycle, in which the inflatable bladders 106a, 106b, 106c are inflated to apply pressure to the limb of the wearer to establish a pressure gradient applied to the limb by controlling the fluid within inflatable bladders 106a, 106b, 106c of the compression garment 104 during one or more compression cycles. For the purpose of describing example operation of the compression system 100, each compression cycle may be followed by a vent cycle, in which the pressure in each of the inflatable bladders 106a, 106b, 106c is released. Together, the compression cycle and vent cycle form one complete therapeutic cycle of the compression system 100. The compression system 100 may measure the pressure gradient applied by the inflatable bladders 106a, 106b, 106c and may make adjustments based on this measured pressure gradient. In some aspects, the compression system 100 may not measure a pressure gradient and/or may not adjust a pressure gradient based on the measurements during operation of the compression system 100. Rather, the compression system 100 may inflate and/or deflate the bladders of the compression garment 104.

The compression garment 104 may be a thigh-length sleeve positionable around the leg of the wearer, with the distal inflatable bladder 106a positionable around the ankle of the wearer, the intermediate inflatable bladder 106b positionable around the calf of the wearer, and the proximal inflatable bladder 106c positionable around the thigh of the wearer. The inflatable bladders 106a, 106b, 106c may expand and contract under the influence of fluid (e.g., air or other fluids) delivered from a pressurized fluid source via the controller 102. The controller 102 may deliver the pressurized fluid from the fluid source to the inflatable bladders 106a, 106b, 106c. The pressurized fluid source may deliver the pressurized fluid to the inflatable bladders 106a, 106b, 106c through the controller side reversible first connector portion 108a, which may be either connected to the controller 102 via controller tubing 112a and/or form a portion of the controller body (e.g., as described in FIGS. 9q-9s), reversible connector 120 and compression garment tubing 112b. As explained below in further detail, the reversible connector 120 may include a monitor side first connector portion 108a and a compression garment side second connector portion 110a and/or may include adapter 119 with a first reversible connector portion 108b, second reversible connector portion 110b and connection tubing 112c. The first connector portion 108a may be coupled with an end of the controller tubing 112a (with the other end coupled with the controller 102) and the second connector portion 110a may be coupled with an end of the compression garment tubing 112b (with the other end coupled with the compression garment 104). While FIG. 1 shows only a single first connector portion 108a and second connector portion 110a, aspects of the disclosure are usable with extension tube-sets (e.g., a length of tubing with connectors on either end) and/or adapter(s) (e.g., a length of tubing with a first type of connector on a first end and a second type of connector on a second end). Some non-limiting examples of adapters are described with respect to FIGS. 17 and 18, below. In addition, while hidden from view in FIG. 1, any one or a combination of the connectors described herein may be used to provide a controller-side connection between controller 102, and any one or a combination of an adapter, an extension tube-set, and/or a compression garment 104. Some examples of controller side connections are described in further detail below with respect to FIGS. 9q-9s.

Figure 2A:
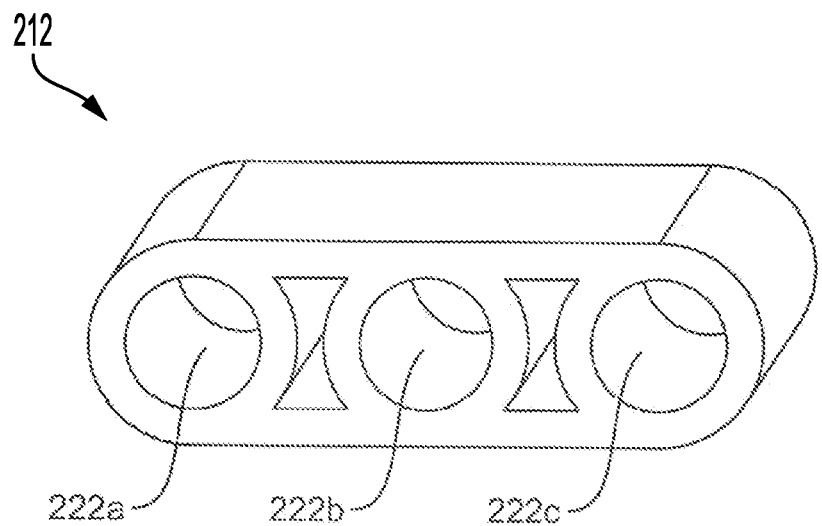
FIG. 2a shows a perspective view of a section of an example tubing between a fluid source of a controller and a compression garment or compression sleeve in accordance with aspects of the present disclosure.

FIG. 2a shows a section of an example tubing 212 that may be utilized between a fluid source controlled by a controller and a compression sleeve in accordance with aspects of the present disclosure. The tubing 212 may be analogous to the controller tubing 112a and the compression garment tubing 112b shown in FIG. 1 in an uncoupled configuration, and may include three separate tubes or tubing passages or conduits 222a, 222b, 222c (such tubes, passages, or conduits interchangeably referred to herein as "tubes"), a separate tube for each of the inflatable bladders 106a, 106b, 106c of the compression garment 104 shown in FIG. 1. In some aspects, the tubing 212 may be smooth tubing having, e.g., three separate tubes 222a, 222b, 222c housed within tubing 212 formed as a single piece. In other aspects, tubing 212 may comprise three separate tubes 222a, 222b, and 222c, each formed as a separate piece. The tubing 212 may be flexible. The tubing 212 may be made of poly-vinyl chloride (PVC), polyurethane, or any suitable material to deliver fluid to a compression garment 104, shown in FIG. 1. As will be described in greater detail below, a reversible connector 120 according to various aspects of the present disclosure is configured to operatively engage and couple the compression garment 104 to the controller 102 regardless of whether the tubing 212 includes three separate tubes 222a, 222b, 222c, as shown in FIG. 2, or more/less separate tubes 222a, 222b, 222c, for instance, a single tube (not shown), two tubes (not shown) or more than three tubes (not shown).

Figure 2B:
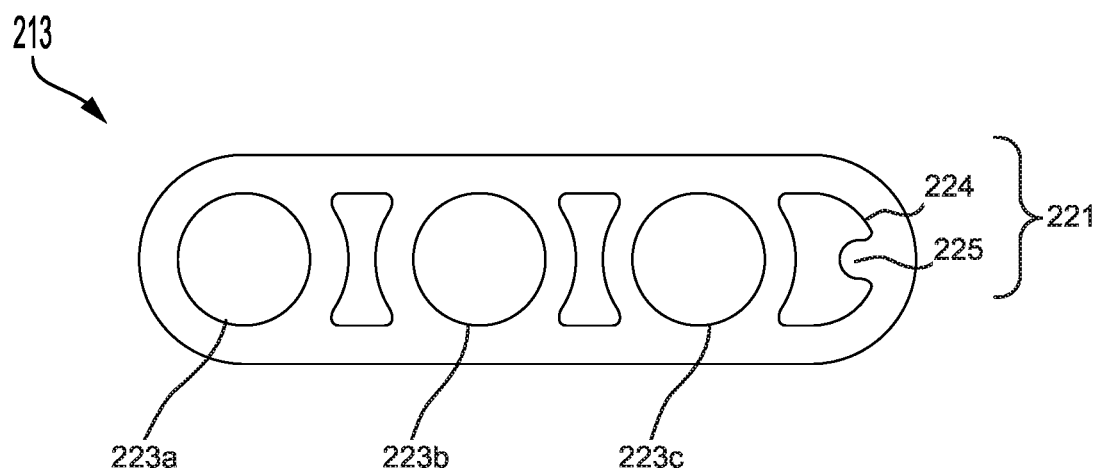
FIG. 2b shows a cross-section of one example implementing of tubing between a fluid source of a controller and a compression garment or compression sleeve in accordance with aspects of the present disclosure.

FIG. 2b shows a cross section of another example implementation of tubing 213 that may be utilized between a fluid source controlled by a controller and a compression garment in accordance with aspects of the present disclosure. Either one or any combination of the tubing profiles shown in FIG. 2a and/or 2b may be implemented to create a fluid path between each of the connectors and/or the compression garment/sleeve (e.g., compression garment/sleeve 104 in FIG. 1) and/or a controller (e.g., controller 102 in FIG. 1). For example, the tubing 212 may be used as the controller tubing 112a and the compression garment tubing 112b shown in FIG. 1. The tubing 213 may be flexible. The tubing 213 may be made of poly-vinyl chloride (PVC), polyurethane, or any suitable material to deliver fluid to a compression garment 104, shown in FIG. 1. In a preferred aspect, the material of tubing 213 may be flexible or semi-flexible while remaining rigid enough to prevent kinking of pinching of the tube (and thus blocking fluid flow). The tubing 213 may include three separate tubes or tubing passages or conduits 223a, 223b, 223c, which may correspond with and create a fluid path between the controller (e.g., controller 102 in FIG. 1) and the three inflatable bladders 106a, 106b and 106c of the compression garment 104. While three tubes or tubing passages or conduits 223a, 223b, and 223c are shown and three bladders are provided as an example, aspects of the disclosure may include more or less passages that correspond with the number of inflatable bladders. For example, the tubing may include two passages that provide fluid communication to two bladders or may include more than three passages that provide fluid communication to a corresponding number of bladders. For example, the tubing may include 4-6 passages in one example implementation. In one variation, the tubing 213 that has a profile as shown in FIG. 2b may be create a fluid path between any one of or a combination of: the connectors described throughout the disclosure, the compression garment 104 and/or the controller 102, for example. In some aspects, the tubing 212 may be similar to the tubing described above with respect to FIG. 2a, but may also include an additional alignment section 221. The alignment portion may for example include an additional passage or alignment feature that comprises a first alignment portion 224 and a second alignment portion 225. One function of the alignment section 221 may be to ensure that the tubing 213 is installed in the correct orientation (e.g., not "flipped") with respect to any one of the connectors described throughout this disclosure. One example implementation of the alignment section 221 and interaction of the alignment section 221 with a corresponding portion of a connector (e.g., during assembly of the tubing with a connector) is described below with respect to FIGS. 10 and 11.

Figure 3A:
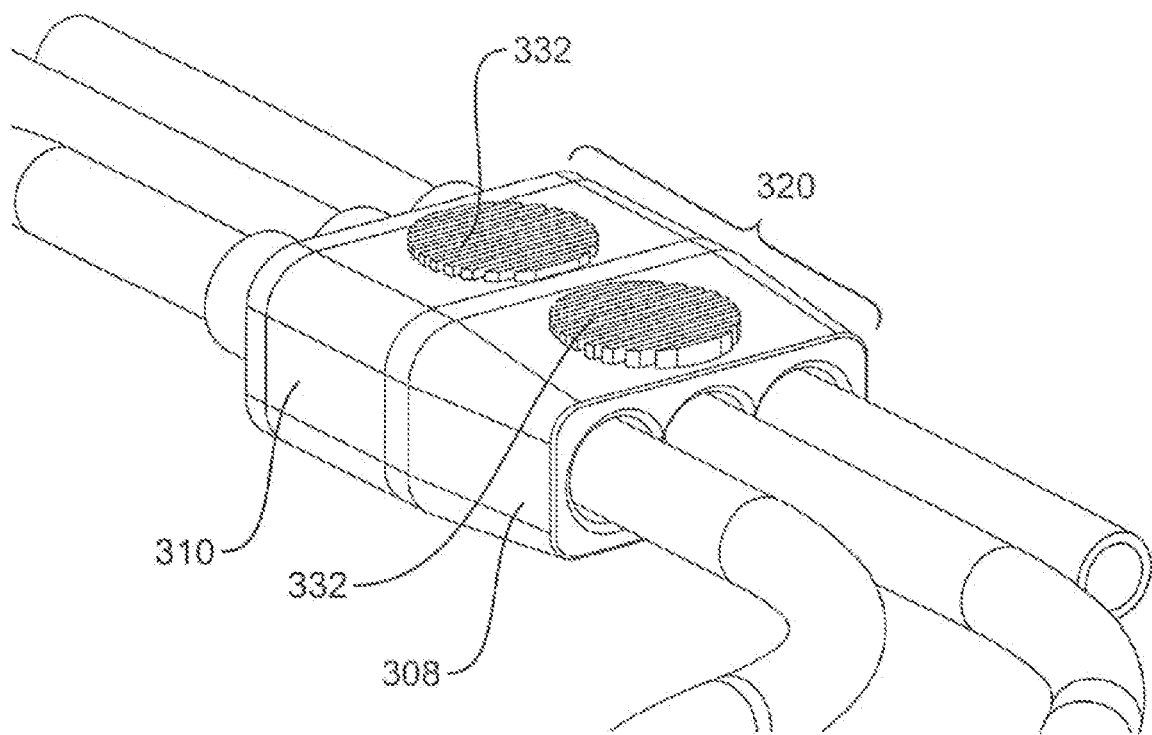
FIG. 3a shows a perspective view of an example reversible connector with the first and second connector portions in an engaged configuration, in accordance with aspects of the present disclosure.

FIG. 3a shows an example reversible connector 320 having first connector portion 308 and second connector portion 310 (also interchangeably referred to herein as "connector components" or "connector portions") in a connected configuration (such connected configuration also interchangeably referred to herein as an "engaged" or "coupled" configuration), in accordance with aspects of the present disclosure. First connector portion 308 and second connector portion 310 may be analogous to first connector portion 108a and second connector portion 110a shown in FIG. 1. It will be recognized that first connector portion 308 and second connector portion 310 may be connected via different types of engagement features, including features to provide slidable engagement, compression fit, snap fit, and magnetic engagement, among other types of engagement. Additional examples of engagement features are described below with respect to FIGS. 5-9s, 12a-13b, and 15a-15b.

Figure 3B:
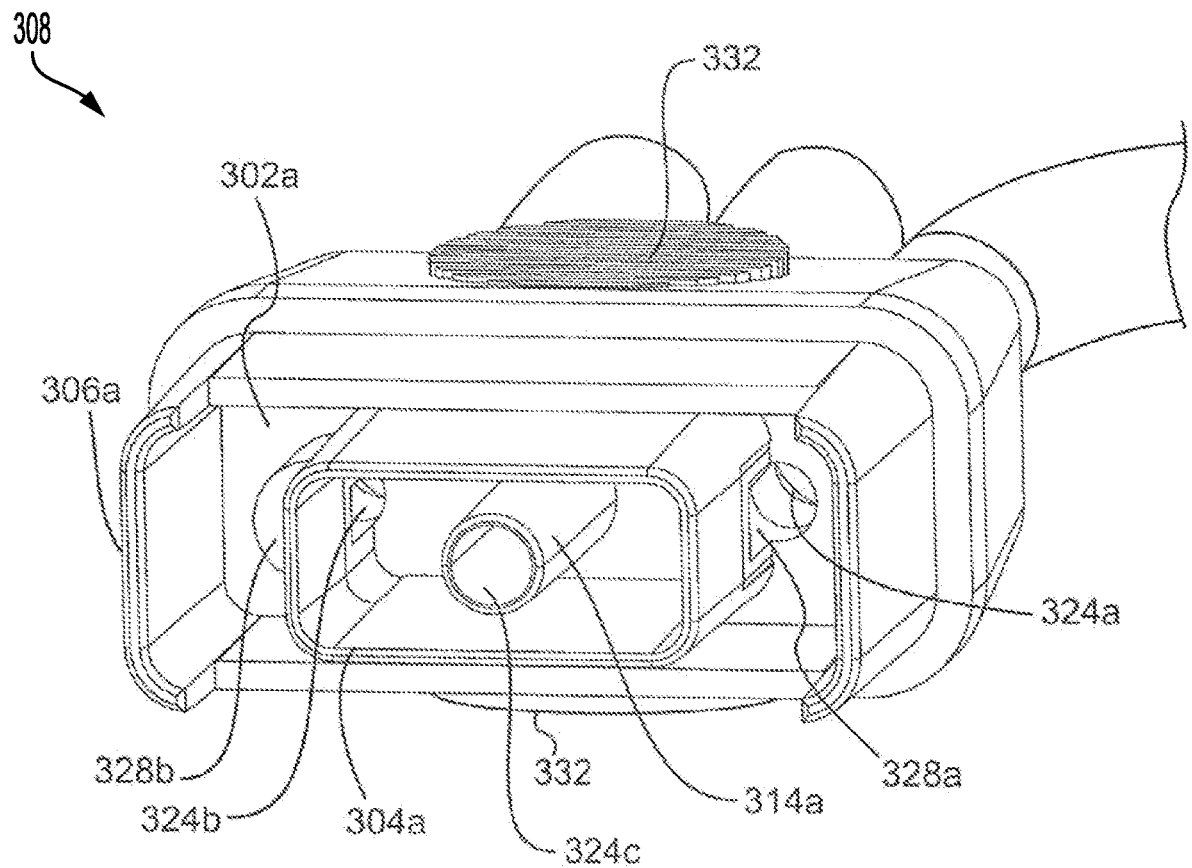
FIG. 3b shows a perspective view of an example first connector portion of the reversible connector in accordance with aspects of the present disclosure.

As shown in FIG. 3b, the first connector portion 308 may include an outer concentric wall 306a, an intermediate concentric wall 304a and an inner concentric wall 314a. The inner concentric wall 314a may be positioned within the intermediate concentric wall 304a, and the intermediate concentric wall 304a may be positioned within the outer concentric wall 306a in the first connector portion 308.

Figure 3C:
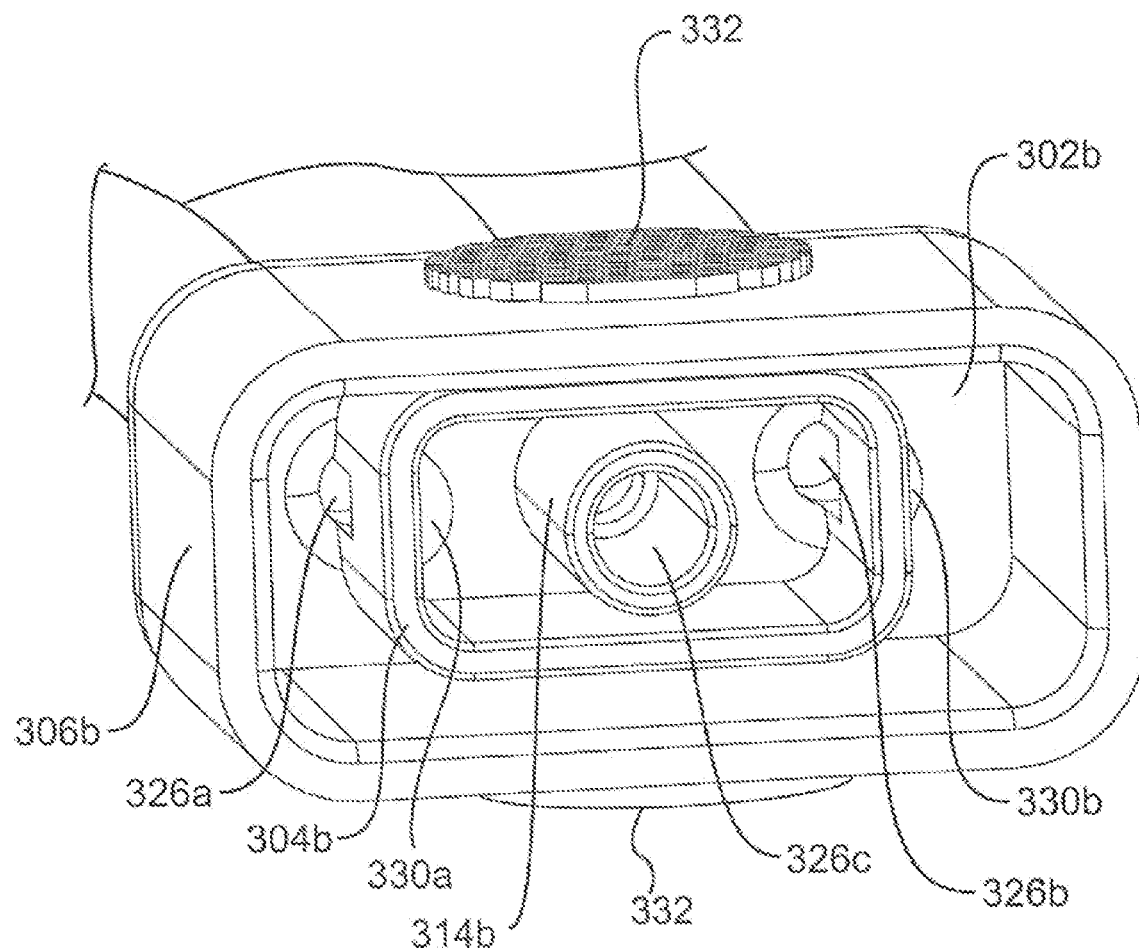
FIG. 3c shows a perspective view of an example second connector portion of the reversible connector in accordance with aspects of the present disclosure.

Referring now to FIG. 3c, the second connector portion 310 may include an outer concentric wall 306b, an intermediate concentric wall 304b and an inner concentric wall 314b. The inner concentric wall 314b may be positioned within the intermediate concentric wall 304b and the intermediate concentric wall 304b may be positioned within the outer concentric wall 306b of the second connector portion 310.

In some aspects, the outer concentric wall 306a, the intermediate concentric wall 304a and the inner concentric wall 314a of the first connector portion 308 shown in FIG. 3b may be adapted (i.e., sized) to engage with the outer concentric wall 306b, the intermediate concentric wall 304b and the inner concentric wall 314b of the second connector portion 310 shown in FIG. 3c to form the reversible connector 320 in an engaged configuration, as illustrated in FIG. 3a. For example, the outer concentric wall 306a of the first connector portion 308 may engage inside the outer concentric wall 306b of the second connector portion 310, the intermediate concentric wall 304a of the first connector portion 308 may engage inside the intermediate concentric wall 304b of the second connector portion 310, and the inner concentric wall 314a of the first connector portion 308 may engage inside the inner concentric wall 314b of the second connector portion 310, when the first connector portion 308 is engaged with the second connector portion 310 to form the reversible connector 320 in an engaged configuration, as shown in FIG. 3c.

In some aspects, all of the concentric walls of the first connector portion 308 may be adapted such that each of the concentric walls of the first connector portion 308, i.e., the outer concentric wall 306a, the intermediate concentric wall 304a and the inner concentric wall 314a, engage inside the corresponding walls of the second connector portion 310, i.e., the outer concentric wall 306b, the intermediate concentric wall 304b and the inner concentric wall 314b. In such aspects of the disclosure, the first connector portion 308 may be a male connector portion and the second connector portion 310 may be a female connector portion.

In some aspects, one or more of the outer concentric wall 306a, the intermediate concentric wall 304a and the inner concentric wall 314a of the first connector portion 308 and corresponding concentric walls, i.e., outer concentric wall 306b, the intermediate concentric wall 304b and the inner concentric wall 314b of the second connector portion 310, may be adapted such that the one or more of the outer concentric wall 306a, the intermediate concentric wall 304a and the inner concentric wall 314a of the first connector portion 308 engage over the corresponding concentric walls, i.e., outer concentric wall 306b, the intermediate concentric wall 304b and the inner concentric wall 314b, of the second connector portion 310. In such aspects of the disclosure, there may be no male connector portion or female connector portion.

It should be noted that while FIGS. 3a and 3b show the outer concentric walls 306a and 306b and the intermediate concentric walls 304a and 304b of the first connector portion 308 and the second connector portion 310 as rectangular, and the inner concentric walls 314a and 314b of the first connector portion 308 and the second connector portion 310 as circular in shape, aspects of the present disclosure are not limited to such a configuration as described in greater detail herein (e.g., all walls may be rectangular, square, elliptical or circular).

Figure 4A:
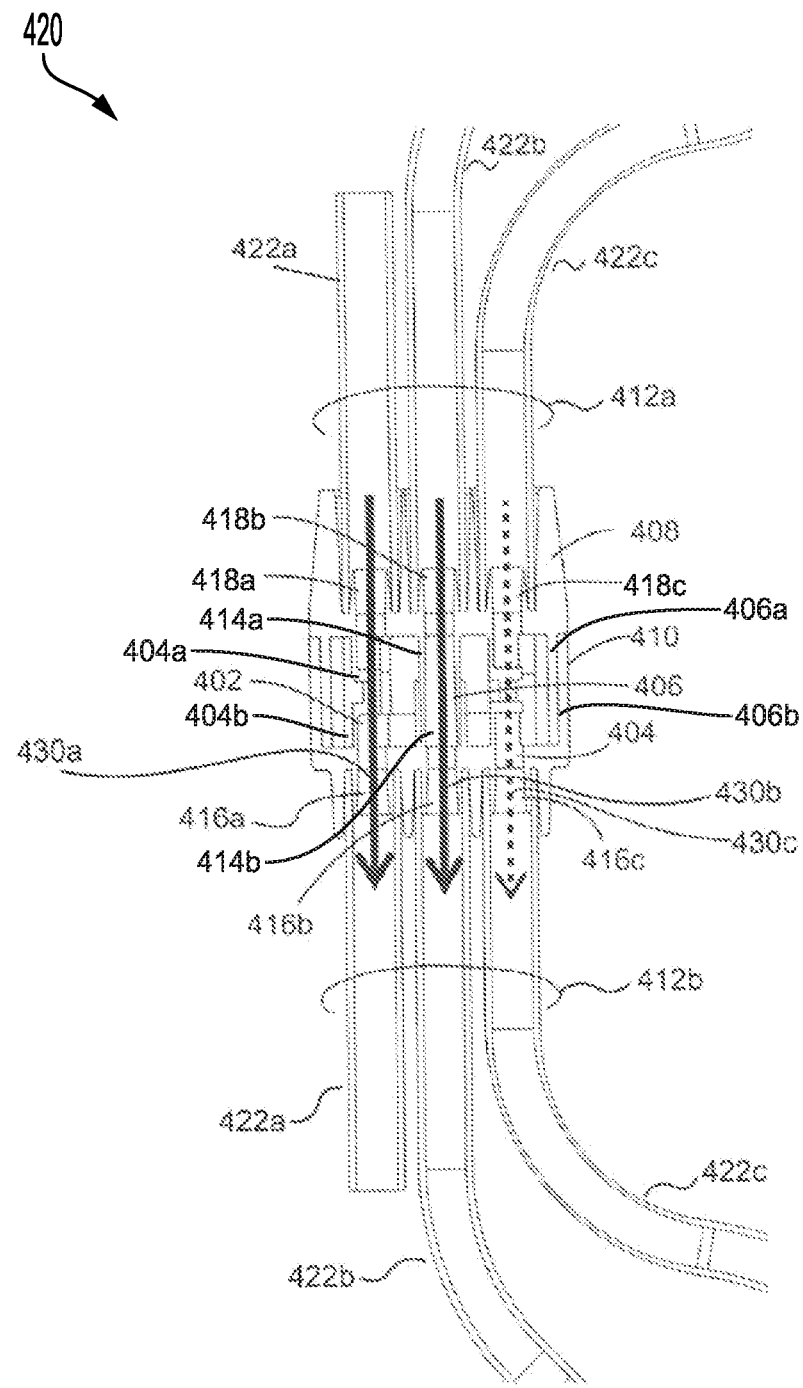
FIG. 4a shows an example top down cross-section view of the reversible connector with the first and second portions in an engaged position in a first orientation defining a first configuration of mutually cooperating first and second fluid flow connection channels showing the direction of the fluid flow from the fluid source of the controller to the compression garment, in accordance with aspects of the present disclosure.
Figure 4B:
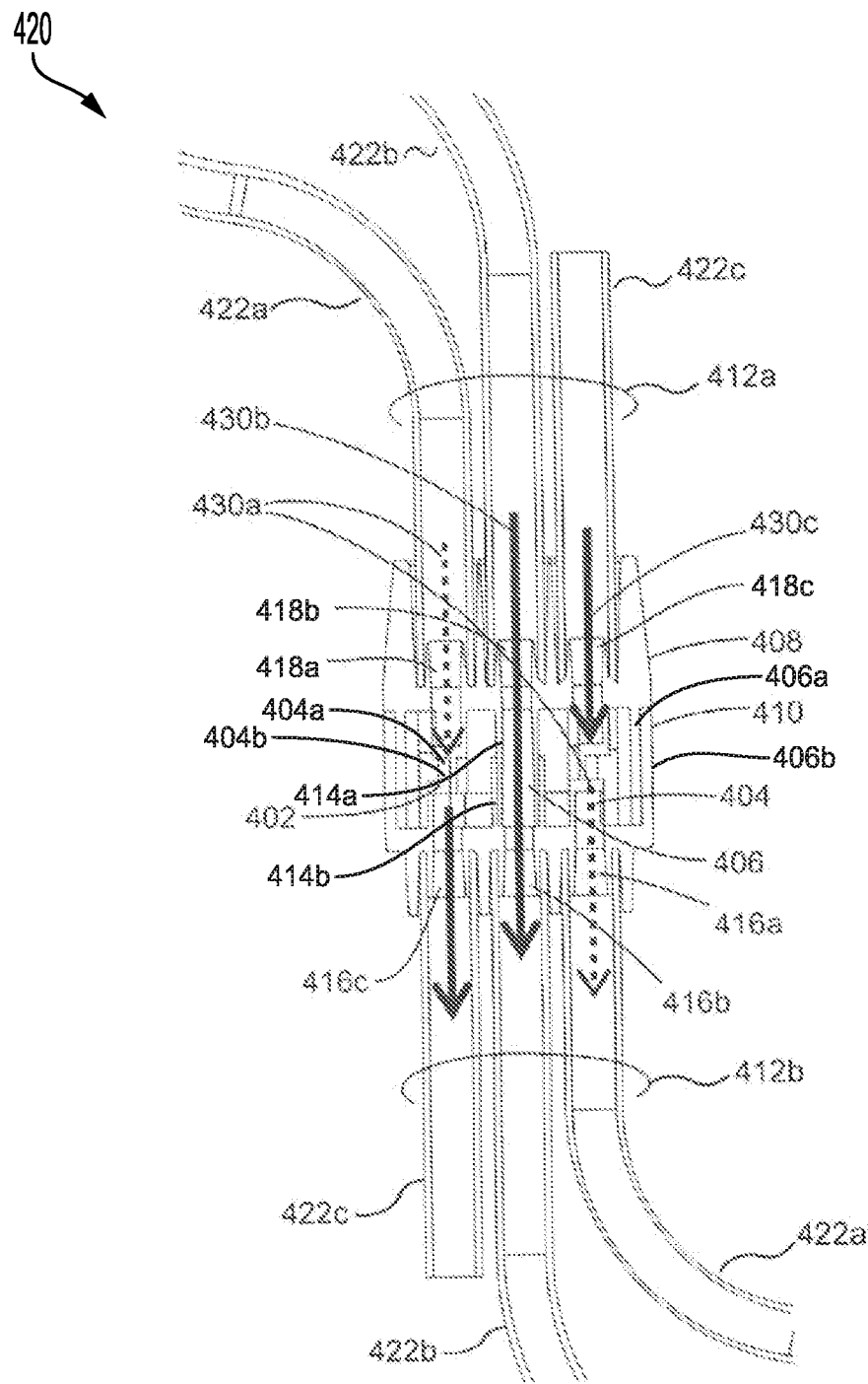
FIG. 4b shows an example top down cross-section view of the reversible connector with the first and second portions in an engaged position in a second orientation defining a second configuration of mutually cooperating first and second fluid flow connection channels showing the direction of the fluid flow from the fluid source of the controller to the compression garment, in accordance with aspects of the present disclosure.

Referring again to FIGS. 3a and 3b, each of the outer concentric wall 306a, the intermediate concentric wall 304a and the inner concentric wall 314a of the first connector portion 308 may extend from a base 302a of the first connector portion 308. Each of the outer concentric wall 306b, the intermediate concentric wall 304b and the inner concentric wall 314b of the second connector portion 310 may extend from a base 302b of the second connector portion 310. The height of the concentric walls, i.e., how far the concentric walls extend away from the base 302a, 302b, may be appropriately sized to form corresponding chambers 402, 404, 406 (as illustrated in FIGS. 4a and 4b) for each of the concentric walls when the first connector portion 308 is engaged or connected (e.g., via slidable engagement, compression fit, snap fit, and magnetic engagement, among other types of engagement means) with the second connector portion 310. For example, when the first connector portion 308 is slidably engaged with the second connector portion 310, the outer concentric wall 306a of the first connector portion 308 and the outer concentric wall 306b of the second connector portion 310 form a chamber 402 (shown in FIGS. 4a and 4b) to allow fluid, e.g., air, to pass from the first to the second connector portions. In another example, when the first connector portion 308 is slidably engaged with the second connector portion 310, the intermediate concentric wall 304a of the first connector portion 308 and the intermediate concentric wall 304b of the second connector portion 310 form a chamber 404 (shown in FIGS. 4a and 4b) to allow fluid, e.g., air, to pass from the first to the second connector portions. In yet another example, when the first connector portion 308 is slidably engaged with the second connector portion 310, the inner concentric wall 314a of the first connector portion 308 and the inner concentric wall 314b of the second connector portion 310 form a chamber 406 (shown in FIGS. 4a and 4b) to allow fluid, e.g., air, to pass from the first to the second connector portions. The height of the concentric walls may be sized such that the formed chambers 402, 404, 406 fluidly connect the first connector portion 308 with the second connector portion 310 with each of the formed chambers 402, 404, 406 (shown in FIGS. 4a and 4b) providing a seal that prevents little or no leakage of fluid, thereby forming a mutually cooperating fluid flow connection channel.

In some aspects, the height of the outer concentric wall 306a of the first connector portion 308 may be variable (i.e., outer concentric wall 306a may be comprised of wall subsections of different heights). As shown in FIG. 3b, for example, the height of the longer sides of the outer concentric wall 306a may be less than the height of the shorter sides of the outer concentric wall 306a. In some aspects, the height of the longer sides of the outer concentric wall 306a may be greater than the height of the shorter sides of the outer concentric wall 306a. The difference in height of the longer sides and the shorter sides may allow more flexibility when the first connector portion 308 is engaged with the second connector portion 310 to form the reversible connector 320 in an engaged configuration.

Referring again to FIGS. 3a and 3b, in the first connector portion 308, a fluid flow passageway 324a may be formed in the intermediate concentric wall 304a, a fluid flow passageway 324b may be formed in the intermediate concentric wall 304a and a fluid flow passageway 324c may be formed by the inner concentric wall 314a. In the second connector portion 310, a fluid flow passageway 326a may be formed in the intermediate concentric wall 304b, a fluid flow passageway 326b may be formed in the intermediate concentric wall 304b and a fluid flow passageway may be formed by the inner concentric wall 314b. One or more of the fluid flow passageways 324a, 324b formed in the intermediate concentric wall 304a of the first connector portion 308 and/or one or more of the fluid flow passageways 326a, 326b formed in the intermediate concentric wall 304b of the second connector portion 310 may include a bump out 328a, 328b, 330a, 330b to direct or reflect the fluid, e.g., air, into a corresponding chamber 402, 404 (as shown in FIGS. 4a and 4b), formed by the outer concentric walls 306a, 306b and the intermediate concentric walls 304a, 304b as explained below in more detail.

FIGS. 4a and 4b are top cross-sectioned views of an example of the reversible connector in a first orientation and in a second orientation showing the flow of fluid in each orientation. When the first connector portion 408 is engaged with the second connector portion 410, each of the corresponding concentric walls form the corresponding chambers 402, 404, 406 which allows fluid, e.g., air, to pass from the first connector portion 408 to the second connector portion 410. First connector portion 408 and second connector portion 410 are analogous to first connector portion 108a and second connector portion 110a, and first connector portion 308 and second connector portion 310 shown in FIGS. 1 and 3a-3c. For example, the outer concentric wall 406a of the first connector portion 408 may slide into the outer concentric wall 406b of the second connector portion 410 to form an outer chamber 402. In another example, the intermediate concentric wall 404a of the first connector portion 408 may slide into the intermediate concentric wall 404b of the second connector portion 410 to form an intermediate chamber 404. In yet another example, the inner concentric wall 414a of the first connector portion 408 may slide into the inner concentric wall 414b of the second connector portion 310 to form an inner chamber 406. Outer concentric walls 406a and 406b, intermediate concentric walls 404a and 404b, and inner concentric walls 414a and 414b of the first connector portion 408 and second connector portion 410 are analogous to the outer concentric walls 306a and 306b, intermediate concentric walls 304a and 304b, and inner concentric walls 314a and 314b of the first and second connector portions 308 and 310 shown in FIGS. 3b and 3c.

In a first orientation of the reversible connector 420 (analogous to reversible connector 120 and reversible connector 320 shown in FIGS. 1 and 3a), as illustrated in FIG. 4a the outer chamber 402 may be formed by fluid flow passageways 324a, 326a shown in FIGS. 3b and 3c substantially aligning with each other, the intermediate chamber 404 may be formed by fluid flow passageways 324b and 326b shown in FIGS. 3b and 3c substantially aligning with each other, and inner chamber 406 may be formed by fluid flow passageways 324c and 326c shown in FIGS. 3b and 3c substantially aligning with each other when the first connector portion 408 is engaged with the second connector portion 410 in the first orientation. As shown in FIGS. 3b and 3c, fluid flow passageways 324a, 326a may be substantially aligned with bump outs 328a, 330a adjacent to each other to form outer chamber 402 (shown in FIG. 4a) and the fluid flow passageways 324b, 326b may be substantially aligned with the bump outs 328b, 330b adjacent to each other to form intermediate chamber 404 (shown in FIG. 4a). Thus, in the first orientation, the reversible connector 420 receives fluid, e.g., air, from the three tubes 422a, 422b, 422c (may be analogous to tubes 222a, 222b, 222c shown in FIGS. 2a and 223a, 223b, 223c in FIG. 2b) of the controller tubing 412a (analogous to controller tubing 112a shown in FIG. 1) and provides fluid, e.g., air, to the three tubes 422a, 422b, 422c, respectively, of the garment tubing 412b (analogous to compression garment tubing 112b shown in FIG. 1). The fluid flow from the three tubes 422a, 422b, 422c of the controller tubing 412a to the three respective tubes 422a, 422b, 422c, of the garment tubing 412b forms a fluid connection channel in the first orientation of the reversible connector 420, as indicated by arrows 430a, 430b, 430c. According to another aspect of the present invention, only one or two of the tubes 422a, 422b, 422c of the garment tubing 412b may be required, for example, for use on a compression garment (not shown) with less than three inflatable bladders. While shown as separate tubes in the example of FIGS. 3A-4B, in one alternative aspect tubes 422a, 422b, and 422c may be analogous to any one or a combination of passages 222a, 222b, and/or 222c of tubing 212 in FIG. 2a and/or passages 223a, 223b, and/or 223c of tubing 213 in FIG. 2b.

In a second orientation of the reversible connector 420 (analogous to reversible connector 120 and reversible connector 320 shown in FIGS. 1 and 3a), as illustrated in FIG. 4b, the outer chamber 402 may be formed by fluid flow passageways 324a, 326a shown in FIGS. 3b and 3c being offset from each other, the intermediate chamber 404 may be formed by fluid flow passageways 324b and 326b shown in FIGS. 3b and 3c being offset from each other, and the inner chamber 406 may be formed by fluid flow passageways 324c and 326c shown in FIGS. 3b and 3c being offset from each other when the first connector portion 408 is engaged with the second connector portion 410 in the second orientation. As shown in FIGS. 3b and 3c, the fluid flow passageways 324a, 326a may be offset from each other with bump outs 328a, 330a being offset from each other to form outer chamber 402 (shown in FIG. 4a) and the fluid flow passageways 326a, 326b may be offset from each other with the bump outs 328b, 330b being offset from each other to form intermediate chamber 404 (shown in FIG. 4a). Thus, in the second orientation, the reversible connector 320 receives fluid, e.g., air, from the three tubes 422a, 422b, 422c (may be analogous to tubes 222a, 222b, 222c shown in FIG. 2a_and 223a, 223b, 223c in FIG. 2b) of the controller tubing 412a (analogous to controller tubing 112a shown in FIG. 1) and provides the fluid, e.g., air, to the three tubes 422c, 422b, 422a, respectively, of the garment tubing 412b (analogous to compression garment tubing 112b shown in FIG. 1). The fluid flow from the three tubes 422a, 422b, 422c of the controller tubing 412a to the three respective tubes 422c, 422b, 422a, of the garment tubing 412b forms a fluid connection channel in the second orientation of the reversible connector 420, as indicated by arrows 430, 430b, 430c.

As illustrated in FIGS. 4a and 4b, the first connector portion 408 may include three inlets 416a, 416b, 416c that extend from the base 302a, shown in FIG. 3b, and the second connector portion 410 may include three inlets 416a, 416b, 416c that extend from the base 302b, shown in FIG. 3c. In the first connector portion 408, the three inlets 416a, 416b, 416c extend from an opposite end of the base 302a, shown in FIG. 3b, from which concentric walls 306a, 304a, 314a extend. In the second connector portion 410, the three inlets 418a, 418b, 418c extend from an opposite end of the base 302b, shown in FIG. 3c, from which concentric walls 306b, 304b, 314b extend. Each of the inlets 416a, 416b, 416c, 418a, 418b, 418c may be adapted to receive a corresponding tube from the tubing 412a, 412b over an outer edge of the inlet 416a, 416b, 416c, 418a, 418b, 418c. For example, each of the three inlets 416a, 416b, 416c may be adapted to receive a corresponding tube from the controller tubing 412a and each of the three inlets 418a, 418b, 418c may be adapted to receive a corresponding tube from the garment tubing 412b. In the first orientation, for example, each of the three inlets 416a, 416b, 416c may be adapted to receive a corresponding tube 422a, 422b, 422c from the controller tubing 412a, respectively, and each of the three inlets 418a, 418b, 418c may be adapted to receive a corresponding tube 422a, 422b, 422c from the garment tubing 412b, respectively. Conversely, in the second orientation, for example, each of the three inlets 416a, 416b, 416c may be adapted to receive a corresponding tube 422a, 422b, 422c from the controller tubing 412a, respectively and each of the three inlets 418a, 418b, 418c may be adapted to receive a corresponding tube 422c, 422b, 422a from the garment tubing 412b, respectively.

In some aspects, the first connector portion 408 may be made of a rigid material and the second connector portion 410 may be made of flexible material. The rigid material may be made of polyvinyl chloride (PVC), polyurethane, Acrylonitrile Butadiene Styrene (ABS) or similar. The flexible material may be made of Liquid Silicone Rubber (LSR), polyvinyl chloride (PVC), Thermoplastic Elastomer (TPE), or similar. By having the first connector portion 408 made of a rigid material and the second connector portion 410 made of a flexible material, connecting the first connector portion 408 and the second connector portion 410 may be easier due to the flexibility of the second connector portion 410 than if the first connector portion 408 and the second connector portion 410 were made of the same material. In other aspects, however, the first connector portion 408 and the second connector portion 410 may be made of the same material Referring again to FIGS. 3a, 3b, and 3c, the first connector portion 308 and the second connector portion 310 (analogous to first connector portion 108a and second connector portion 110a in FIG. 1, and first connector portion 408 and second connector portion 410 in FIGS. 4a and 4b) may include a contact pad 332, such as a grip, non-slip grip, or textured grip, for example, on the outer concentric wall 306a, 306b. For example, the first connector portion 308 may include a contact pad 332 on the top of the outer concentric wall 306a and/or on the bottom of the outer concentric wall 306a. In another example, the second connector portion 310 may include a contact pad 332 on the top of the outer concentric wall 306b and/or on the bottom of the outer concentric wall 306b. The contact pad 332 may assist in connecting the first connector portion 308 and the second connector portion 310 by providing a non-sliding surface. The material of the contact pad may be similar to the material of connector portions 308, 310, i.e., any one or combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene Terephthalate (PBT), Polyetheretherketone (PEEK), PEI (Ultem), PET, PETG, PMMA (Acrylic), POM (Acetal/Delrin), PP (Polypropylene), Polyphenylene Ether (PPE), Polyphenylene Sulfide (PPS), Polystyrene (PS), PTFE (Teflon); High-density polyethylene (HDPE), Liquid Crystal Polymer (LCP), Low-density Polyethylene (LLDPE), Linear Low-density Polyethylene (LLDPE), Ultra-high-molecular-weight Polyethylene (UHMW) or similar.

As illustrated in FIGS. 3a and 3b, the outer concentric walls 306a, 306b and the intermediate concentric walls 304a, 304b of the first connector portion 308 and the second connector portion 310 may have a substantially rectangular shape. The corners of the outer concentric walls 306a, 306b and the intermediate concentric walls 304a, 304b may be rounded. As illustrated, the inner concentric wall 314a of the first connector portion 308 and the inner concentric wall 314b of the second connector portion 310 may be circularly or elliptically shaped. In other aspects of the disclosure, the inner concentric wall 314a of the first connector portion 308 and the inner concentric wall 314b of the second connector portion 310 may have a rectangular shape, substantially rectangular shape, square shape, substantially square shape, or elliptical shape.

FIG. 5a shows a perspective view of another example of the reversible connector 520 with the first and second connector portions 508, 510 in an engaged position in accordance with aspects of the present disclosure. First connector portion 508 and second connector portion 510 are analogous to first connector portion 108a and second connector portion 110a shown in FIG. 1, first connector portion 308 and second connector portion 310 shown in FIGS. 3a-3c, and first connector portion 408 and second connector portion 410, shown in FIGS. 4a-4b. In this example, first connector portion 508 and second connector portion 510 may have an elliptical or circular profile.

FIGS. 5b and 5c show perspective views of a first connector portion 508 and a second connector portion 510, each having an elliptical or circular profile. As illustrated, the outer concentric walls 506a, 506b and the intermediate concentric walls 504a, 504b of the first connector portion 508 and the second connector portion 510 may have an elliptical or circular shape. Outer concentric walls 506a, 506b are analogous to outer concentric walls 306a, 306b shown in FIGS. 3b and 3c, and 406a, 406b, shown in FIGS. 4a and 4b.

In some aspects, the outer concentric wall 506a, the intermediate concentric wall 504a and the inner concentric wall 514a of the first connector portion 508 may each include a circumferential indent (not illustrated) having a sealing member, such as an O-ring, for example) positioned in the circumferential indents of each of the concentric walls 506a, 504a, 514a. Concentric walls 504a, 504b, 514a and 514b are analogous to concentric walls 304a, 304b, 314a and 314b shown in FIGS. 3b and 3b, and 408, 404b, 414a and 414b, shown in FIGS. 4a and 4b. For example, the indent of the outer concentric wall 506a may receive sealing member 542a, the indent of the intermediate concentric wall 504a may receive sealing member 542b and the indent of the inner concentric wall 514a may receive sealing member 542c. A perspective view of sealing members 642a, 642b, 642c (analogous to sealing members 542a, 542b and 542c shown in FIG. 5b), is also illustrated in FIG. 6.

Figure 7A:
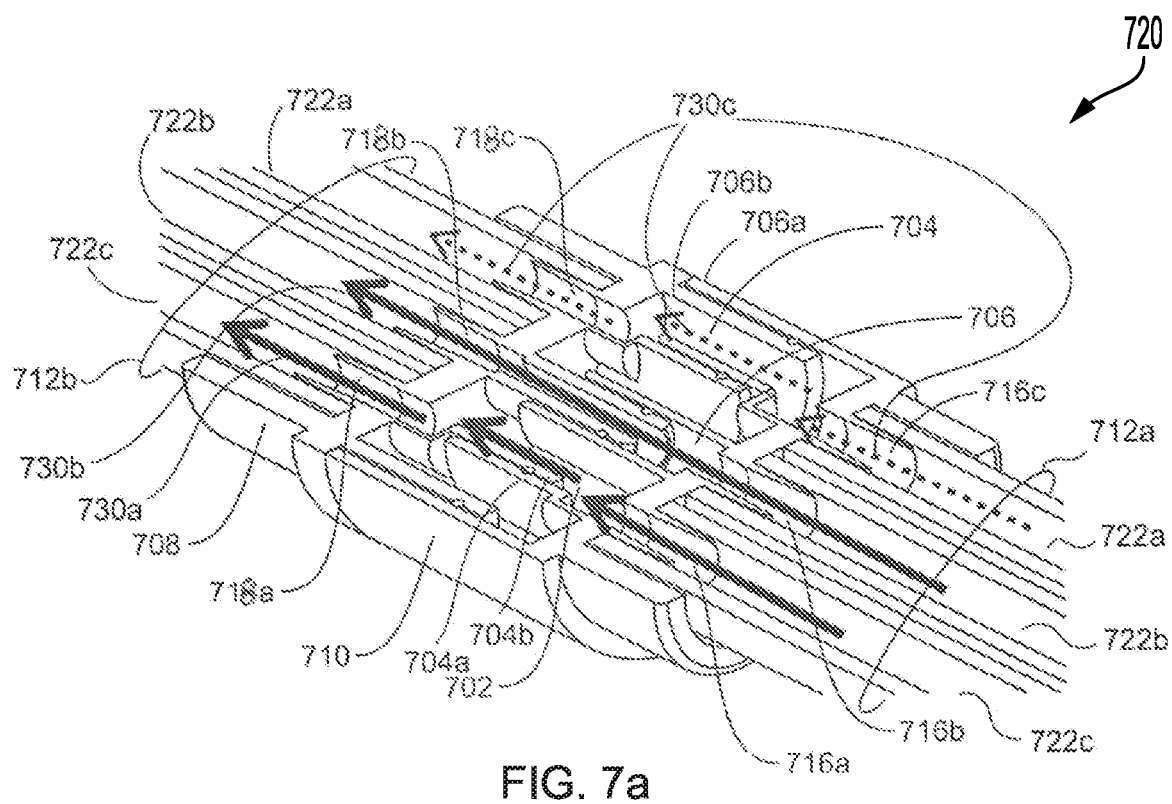
FIG. 7a shows another example perspective cross-sectioned view of the reversible connector with the first and second portions in an engaged position in a first orientation defining a first configuration of mutually cooperating first and second fluid flow connection channels showing the direction of the fluid flow from the fluid source of the controller to the compression garment, in accordance with aspects of the present disclosure.

FIG. 7a shows another example perspective cross-sectioned view of reversible connector 720 with the first and second portions 708, 710 in an engaged position in a first orientation defining a first configuration of the fluid flow connection channels showing the direction of the fluid flow from the fluid source of the controller to the compression garment, in accordance with aspects of the present disclosure. Reversible connector 720 with the first connector portion 708 and the second portion 710 are analogous to reversible connector 120 and first connector portion 108a and second connector portion 110a shown in FIG. 1, reversible connector 320 and first connector portion 308 and second connector portion 310 shown in FIGS. 3a-3c, reversible connector 420 and first connector portion 408 and second connector portion 410 shown in FIGS. 4a and 4b, and reversible connector 520 and first connector portion 508 and second connector portion 510 shown in FIGS. 5a-5c.

Sealing members 642a, 642b and 642c, shown in FIG. 6 may assist in creating seals for each of the corresponding chambers 702, 704, 706 (shown in FIGS. 7a and 7b) when the first connector portion 708 is engaged with the second connector portion 710 to form the reversible connector 720. The use of sealing members 642a, 642b and 642c, shown in FIG. 6 may allow for an easier connection when the first connector portion 708 and the second connector portion 710 are engaged. In some aspects, the first connector portion 708 may be made of a rigid material, while the female connector portion 710 may be made of a flexible material. In other aspects, the first connector portion 708 and the second connector portion 710 may be made of the same material.

Figure 7B:
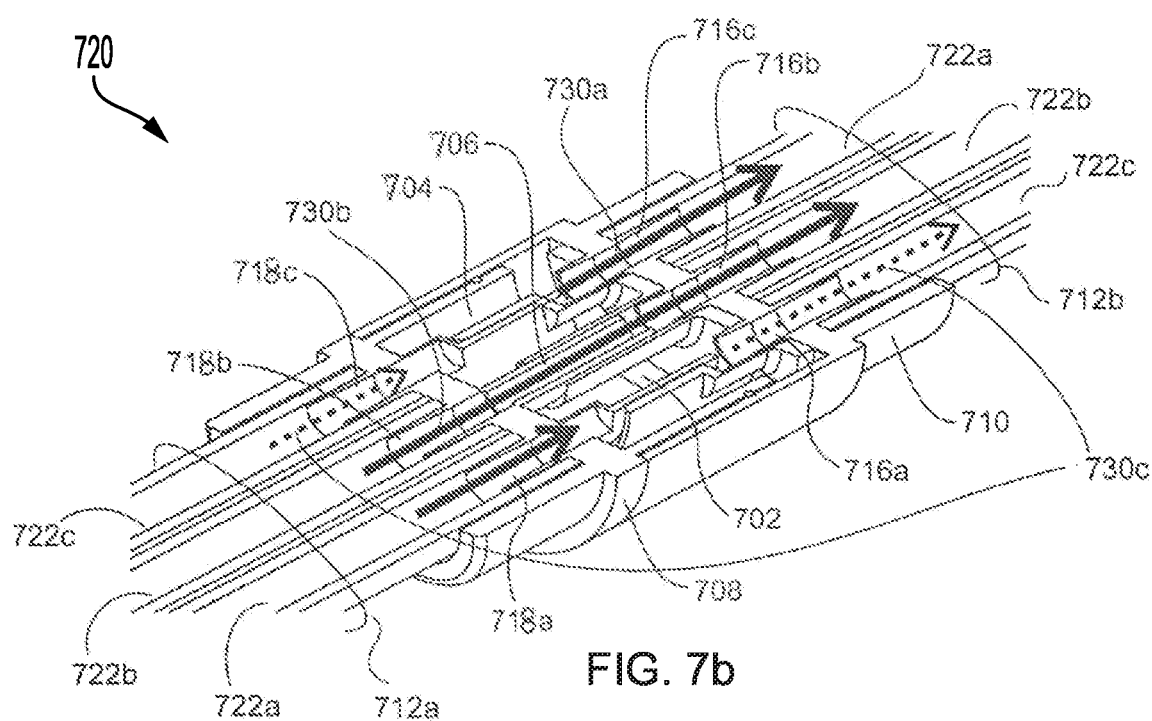
FIG. 7b shows another example top view cross-section of the reversible connector with the first and second portions in an engaged position in a second orientation defining a second configuration of mutually cooperating first and second fluid flow connection channels showing the direction of the fluid flow from the fluid source of the controller to the compression garment, in accordance with aspects of the present disclosure.

FIG. 7b shows another example top view cross-section of the reversible connector 720 with the first and second portions 708, 710 in an engaged position in a second orientation defining a second configuration of the mutually cooperating first and second fluid flow connection channels showing the direction of the fluid flow from the fluid source of the controller to the compression garment, in accordance with aspects of the present disclosure.

FIGS. 7a and 7b show the reversible connector 720 with the first and second portions 708, 710 engaged in a first orientation and in a second orientation with the fluid flow being the same as the fluid flows illustrated in FIGS. 4a and 4b.

Figure 8A:
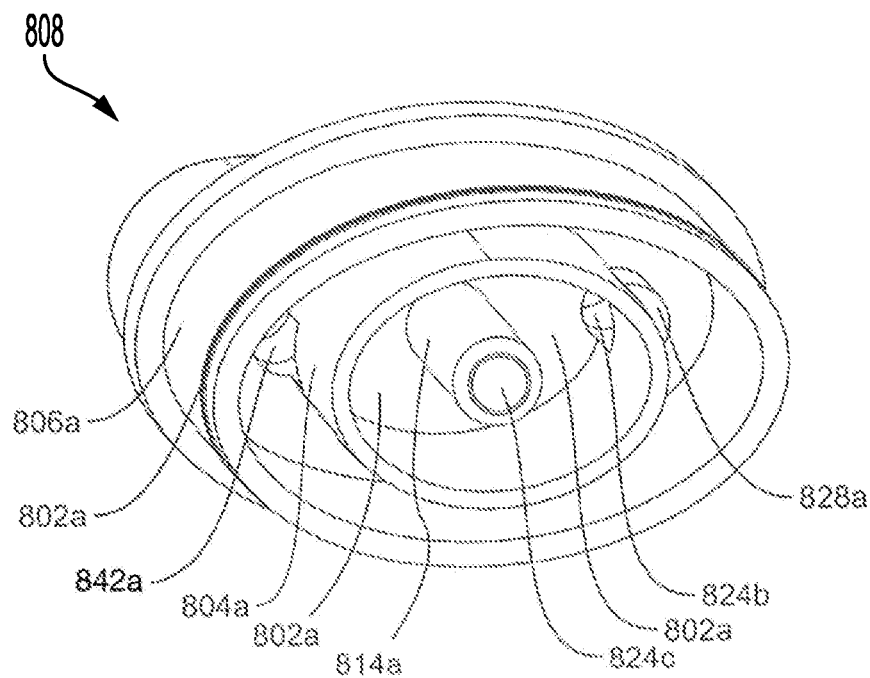
FIG. 8a shows a perspective view of a first connector portion having sealing member around an outer concentric wall, in accordance with aspects of the present disclosure.
Figure 8B:
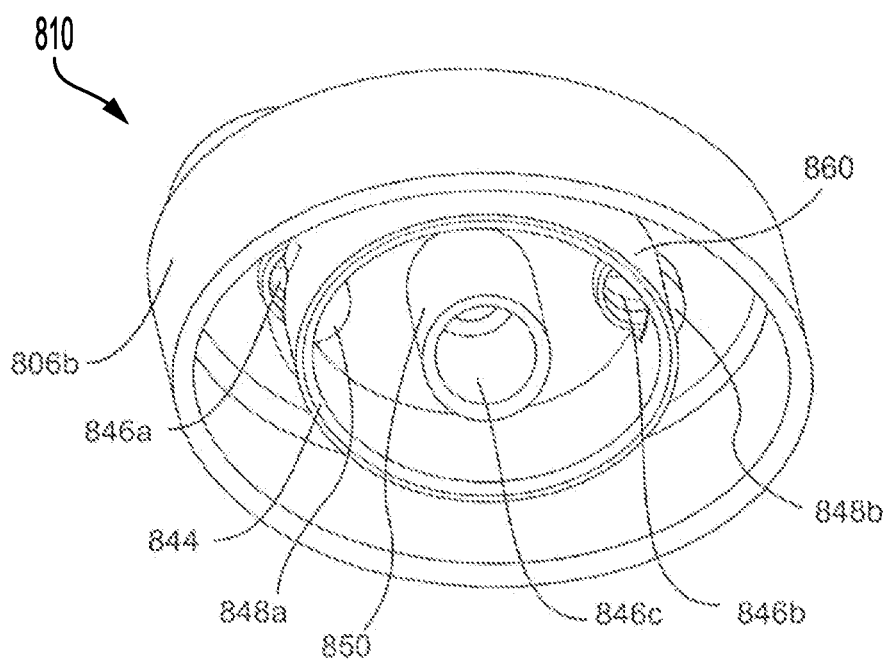
FIG. 8b shows a perspective view of an example second connector portion having a gasket in accordance with aspects of the present disclosure.

FIGS. 8a and 8b show perspective views of a first connector portion 808 having a sealing member sealing member around an outer concentric wall and a second connector portion 810 having a gasket 860. First connector portion 808 and second connector portion 810 are analogous to first connector portion 108a and second connector portion 110a shown in FIG. 1, first connector portion 308 and second connector portion 310 shown in FIGS. 3a-3c, first connector portion 408 and second connector portion 410 shown in FIGS. 4a and 4b, and first connector portion 708 and second connector portion 710 shown in FIGS. 7a and 7b.

As illustrated in FIG. 8a, the first connector portion 808 may include the outer concentric wall 806a having a circumferential indent (not illustrated) with a sealing member, such as an O-ring, for example, 842a positioned in the circumferential indent. Sealing member 842a is analogous to sealing member 542a shown in FIG. 5b and sealing member 642a shown in FIG. 6. FIG. 8b shows a second connector portion 810 having an outer concentric wall 806b and a gasket 860 having an intermediate concentric wall 844 and an inner concentric wall 850. As illustrated, the gasket 860 is positioned within the outer concentric wall 806b of the second connector portion 810. The gasket 860 may be made of a flexible material. The flexible material of gasket 860 may allow for an easier insertion of the gasket 860 into the outer concentric wall 806b compared to an insertion of a non-flexible gasket 860 into the outer concentric wall 806b. The flexible material of gasket 860 may also allow for an easier connection of the first connector portion 808 and the second connector portion 810. In another aspect, the gasket may be made of a rigid material.

Figure 8C:
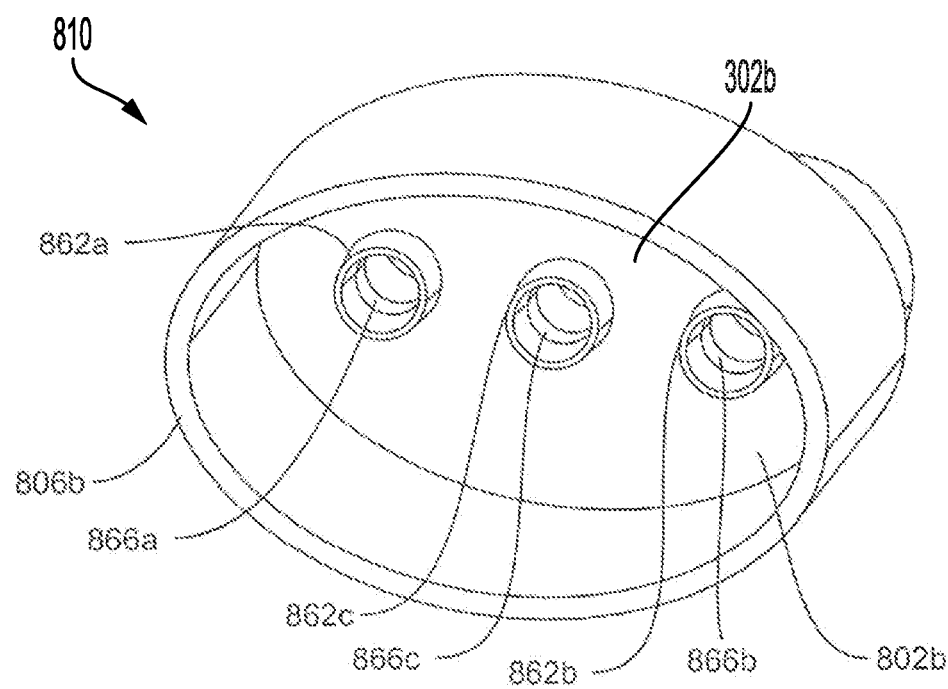
FIG. 8c shows a perspective of an example second connector portion without a gasket in accordance with aspects of the present disclosure.

FIG. 8c shows the second connector portion 810 without the gasket 860. The base 302b of the second connector portion 810 may include three gasket fluid flow passageways 866a, 866b and 866c with each aligning with a corresponding fluid flow passageway 326a, 326b, 326c (shown in FIG. 3c) of the second connector portion 810. Each gasket fluid flow passageway 866a, 866b and 866c may have a corresponding fluid flow passageway wall 862a, 862b and 862c that surrounds the gasket fluid flow passageway 866a, 866b and 866c. For example, the fluid flow passageway 866a may align with the fluid flow passageway 326a (shown in FIG. 3c) with the fluid flow passageway wall 862a fitting inside of the gateway fluid flow passageway 866a, the gateway fluid flow passageway 866b may align with the fluid flow passageway 326b (shown in FIG. 3c) with the fluid flow passageway wall 862b fitting inside of the gateway fluid flow passageway 866b, the gateway fluid flow passageway 866c may align with the fluid flow passageway 326c (shown in FIG. 3c) with the fluid flow passageway wall 862c fitting inside of the gateway fluid flow passageway 866c.

Figure 8D:
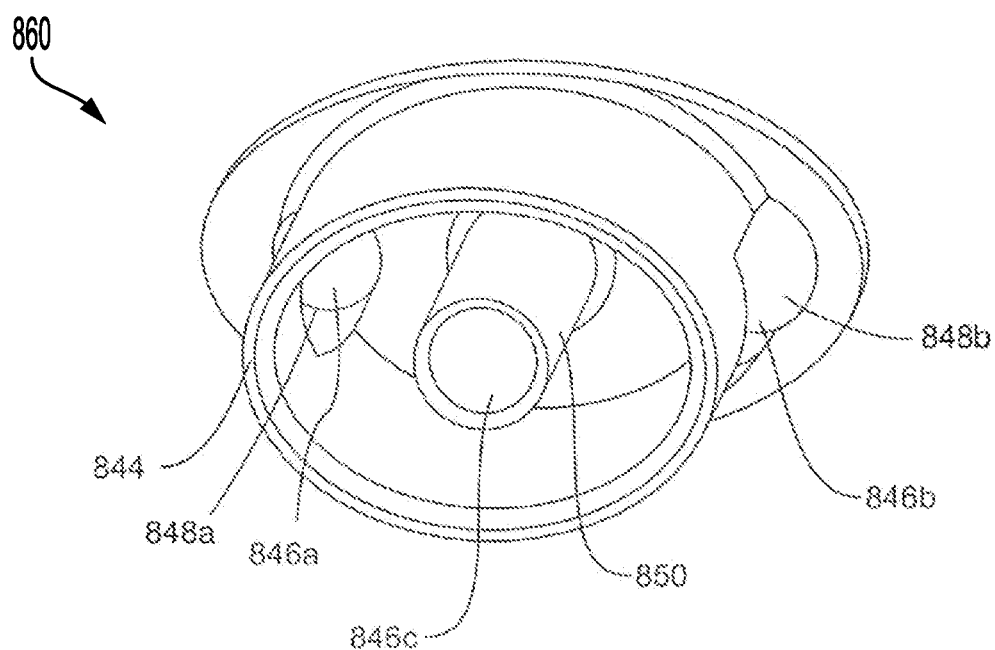
FIG. 8d shows a perspective view of an example gasket in accordance with aspects of the present disclosure.

FIG. 8d shows the gasket 860. The gasket 860 may be made of Liquid Silicone Rubber (LSR), poly-vinyl chloride (PVC), Thermoplastic Elastomer (TPE), or similar material. The intermediate concentric wall 844 and the inner concentric wall 850 of the gasket 860 may replace the intermediate concentric wall 304b and inner concentric wall 314b (shown in FIG. 3c) of the aspects of the disclosure described above with regards to the second connector portion 310 (analogous to second connector portion 810). The intermediate concentric wall 844 of the gasket 860 may include fluid flow passageways 846a, 846b, 846c which replace 326a, 326b, 326c (shown in FIG. 3c) of the aspects of the disclosure described above with regards to the second connector portion 310. The intermediate concentric wall 844 may include bump outs 848a, 848b which replace the bump outs 330a, 330b (shown in FIG. 3c) of the previous aspects of the disclosure described above with regards to the second connector portion 310.

The use of the sealing member 842a (shown in FIG. 8a) may assist in creating a seal for the chamber 702 (shown in FIGS. 7a and 7b) when the first connector portion 808 is slidably engaged with the second connector portion 810, shown in FIGS. 8a and 8a. The use of sealing member 842a and gasket 860 may allow for an easier connection when the first connector portion 808 and the second connector portion 810 are engaged.

According to another aspect of the present invention, and referring back to FIGS. 4a and 4b, only one or two of the tubes 422a, 422b, 422c of the garment tubing 412b may be required, for example, for use on a compression garment (not shown) with less than three inflatable bladders. In such an embodiment, garment tubing 412b may include only those tubes 422a, 422b, 422c that are necessary to operate the compression garment according to this embodiment, for instance, only one tube 422a for a single-bladder compression garment (not shown). If, for example, the compression garment includes only one tube 422a, the user may connect the tube 422a to any one of the inlets 416a, 416b, 416c. During the setup and initialization cycle, the controller may deliver a small flow of pressurized fluid individually to each of the inlets 416a, 416b, 416c and determine, individually, whether the inlet 416a, 416b, 416c is connected to a tube 422a. If the controller determines that any one, or more, of the inlets 416a, 416b, 416c is not connected to a tube 422a, then the controller thereafter supplies pressurized fluid only to those inlets for which a tube 422a is present. In this manner, the reversible connector is adaptable to be used with any combination of tubes 422a, 422b, 422c connected to inlets 416a, 416b, 416c.

Figure 9A:
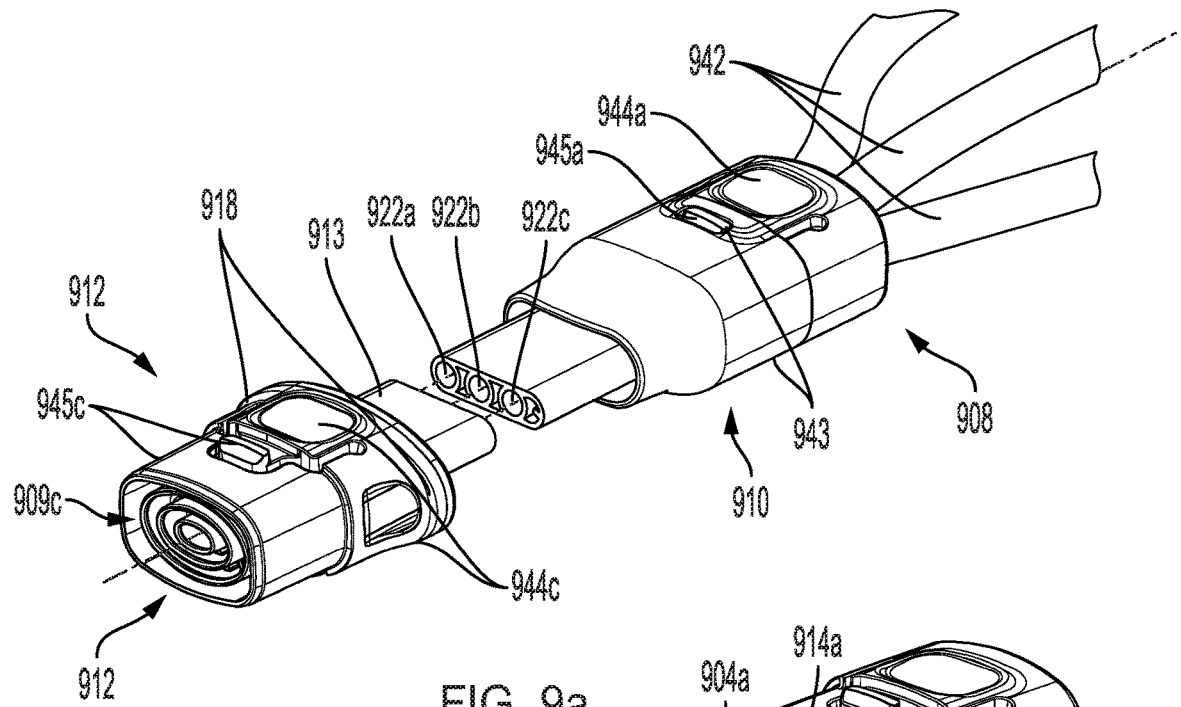
FIG. 9a shows a perspective view of an example extension in accordance with aspects of the present disclosure.

FIGS. 9a-9d show perspective views of example reversible connectors, in accordance with aspects of the disclosure. Variations may include a first connector portion 908, a second connector portion 910 and/or a third connector portion 912. While the first connector portion 908, second connector portion 910 and third connector portion 912 (also interchangeably referred to as third connection portion 912) are shown in a particular configuration in FIG. 9a (i.e., with the first connector portion 908 in engagement with the second connector portion 910 and with tubing 913 connecting the second connector portion 910 to the third connector portion 912, the connectors and aspects described are applicable to any configuration. In the example shown in FIG. 9a, the third connector portion 912 may for example be a controller connector configured to connect with and provide fluid communication with a controller (e.g., controller 102 in FIG. 1 described above and/or controller 902 in FIGS. 9q-9s described below). Further, the first connector portion 908 may provide fluid communication with inflatable bladders (e.g., bladders 106a, 106b, and/or 106c) of a compression garment (e.g., compression garment 104 in FIG. 1) via compression garment tubing 942. As shown in FIG. 9a, the third connector portion 912 and the second connector portion 910 may be connected via tubing 913. Tubing 913 provides fluid communication between corresponding passages of the third connector portion 912 and the second connector portion 910. Tubing 913 may for example have a three separate passages or conduits 922a, 922b, and 922c therein. In one example, tubing 913 may be analogous with tubing 212 or 213 described with reference to FIGS. 2a and 2B described above or FIGS. 11a and 11b described below.

The first connector portion 908 and the second connector portion 910 may be alternatively referred to as a male connector and a female connector, respectively, and the third connector portion 912 may alternatively be referred to as a male connector. The first connector portion 908, second connector portion 910 and/or third connector portion may be analogous to the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 908 may for example be analogous with the sleeve side connection portion 110a in FIG. 1. Additionally, the second connector portion 910 may be analogous with the first reversible connection portion 108b and the third connector portion 912 may be analogous with the second reversible connector portion 110b. The third connector portion 912 may for example be connectable to a controller (e.g., controller 102 in FIG. 1) and/or may be configured to connect to a controller side reversible connector portion (e.g., controller side reversible first connection portion 108a in FIG. 1).

Figure 9B:
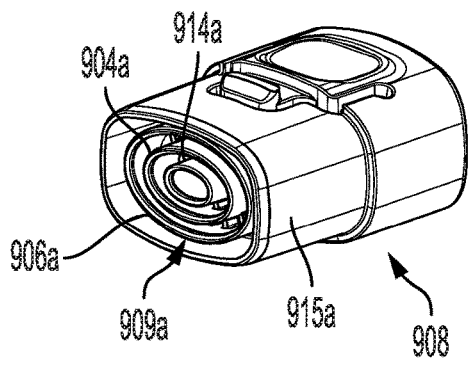
FIG. 9b shows a perspective view of an example first connection portion in accordance with aspects of the present disclosure.
Figure 9D:
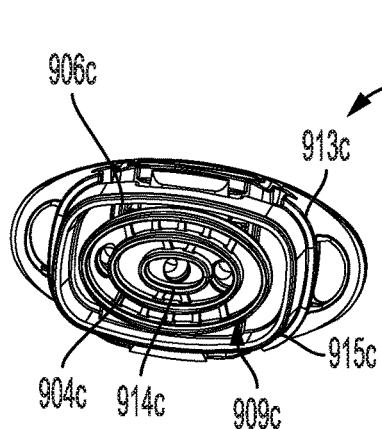
FIG. 9d shows a perspective view of an example third connector portion in accordance with aspects of the present disclosure.
Figure 9C:
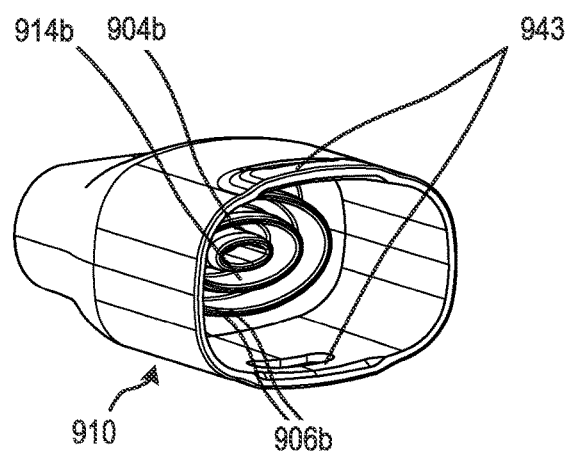
FIG. 9c shows a perspective view of an example second connector portion in accordance with aspects of the present disclosure.

FIG. 9a shows the first connector portion 908 connected to a second connector portion 910. While not limited to the aforementioned configuration, the first connector portion 908 may for example provide fluid communication with a compression garment (e.g., compression garment 104 in FIG. 1) via compression garment tubing 942. The third connector portion 912 is shown disconnected and may be configured to connect to a controller (e.g., controller 102 in FIG. 1 and/or controller 902 in FIGS. 9q-9s). Examples of a controller-side reversible connection portion are described in detail below with respect to FIGS. 9q and 9s. FIG. 9b shows a perspective view of a first connector portion 908, FIG. 9c shows a perspective view of the second connector portion 510, and FIG. 9d shows an example of the third connector portion 912. Further details of the connector portion(s) are described in detail with respect to FIGS. 9e-9r and 12a-15b described below.

As illustrated, the first connector portion 908 may have an outer housing 915a and a sealing member 909a with outer wall 906a, intermediate concentric wall 904a, and an inner concentric wall 914a. FIG. 9c is a view of the second connector portion 910 disconnected from the first connector portion 908. It is noted that the orientation of the second connector portion 910 in FIG. 9c is for visual clarity and not necessarily indicative of assembly orientation. As shown in FIG. 9c, the second connector portion 910 may have an outer housing 915b, an outer seal engagement wall 906b, intermediate concentric wall 904b, and an inner concentric wall 914b. When the first connector portion 908 and second connector portion 910 are connected (e.g., as shown in in FIG. 9a), the outer wall 906a, intermediate concentric wall 904a and the inner concentric wall 914a of the sealing member 909a may sealingly engage with the outer seal engagement wall 906b, the intermediate concentric wall 904b, and the inner concentric wall 914b, respectively to create chambers forming fluid passages within interface of the first connector portion 908 and the second connector portion 910. The third connector portion 912 includes an outer housing 915c and a sealing member 909c with outer wall 906c, intermediate concentric wall 904c, and an inner concentric wall 914c. In some aspects, the sealing member 909c of the third connector portion 912 may be identical to the sealing member 909a of the first connector portion 908, which may reduce production costs and/or provide for ease of replacement or reprocessing of the connector and/or associated devices (e.g., the compression garment, adapter, extension device and/or controller).

Figure 9E:
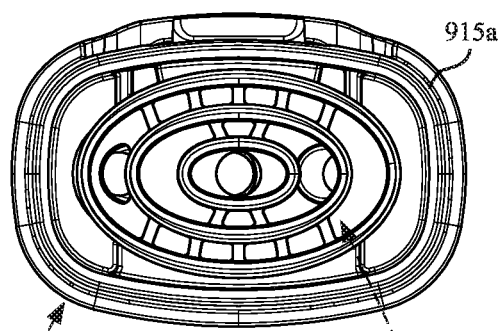
FIG. 9e shows a front view of the third connector portion of FIGS. 9a and 9d in accordance with aspects of the present disclosure.
Figure 9F:
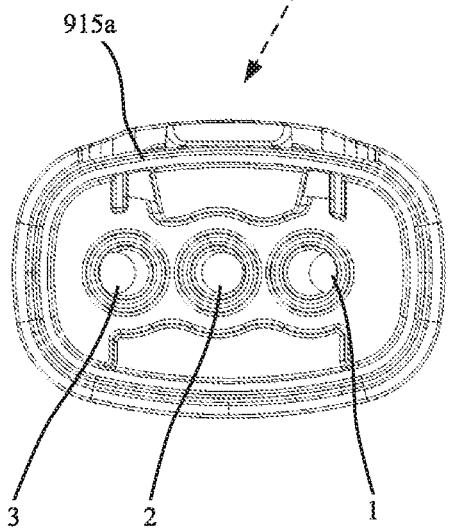
FIG. 9f shows a partial front view of the third connector portion of FIGS. 9a, 9d and 9e with a seal portion removed.
Figure 9G:
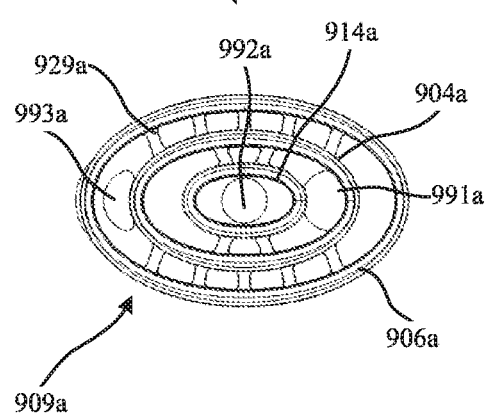
FIG. 9g shows a partial front view of a seal usable with the third connector portion in FIGS. 9a, 9b, 9e, and 9g.

As shown in FIG. 9e, the first connector portion 908 may include a first connector outer housing 915a. The outer housing 915a may be a separate component from the sealing member 909a as shown in FIGS. 9f and 9g. Turning to FIG. 9g, the sealing member 909a may be a single unitary structure and may include the outer concentric wall 906a, intermediate concentric wall 904a, and inner concentric wall 914a. The sealing member 909a may further include a first opening 991a that corresponds with a first fluid passage 1 of the first connection portion, a second opening 992a that corresponds with a second fluid passage 2 of the first connection portion 912, and a third opening 993a that corresponds with at third fluid passage 3 of the first connection portion 912. The inner concentric wall 914a may be positioned within the intermediate concentric wall 904a, and the intermediate concentric wall 904c may be positioned within the outer concentric wall 906a in the first connector portion 908. The sealing member 909a may be formed of a flexible or semi-flexible material. The sealing member 909a may further include a single or multiple support structures (e.g., 929a in FIG. 9g). The support structures may comprise a section of material with a larger cross-sectional area than the rest of the sealing member 909a and may prevent any one or a combination of the first outer concentric wall 906a, intermediate concentric wall 904a and/or inner concentric wall 914b from buckling or otherwise breaking the seal or causing leakage at the interfaces between the first connector portion 908 and the second connector portion 910. The first connector outer housing 915a may for example be formed of a rigid or semi-rigid material. While only a single support structure is referenced in FIG. 9l to prevent obstruction of the Figure, any number of support structures may be used without departing from the scope of the disclosure. For example, as shown in FIG. 9l, the sealing portion 929b may have 14 support structures. In one example, the sealing member may be molded, additively manufactured, extruded, and/or machined from any one or a combination of Liquid Silicone Rubber (LSR), polyvinyl chloride (PVC), Thermoplastic Elastomer (TPE), Thermoplastic Vulcanisates (TPV), Closed Cell PU Foam, Open Cell PU Foam, Closed cell PE Foam and/or open cell PE Foam or similar. In a preferred aspect, the sealing portion 929b is an injection molded low durometer polyvinyl chloride (PVC). For example, the outer housing 915a may be molded, additively manufactured, extruded, and/or machined from any one or combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene terephthalate (PBT), polyetheretherketone (PEEK), PEI (Ultem), PET, PETG, PMMA (Acrylic), POM (Acetal/Delrin), PP (Polypropylene), Polyphenylene Ether (PPE), Polyphenylene sulfide (PPS), Polystyrene (PS), PTFE (Teflon); High-density polyethylene (HDPE), Liquid crystal polymer (LCP), low-density polyethylene (LLDPE), Linear low-density polyethylene (LLDPE), Ultra-high-molecular-weight polyethylene (UHMW) or similar. In a preferred aspect, the outer housing 915a is an injection molded Acrylonitrile Butadiene Styrene (ABS).

Figure 9H:
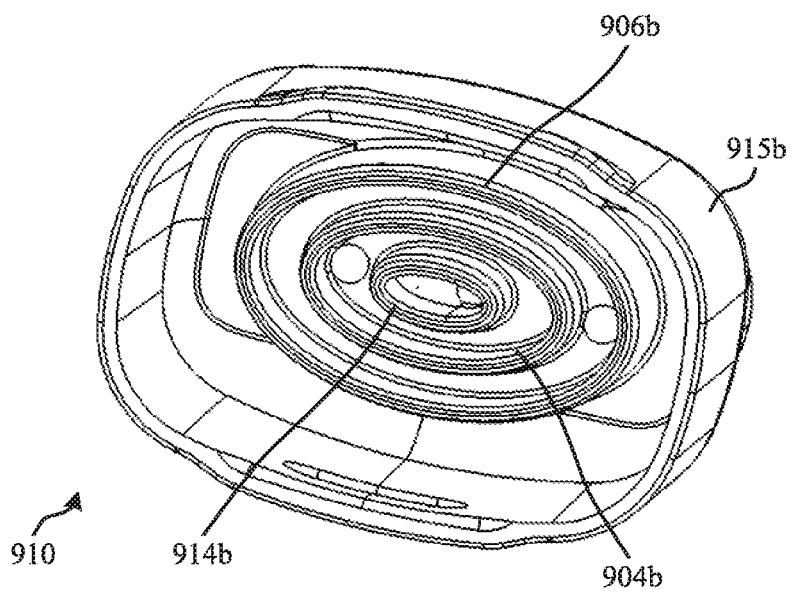
FIG. 9h is a partial perspective view of the second connector portion of FIGS. 9a and 9c in accordance with aspects of the present disclosure.
Figure 9I:
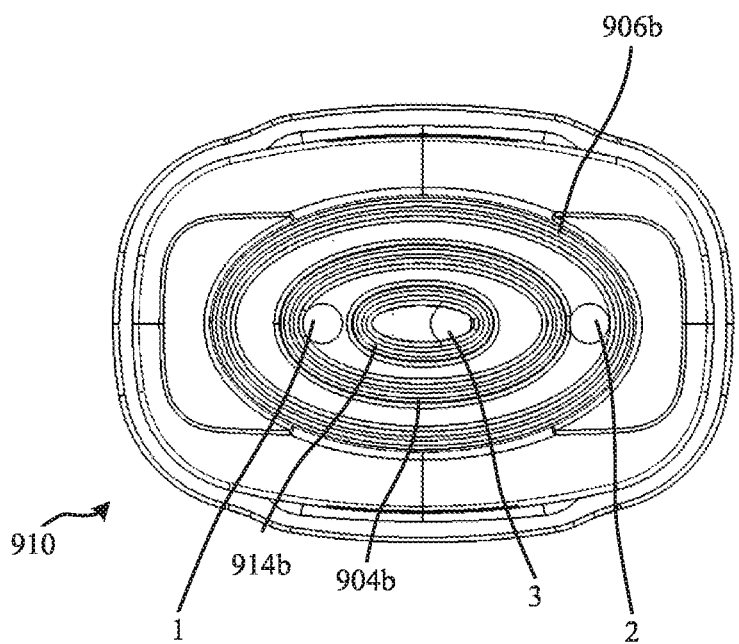
FIG. 9i is a partial front view of the second connector portion of FIGS. 9a, 9c, and 9h.

Referring now to FIGS. 9h and 9i, the second connector portion 910 may include a second connector outer housing 915b, an outer concentric wall 906b, an intermediate concentric wall 904b and an inner concentric wall 914b. The inner concentric wall 914b may be positioned within the intermediate concentric wall 904b and the intermediate concentric wall 904b may be positioned within the outer concentric wall 906b of the second connector portion 910. In one example implementation, the second connector outer housing 915b, the outer concentric wall 906b, an intermediate concentric wall 904b and an inner concentric wall 914b may be formed as a unitary component. In one example, the second connector outer housing 915b, outer concentric wall 906b, intermediate concentric wall 904b, and inner concentric wall 914b may for example be formed of a rigid or semi-rigid material. For example, the second connector outer housing 915b, outer concentric wall 906b, intermediate concentric wall 904b, and inner concentric wall 914b may be molded, additively manufactured, extruded, and/or machined from any one or combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene terephthalate (PBT), polyetheretherketone (PEEK), PEI (Ultem), PET, PETG, PMMA (Acrylic), POM (Acetal/Delrin), PP (Polypropylene), Polyphenylene Ether (PPE), Polyphenylene sulfide (PPS), Polystyrene (PS), PTFE (Teflon); High-density polyethylene (HDPE), Liquid crystal polymer (LCP), low-density polyethylene (LLDPE), Linear low-density polyethylene (LLDPE), Ultra-high-molecular-weight polyethylene (UHMW) or similar. In a preferred aspect, the second connector outer housing 915b, outer concentric wall 906b, intermediate concentric wall 904b, and inner concentric wall 914b are an injection molded Acrylonitrile Butadiene Styrene (ABS).

Figure 9J:
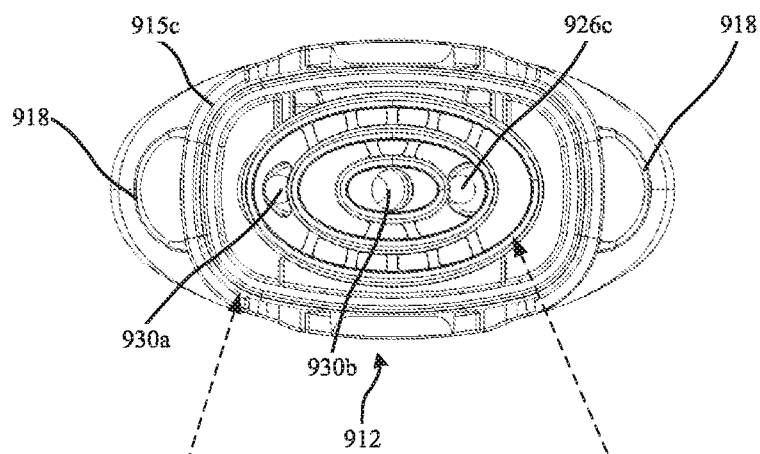
FIG. 9j is a front view of the third connector portion of FIGS. 9a and 9d in accordance with aspects of the present disclosure.
Figure 9K:
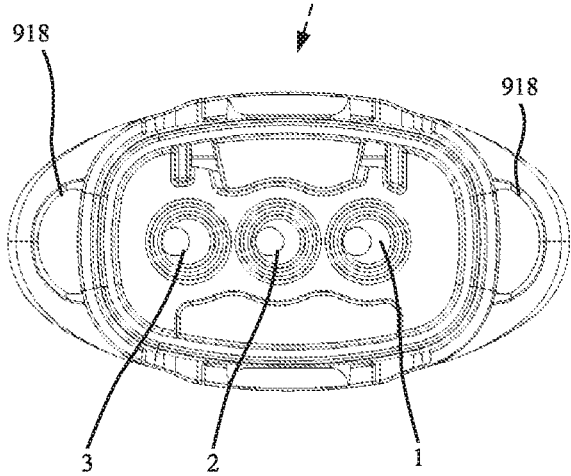
FIG. 9k is a front view of a connector housing of the third connector portion of FIG. 9k with a sealing member removed in accordance with aspect of the disclosure.
Figure 9L:
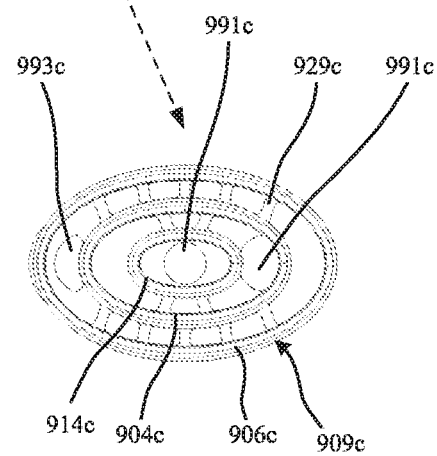
FIG. 9l is a front view of a sealing member of third connector portion of FIG. 9j.

Turning now to FIG. 9j, the third connector portion 912 may include a third connector outer housing 915c. The third connector portion 912 may alternatively be referred to throughout the disclosure as male connector. The outer housing 915c may be a separate component from the sealing member 909c as shown in FIGS. 9k and 9l. Turning to FIG. 9l, the sealing member 909c may be a single unitary structure and may include the outer concentric wall 906c, intermediate concentric wall 904c, and inner concentric wall 914c. The inner concentric wall 914c may be positioned within the intermediate concentric wall 904c, and the intermediate concentric wall 904c may be positioned within the outer concentric wall 906c in the first connector portion 908. The sealing member 909c may further include a first opening 991c that corresponds with a first fluid passage 1 of the third connection portion, a second opening 992c that corresponds with a second fluid passage 2 of the third connection portion 912, and a third opening 993c that corresponds with at third fluid passage 3 of the third connection portion 912. The sealing member 909c may be formed of a flexible or semi-flexible material. The sealing member 909a may further include a single or multiple support structures (e.g., 929c in FIG. 9l). The support structures may comprise a section of material with a larger cross-sectional area than the rest of the sealing member 909a and may prevent any one or a combination of the first outer concentric wall 906c, intermediate concentric wall 904c and/or inner concentric wall 914c from buckling, "blowing-out," or otherwise breaking the seal or causing leakage at the interfaces between the third connector portion and the connector connected thereto (e.g., controller side or fourth connector 941a and/or 941b (also interchangeably referred to as monitor side reversible connection portion, monitor side reversible connector portion, controller side connection portion, controller side reversible connector portion) in FIGS. 9q-9s described below). In one aspect, the third connector may be configured to a connect to a connector with similar features to or that is identical to the second connector portion 910. In one example, the sealing member 909c may be molded, additively manufactured, extruded, and/or machined from any one or a combination of Liquid Silicone Rubber (LSR), polyvinyl chloride (PVC), Thermoplastic Elastomer (TPE), Thermoplastic Vulcanisates (TPV), Closed Cell PU Foam, Open Cell PU Foam, Closed cell PE Foam and/or open cell PE Foam or similar. In a preferred aspect, the sealing member 909c is an injection molded low durometer polyvinyl chloride (PVC). For example, the outer housing 915c may be may be molded, additively manufactured, extruded, and/or machined from any one or combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene terephthalate (PBT), polyetheretherketone (PEEK), PEI (Ultem), PET, PETG, PMMA (Acrylic), POM (Acetal/Delrin), PP (Polypropylene), Polyphenylene Ether (PPE), Polyphenylene sulfide (PPS), Polystyrene (PS), PTFE (Teflon); High-density polyethylene (HDPE), Liquid crystal polymer (LCP), low-density polyethylene (LLDPE), Linear low-density polyethylene (LLDPE), Ultra-high-molecular-weight polyethylene (UHMW) or similar. In a preferred aspect, the outer housing 915c is an injection molded Acrylonitrile Butadiene Styrene (ABS). As described below, the third connector may include one or more tie-down portions 918 that are configure to have a tie-down or label connection portion passed therethrough. Further example aspects of the functionality of the tie-down portion are described with respect to FIG. 9r below.

Figure 9M:
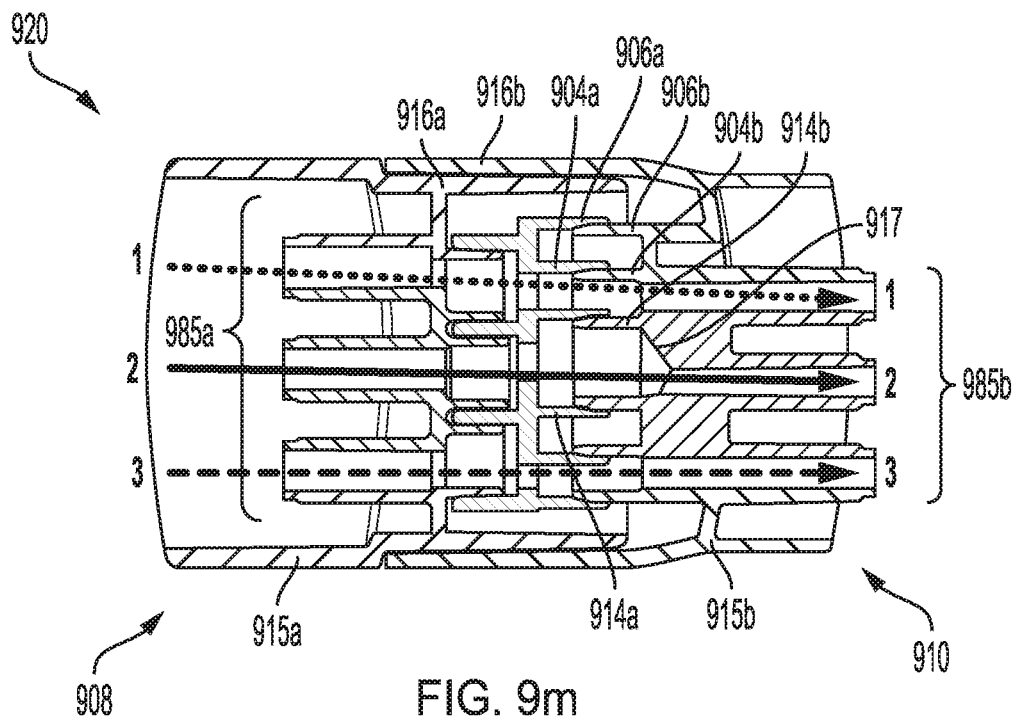
FIG. 9m shows an example top down cross-section view of the reversible connector in an engaged position in a first orientation defining a first configuration of mutually cooperating first and second fluid flow connection channels showing the direction of the fluid flow from the fluid source of the controller to the compression garment, in accordance with aspects of the present disclosure.
Figure 9N:
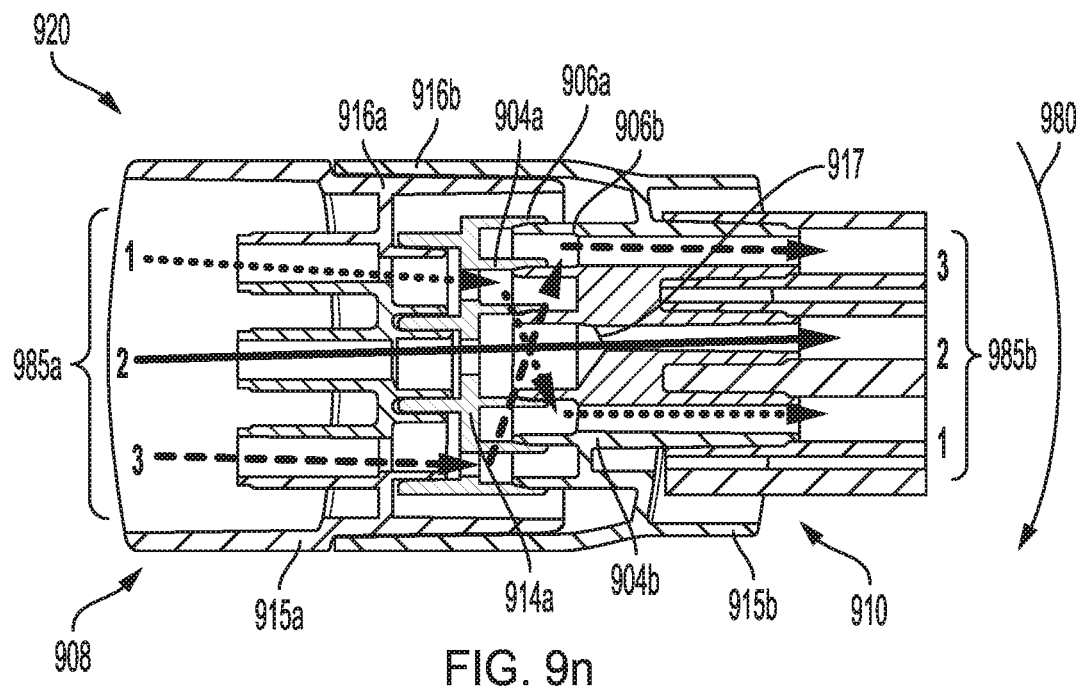
FIG. 9*n* shows an example top down cross-section view of the reversible connector in an engaged position in a second orientation defining a second configuration of mutually cooperating first and second fluid flow connection channels showing the direction of the fluid flow from the fluid source of the controller to the compression garment, in accordance with aspects of the present disclosure.

Turning now to FIGS. 9m and 9n, examples of fluid paths are described below. The first connector portion may include a tubing connection portion 985a and the second connection portion may include a tubing connection portion 985b which may be removably or permanently connectable to tubing 112b, 112c, and/or 112a in FIG. 1, tubing 212 or 213 in FIGS. 2a and 2b, tubing 422a-422c in FIGS. 4a-4b, tubing 722a-722c in FIGS. 7a-7b, tubing 913 and/or 942 in FIGS. 9a and 9r, for example.

Figure 19A:
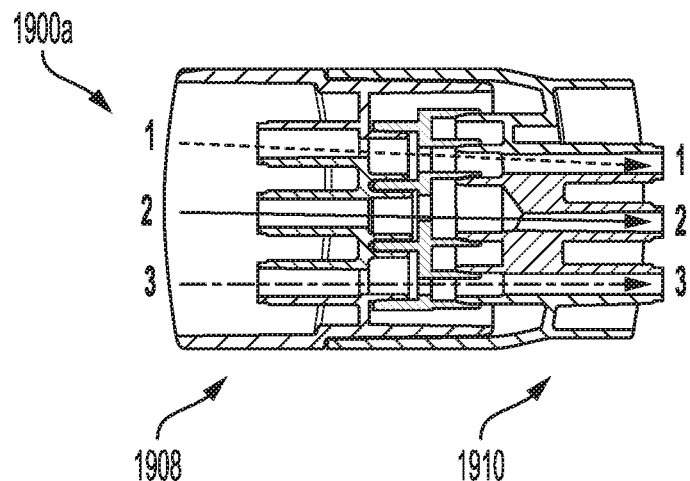
FIG. 19*a* shows an example reversible connector in a first orientation in accordance with aspects of the present disclosure.
Figure 19B:
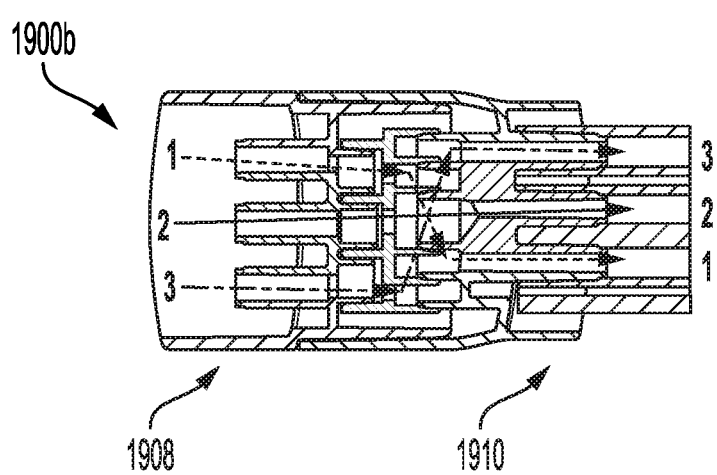
FIG. 19b shows an example reversible connector in a second orientation in accordance with aspects of the present disclosure.
Figure 19C:
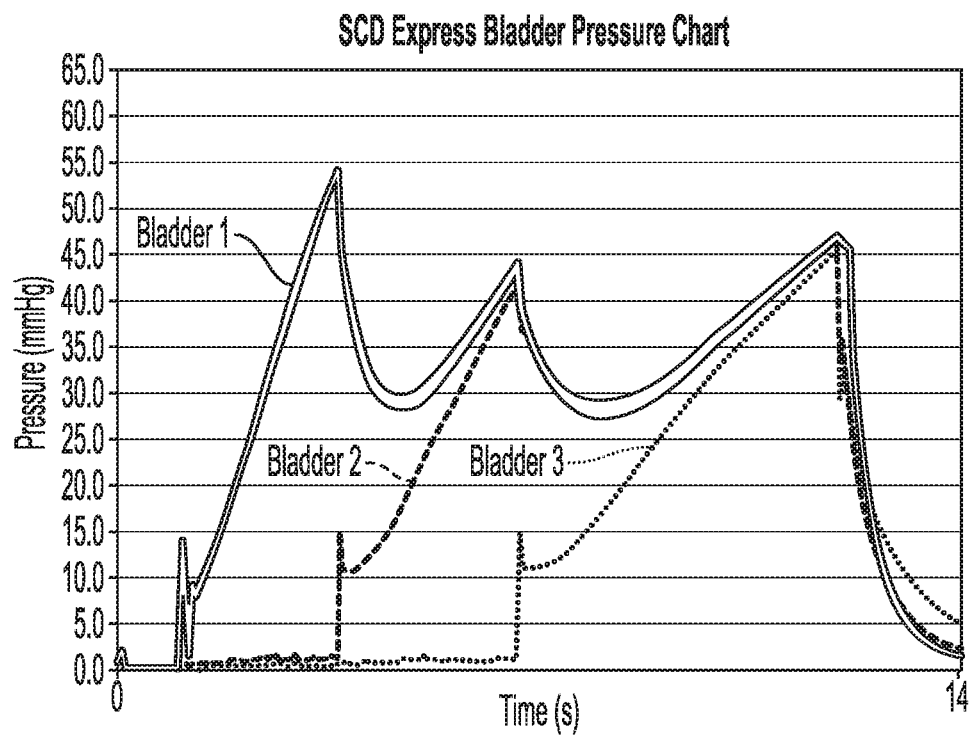
FIG. 19c is a pressure chart showing pressure with respect to time during operation of the controller; in accordance with aspects of the present disclosure.

While the referenced connectors in FIGS. 9m and 9n are the first connector portion 908 and second connector portion 910, the same aspects may be applicable to the third connector portion 912 and/or the fourth connector or controller-side connector (e.g., controller side connector(s) 1914a and/or 1914b in FIGS. 19a-19c). In some aspects, the outer concentric wall 906a, the intermediate concentric wall 904a and the inner concentric wall 914a of the first connector portion 908 may be adapted (i.e., sized) to engage with the outer concentric wall 906b, the intermediate concentric wall 904b and the inner concentric wall 914b of the second connector portion 910 shown in FIG. 9e to form the reversible connector 920 in an engaged configuration, as illustrated in FIGS. 9a, 9m, and 9n. For example, as shown in FIGS. 9m and 9n, the outer concentric wall 906a of the first connector portion 908 may engage with an outside surface of the outer concentric wall 906b of the second connector portion 910. The intermediate concentric wall 904a of the first connector portion 908 may engage with an outside surface of the intermediate concentric wall 904b of the second connector portion 910. Further, the inner concentric wall 914a of the first connector portion 908 may engage with an outer surface of the inner concentric wall 914b of the second connector portion 910, when the first connector portion 908 is engaged with the second connector portion 910 to form the reversible connector 920 in a first engaged configuration, as shown in FIG. 9m.

As shown in FIG. 9n and as further described below, the first connector portion 908 and the second connector portion 910 may be connected in a second engaged configuration (e.g., a "reversed" configuration) without changing the order of the path of fluid communication. For example, the first connector portion 908 may have a tubing connection portion 985a with three separate fluid paths (e.g., paths 1, 2, and 3). Similarly, the second connector portion 910 may have a tubing connection portion 985b with three separate fluid paths (e.g., paths 1, 2, and 3). As shown in FIG. 9m, in the first engaged configuration, respective order of fluid paths 1, 2, and 3 of the first connector portion 908 and the second connector portion 910 are matched and flowing in a first fluid flow channel. With the connection "reversed" (e.g., one of the first connector portion 908 or the second connector portion 910 flipped 180 degrees) as designated by arrow 980, the fluid paths 1, 2, and 3 of the first connector portion 908 and the second connector portion 910 are still matched while flowing in a second fluid flow channel due to concentric wall arrangement described above. As described in further detail with respect to FIGS. 19a-19c below, features such as a funnel portion 917 improve consistency of fluid flow and pressure regardless of the orientation in which the first connector portion 908 and the second connector portion 910 are connected. As shown in FIGS. 9m and 9n, the first connector portion 908 and the second connector portions 910 may have a respective first connector engagement portion 916a and a second connector engagement portion 916b. The first connector engagement portion 916a may be configured to fit within the second connector engagement portion 916b. The engagement between the first connector engagement portion 916a and the second connector engagement portion 916b may for example function as a guide for connection of the first connector portion 908 to the second connector portion 910. In one example, any one or combination of the connector portions may have a locking feature to ensure positive connection and sealing engagement between the two or more connectors. One example of such a feature is shown in FIGS. 9a-9d. In the examples shown, the locking feature of the first connector portion 908 includes at least one pressing portion 944a and a locking portion 945a. Either one of or both the pressing portion 944a and/or the locking portion 945a may be biased or otherwise tensioned so that pressing the pressing portion 944a causes the locking portion 945a to move into or out of engagement with a locking portion 945b of the second connector portion 910. In one example, the pressing portion 944a and/or the locking portion 945a may be connected to the first connection portion via plastic biasing member or other element configured to plastically deform or deflect when a user presses the locking portion. The second connector locking feature may for example include an opening or openings 943 configured to lockingly receive the locking portion 945a of the first connector portion 908. The aforementioned locking features may for example cause the first connector portion 908 to lock into place once the first connector portion 908 and second connector portion are connected and in sealing engagement. The first connector portion 908 and second connector portion 910 may lock when a user presses the first connector portion 908 into the second connector portion 910 until the locking portion 945a is lockingly received within the opening or openings 943. When a user wishes to remove the first connector portion 908 from the second connector portion 910, applying a pressing force to the pressing portion 944a moves the locking portion 945a downward and out of locking engagement with the opening or openings 943 thus allowing a user to separate the first connector portion 908 from the second connector portion 910. The third connector portion 912 may additionally include similar features including a pressing portion 944c and/or a locking portion 945c. While hidden from view in FIG. 9a, any one or a combination of the first connector pressing portion 944a, first connector locking portion 945a and/or the second connector locking portion 945b connector locking portion 945a, and/or locking may be included on a single or both sides of each of the aforementioned first connector portion 908 and/or second connector portion 910. Any one of the locking features described above may include a visual, tactile, and/or audible indicator to indicate to a user that the connectors are properly connected. One example of a visual indicator is described further with respect to FIGS. 12a and 12b below.

Figure 9O:
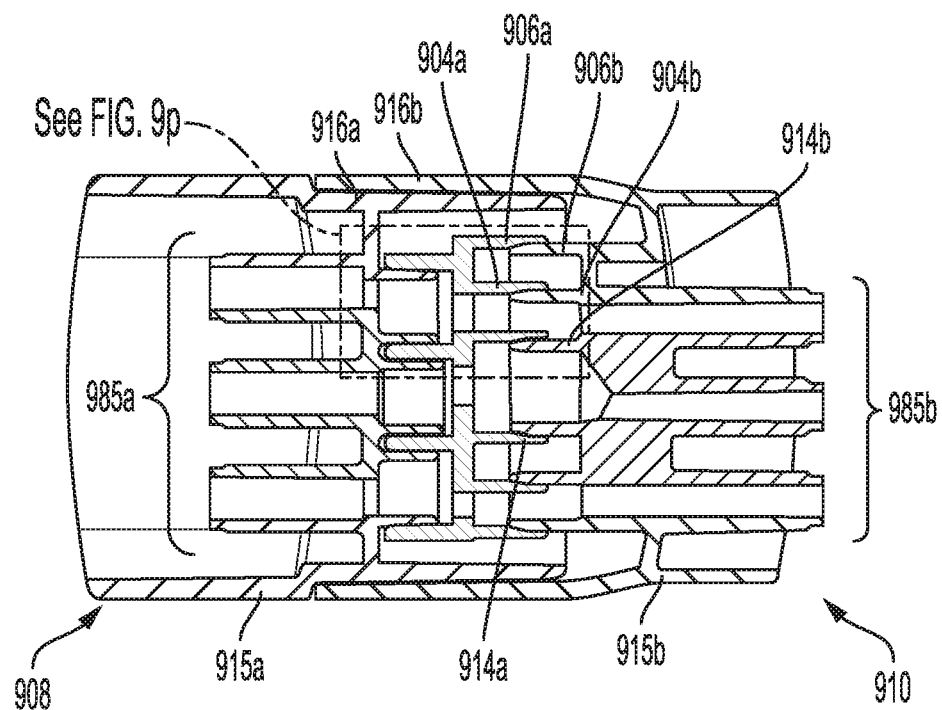
FIG. 9*o* shows an example top down cross-section view of a reversible connector in an engaged position in accordance with aspects of the present disclosure.
Figure 9P:
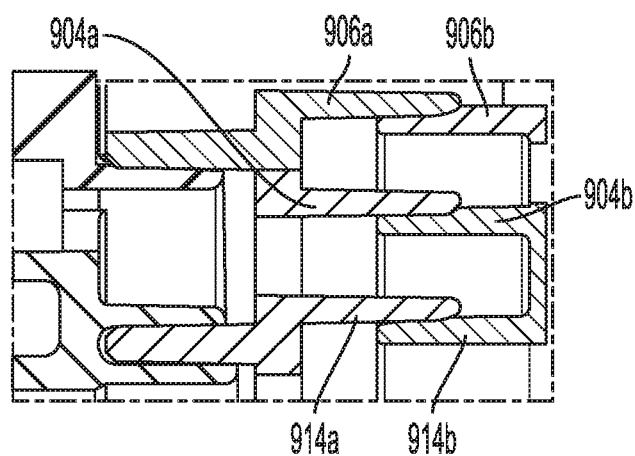
FIG. 9*p* is a magnified view of FIG. 9*o* to show an example of the seal portion engagement of the reversible connector according to aspects of the present disclosure.

As shown in FIGS. 9o and 9p, the aforementioned sealing engagement between the first connector portion 908, second connector portion 910, and/or third connector portion 912 may be a friction fit or interference fit type interface. For example, the outer concentric wall 906a of the first connector portion 908 may slidingly or frictionally engage with an outside surface of the outer concentric wall 906b of the second connector portion 910. For example, the outer concentric wall 906a of the first connector portion 908 may be formed of a material that is more flexible than the outer concentric wall of the second connector portion 910. In the aforementioned example, the outer concentric wall 906a of the first connector portion 908 may have substantially the same or a slightly smaller inner dimension or dimensions than the outer concentric wall 906b of the second connector portion 910. Thus, when the two connectors connected by a user, the outer concentric wall 906a of the first connector portion 908 frictionally engages with the outer concentric wall 906b of the second connector portion 910 and forms a seal therebetween that does not allow for the loss of fluid or allow for only minimal loss of fluid at the interface. Similarly, the intermediate concentric wall 904a of the first connector portion 908 may slidingly or frictionally engage with an outside surface of the intermediate concentric wall 904b of the second connector portion 910. The inner concentric wall 914a of the first connector portion 908 may also sliding or frictionally engage with an outer surface of the inner concentric wall 914b of the second connector portion 910, when the first connector portion 908 is engaged with the second connector portion 910 to form the reversible connector 920 in a first engaged configuration. A close-up of the friction fit or interference fit between the outer concentric wall 906a of the first connector portion 908 and the outer concentric wall 906b of the second connector portion 910, the intermediate concentric wall 904a of the first connector portion and the intermediate concentric wall 904b of the second connector portion 910, and the inner concentric wall 914a of the first connector portion 908 and the inner concentric wall 914b of the second connector portion 910 is shown in FIG. 9p. While the referenced connectors described above are the first connector portion 908 and second connector portion 910, the same aspects may be applicable to the third connector portion 912 and/or the fourth connector or controller-side connector (e.g., controller side connector(s) 941a and/or 941b in FIGS. 9q-9s).

Figure 9Q:
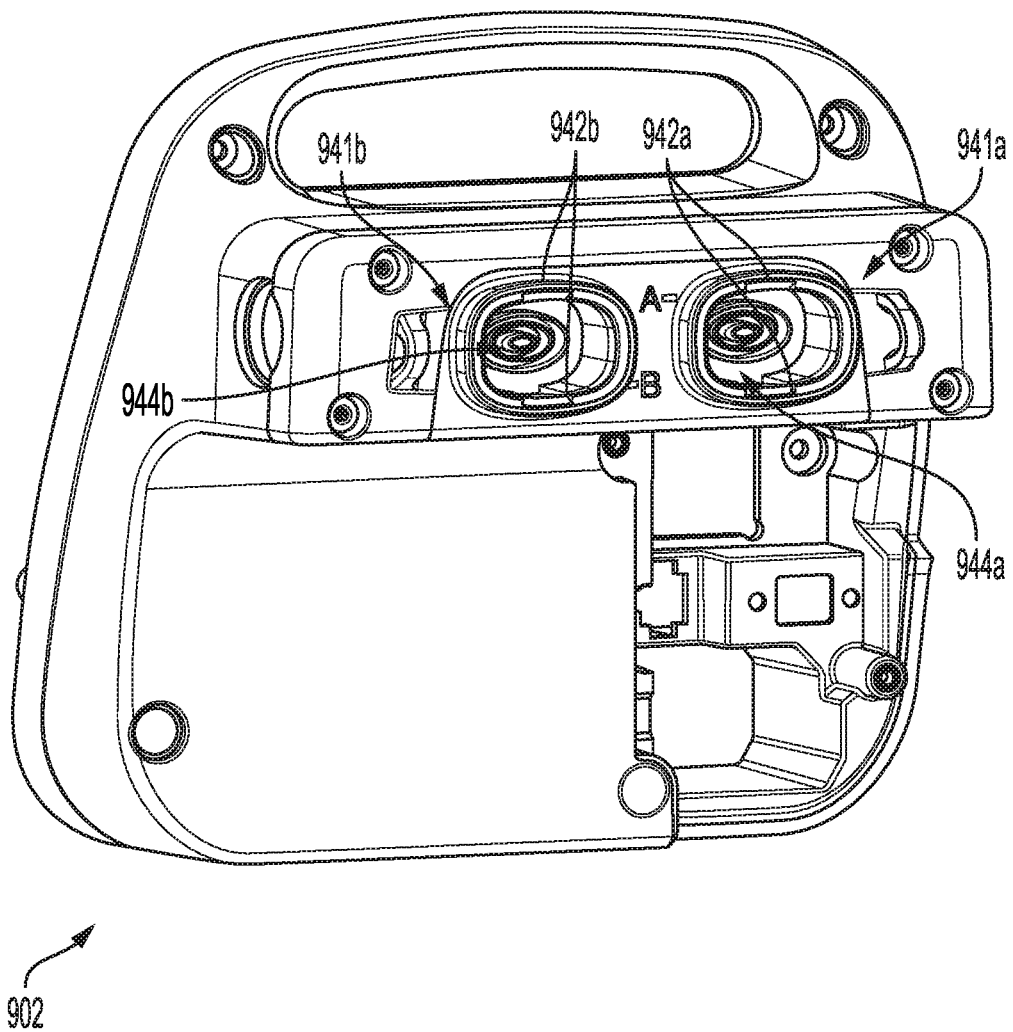
FIG. 9*q* shows a partial perspective view of a controller and controller side connection portions according to aspects of the present disclosure.

FIG. 9q shows a partial view of one example of a controller 902 with two controller side reversible connector portions 941a and 941b. The controller 902 may for example be analogous with controller 102 in FIG. 1. In addition, either one or both of the controller side reversible connector portions may be analogous with any one or a combination of the first connector portion 108a or 108b or second connector portion 110a or 110b in FIG. 1, the first connector portion 308 or second connector portion 310 in FIGS. 3a-3c, the first connector portion 408 or second connector portion 310 in FIGS. 4a-4b, the first connector portion 508 or second connector portion 510 in FIGS. 5a-6, the first connector portion 708 or second connector portion 710 in FIGS. 7a-7b, and/or the first connector portion 808 or second connector portion 810 in FIGS. 8a-8d.

Figure 9R:
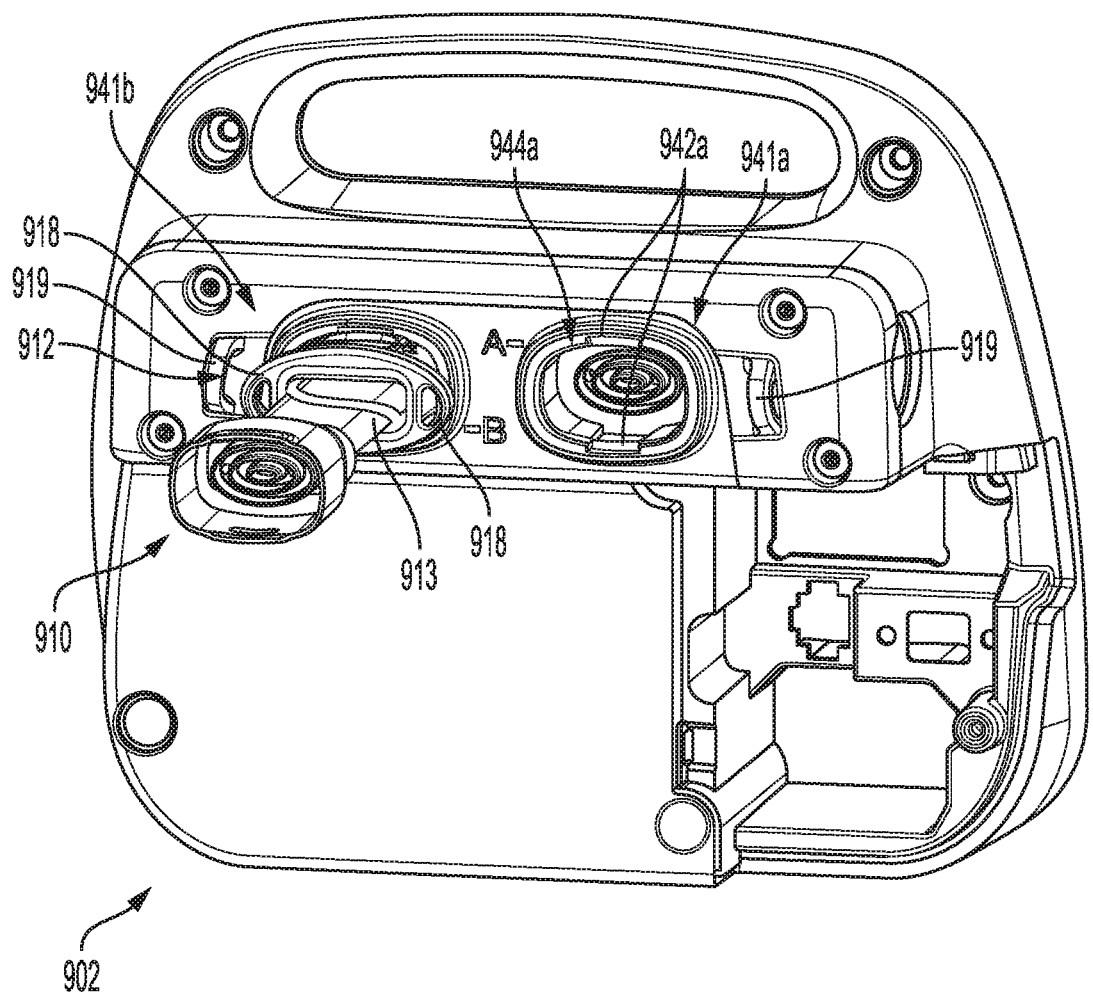
FIG. 9*r* shows a partial perspective view of the controller of FIG. 9*q* having a reversible connector connected thereto according to aspects of the present disclosure.

In the example shown in FIG. 9r, a reversible connector with the third connector portion 912 and the second connector portion 910 with tubing 913 connecting the third connector portion 912 and second connector portion 910. One or both of the controller side reversible connection portions 941a and/or 941b may be configured to sealingly engage with a reversible connector (e.g., a third connector portion 912). Any one of or both of the controller side reversible connection portions 941a and/or 941b may have a locking feature with one or more locking portions 942a and/or 942b. The locking portions 942a and/or 942b may be configured to lockingly engage with locking portion(s) 945c of the third connector portion 912 when the third connector is pressed into the controller side connection portion 941. In one aspect, pressing on the pressing portion(s) 944c (FIG. 9a) of the third connector portion causes the locking portion(s) 945c to disengage from the one or more locking portions 942a and/or 942b of the controller side connection portion 941.

In one aspect, the controller body or controller body connection portion may include a monitor side tie-down portion that corresponds with each monitor side connection portion 941a and/or 941b. The monitor side tie-down portion 919 may be configured to have a portion of a tie or label passed therethrough. In one example, both the monitor side tie-down portion 919 and the one or more tie-down portions 918 of the third connector portion 912 may have a tie or label passed therethrough. Passing a tie through both a third connector tie-down portions 918 and the monitor side tie-down portion 919 may prevent accidental removal of the connector from the monitor. In another example, passing a label though either one of or both of the third connector tie-down portions 918 and the monitor side tie-down portion 919 may for example provide a user or technician with information relating to a patient and or equipment, to name a few non-limiting examples.

Figure 9S:
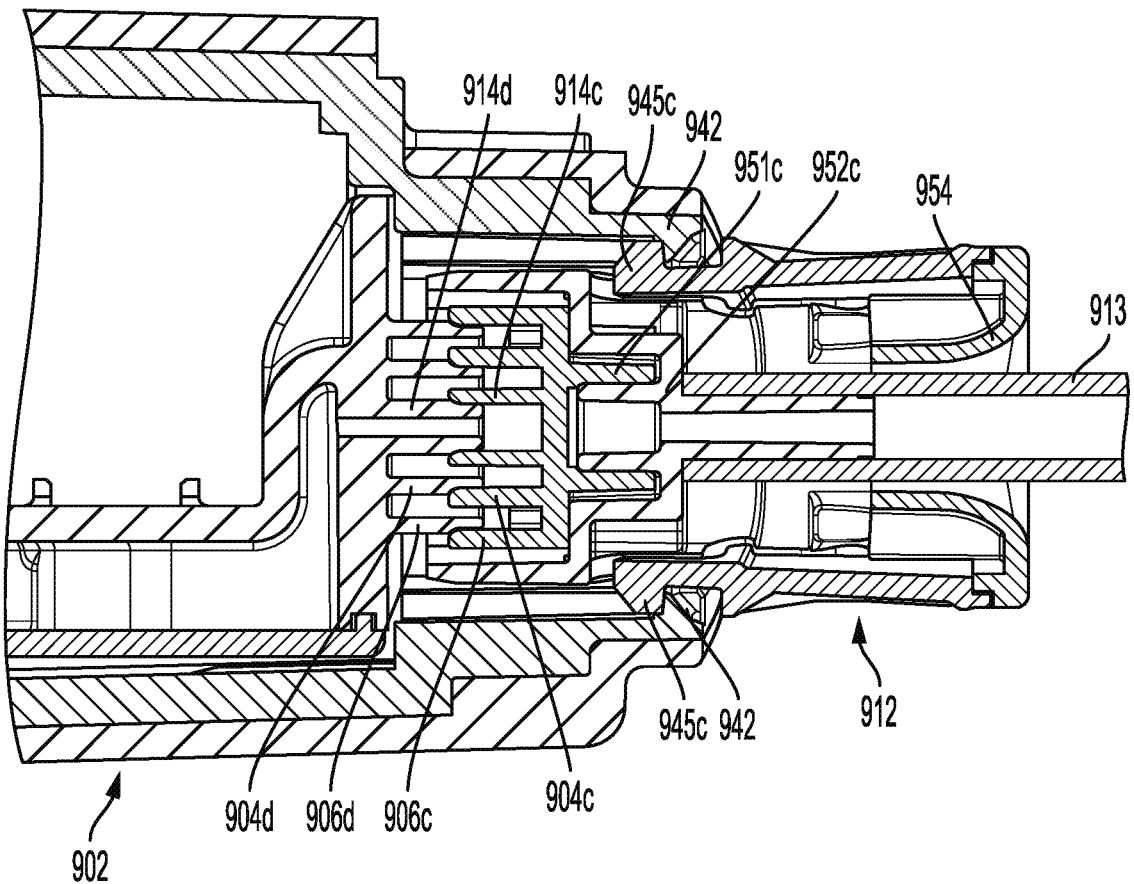
FIG. 9*s* shows a cross-section view of a connection interface between the reversible connector and controller in FIG. 9*r* according to aspects of the present disclosure.

FIG. 9s shows a cross sectional view of the engagement between one of the two controller side reversible connection portions 941a and/or 941b. One of or both of the two controller side reversible connection portions 941a and/or 941b may be alternatively referred to throughout the disclosure as female connects. As mentioned above, either one or both of the controller side reversible connector portions may be analogous with any one or a combination of the first connector portion 108a or 108b or second connector portion 110a or 110b in FIG. 1, the first connector portion 308 or second connector portion 310 in FIGS. 3a-3c, the first connector portion 408 or second connector portion 310 in FIGS. 4a-4b, the first connector portion 508 or second connector portion 510 in FIGS. 5a-6, the first connector portion 708 or second connector portion 710 in FIGS. 7a-7b, and/or the first connector portion 808 or second connector portion 810 in FIGS. 8a-8d. In one example, one or both of the two controller side reversible connection portions may be connected to the controller via a length of tubing. As shown in FIG. 9s the aforementioned sealing engagement between the third connector portion 912 and the controller side reversible connection portion 941 may be a friction fit or interference fit type interface. For example, the outer concentric wall 906c of the third connector portion 912 may slidingly or frictionally engage with an outside surface of the outer concentric wall 906d of the monitor side reversible connector portion 941. The outer concentric wall 906c of the third connector portion 912 may be formed of a material that is more flexible than the outer concentric wall of the controller side reversible connector portion 941. The aforementioned example may be reversed without departing from the scope of the disclosure (e.g., the outer concentric wall 906*d* of the controller side connector portion 941 may be formed of a material that is more flexible than the outer concentric wall 906*c* of the third connector portion 912). In another example, the outer concentric wall 906*c* of the third connector portion 912 may be formed of a material has the same or similar flexibility to the outer concentric wall 906*d* of the controller side reversible connector portion 941. In the aforementioned example, the outer concentric wall 906*c* of the third connector portion 912 may have substantially the same or a slightly smaller inner dimension or dimensions than the outer concentric wall 906*d* of the controller side reversible connection portion 941. Thus, when the two connectors connected by a user, the outer concentric wall 906*c* of the third connector portion 912 frictionally engages with the outer concentric wall 906*d* of the monitor side reversible connection portion 941 and forms a seal therebetween that does not allow for the loss of fluid or allow for only minimal loss of fluid at the interface. Similarly, the intermediate concentric wall 904*c* of the third connector portion 912 may slidingly or frictionally engage with an outside surface of the intermediate concentric wall 904*d* of the monitor side reversible connection portion 941. The inner concentric wall 914*c* of the third connector portion 912 may also sliding or frictionally engage with an outer surface of the inner concentric wall 914*d* of the monitor side reversible connection portion 941, when the third connector portion 912 is engaged with the monitor side reversible connection portion 941 in a first engaged configuration.

Figure 10A:
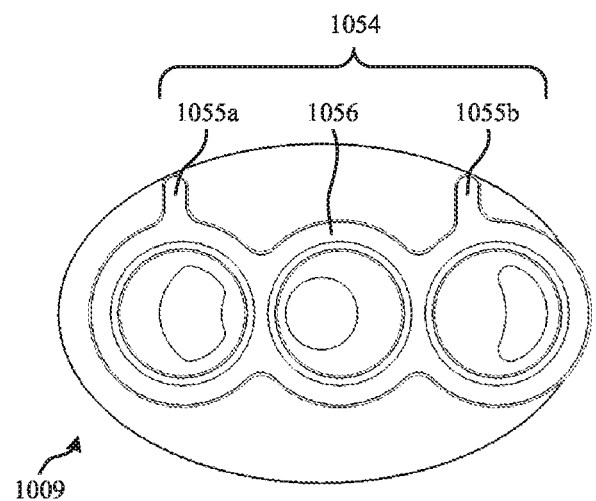
FIG. 10*a* is a rear view of the seal portion according to aspects of the disclosure.
Figure 10B:
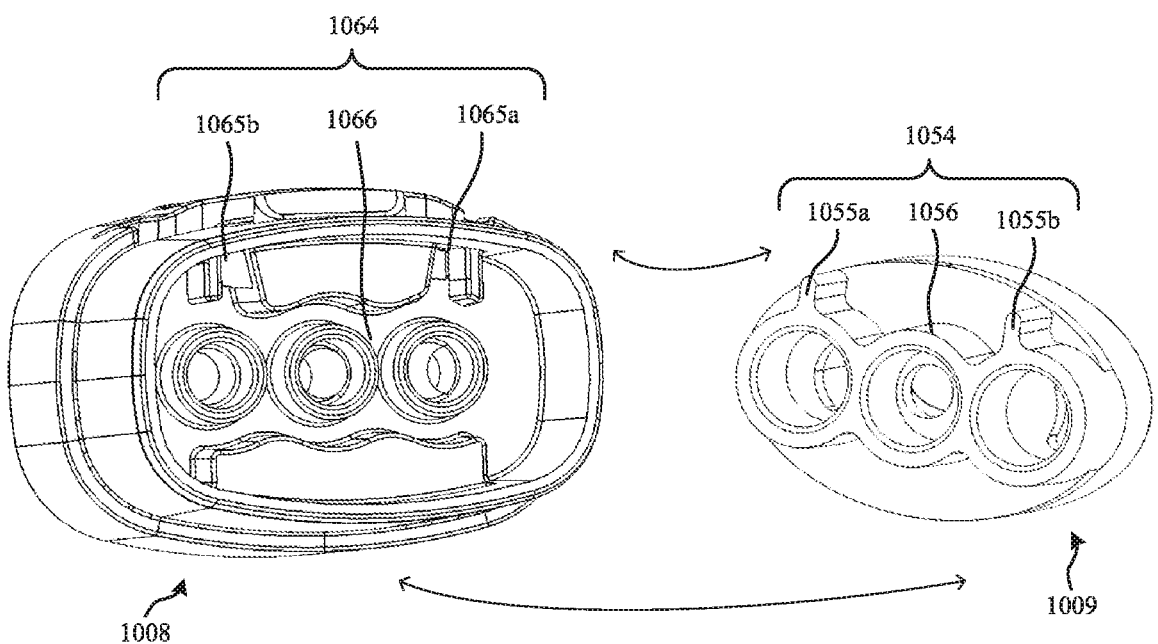
FIG. 10*b* is a rear perspective view of the seal portion of 10*a* and a reversible connector in accordance with aspects of the present disclosure.

Turning now to FIGS. 10*a* and 10*b*, one example back or rear-side of a sealing member 1009 is shown. The sealing member 1009 may be analogous with the sealing member 909*a* shown in FIGS. 9*b*, 9*e*, 9*g*, 9*m*-9*p* and/or sealing member 909*c* shown in FIGS. 9*a*, 9*d*, and 9*j*-9*l*. For example, in addition to the aforementioned features of sealing member(s) 909*a* and/or 909*c*, the sealing member 1009 may include a rear engagement portion 1054 with a rear engagement portion outer seal 1056 and a first alignment horn 1055*a* and second alignment horn 1055*b*. The rear engagement portion 1054 of the back or rear side of the sealing member 1009 may be configured to interface with a connector portion interface 1064 of a connector portion 1008. The connector portion interface 1064 may be analogous with the controller side first connector portion 108*a* and sleeve side reversible second connector portion 110*a* shown in FIG. 1, first connector portion 308 and second connector portion 310 shown in FIGS. 3A-3C, first connec- tor portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the connector portion 1008 may for example be analogous with the sleeve side connection portion 110*a* in FIG. 1. The connector portion interface 1064 may include an outer seal receiving portion 1066 a first horn receiving portion 1065*a* and a second horn receiving portion 1065*b*. Thus, the connector portion interface 1064 of the connector portion 1008 may be configured to engage with rear engagement portion 1054 of the sealing member 1009. For example, the outer seal 1056 of the rear engagement portion 1054 may be a protruding section of the sealing member 1009 configured to be received by the outer seal receiving portion 1066 of the connector portion interface 1064. Similarly, the second or first horn receiving portion 1065*a* may be configured to engage with or otherwise receive the first alignment horn 1055*a* and the second horn receiving portion 1065*b* may be configured to engage with or otherwise receive the second alignment horn 1055*b*. The aforementioned construction ensures that the sealing member 1009 is installed in the proper orientation during manufacturing and/or refurbishing of a reversible connector.

Figure 11A:
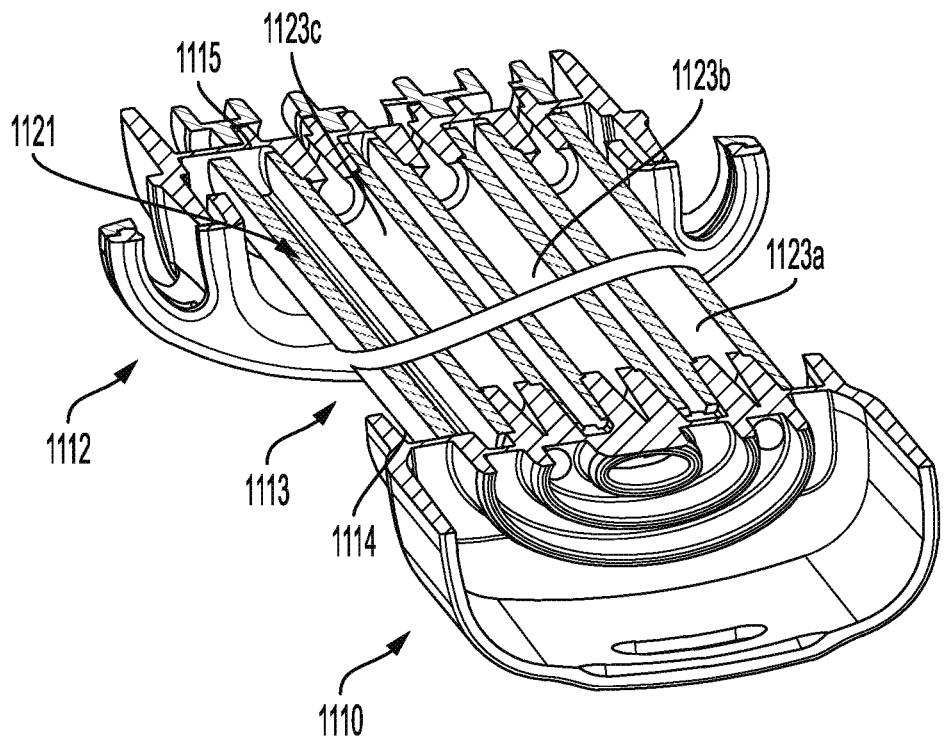
FIG. 11*a* is a perspective cross-section view of a reversible connector and tubing in accordance with aspects of the present disclosure.
Figure 11B:
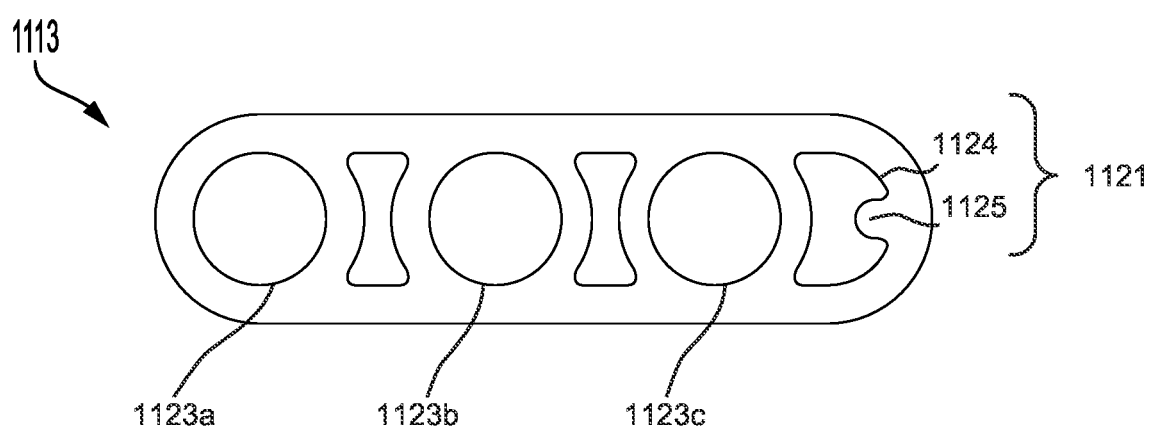
FIG. 11*b* is a front cross-section view of the tubing in FIG. 11*a;*

FIG. 11*a* is a top cross-sectioned view of an example of the reversible connector showing the interaction between tubing 1113 and a first connector portion 1110 and a second connector portion 1112. The first connector portion 1110 and second connector portion 1112 may be analogous to the controller side first connector portion 108*a* and sleeve side reversible second connector portion 110*a* shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1108 may for example be analogous with the sleeve side connection portion 110*a* in FIG. 1. Additionally, the second connector portion 1110 may be analogous with the first reversible connection portion 108*b* and the third connector portion 1112 may be analogous with the second reversible connector portion 110*b*. The first reversible connection portion 1112 may also be analogous with the third connector portion 912 in FIGS. 9*a*, 9*d*, 9*j*, 9*k*, and 9*l* and may be connectable to a controller (e.g., controller 102 in FIG. 1 and/or controller 902 in FIGS. 9*q*-9*s*) and/or may be configured to connect to a controller side reversible connector portion (e.g., controller side reversible first connection portion 108*a* in FIG. 1 and/or controller side reversible connection portions 941*a* and/or 941*b* in FIGS. 9*q*-9*s*).

FIG. 11*a* shows a cross section of tubing 1113 in FIG. 11*a* that may be utilized between a fluid source controlled by a controller and a compression garment in accordance with aspects of the present disclosure. The tubing profile of tubing 1113 may be implemented to create a fluid path between each of the connectors and/or the compression garment/sleeve (e.g., compression garment/sleeve 104 in FIG. 1) and/or a controller (e.g., controller 102 in FIG. 1 and/or controller 902 in FIGS. 9*q*-9*s*). For example, the tubing 1113 may be used as the controller tubing 112*a* and the compression garment tubing 112*b* shown in FIG. 1. The tubing 1113 may also be analogous with tubing 913 in FIGS. 9*a* and 9*r*. The tubing May 1113 may include three separate tubes or tubing passages or conduits 1123*a*, 1123*b*, 1123*c*, which may correspond with and create a fluid path between the controller (e.g., controller 102 in FIG. 1 and/or controller 902 in FIGS. 9*q*-9*s*) and the three inflatable bladders 106*a*, 106*b* and 106*c* of the compression garment 104 (FIG. 1). While three tubes or tubing passages or conduits 1123*a*, 1123*b*, and 1123*c* are shown and three bladders are provided as an example, aspects of the disclosure may include more or less passages that correspond with the number of inflatable bladders. For example, the tubing may include two passages that provide fluid communication to two bladders or may include more than three passages that provide fluid communication to a corresponding number of bladders. For example, the tubing may include 4-6 passages in one example implementation. In some aspects, the tubing 212 may be similar to the tubing described above with respect to FIG. 2*a*, but may additionally include an additional alignment section 1121. The alignment section 1121 may for example include an additional passage or alignment feature that comprises a first alignment portion 1124 and a second alignment portion 1125. One function of the alignment section 1121 may be to ensure that the tubing 1113 is installed in the correct orientation (e.g., not "flipped") with respect to any one of the connectors 1110 and 1112. In one example implementation of the alignment section 1121, the first connector 1110 and second connector 1112 may have a respective first connector alignment section 1114 and second connector alignment section 1115 configured to receive the alignment section 1121 of tubing 1113. In addition to the aforementioned advantages, the aforementioned tubing profile may also improve the aesthetic of the tubing and/or connectors connected thereto by providing a symmetrical appearance at the interface between the tubing 1113 and the first connector portion 1110 and/or second connector portion 1112.

Figure 12A:
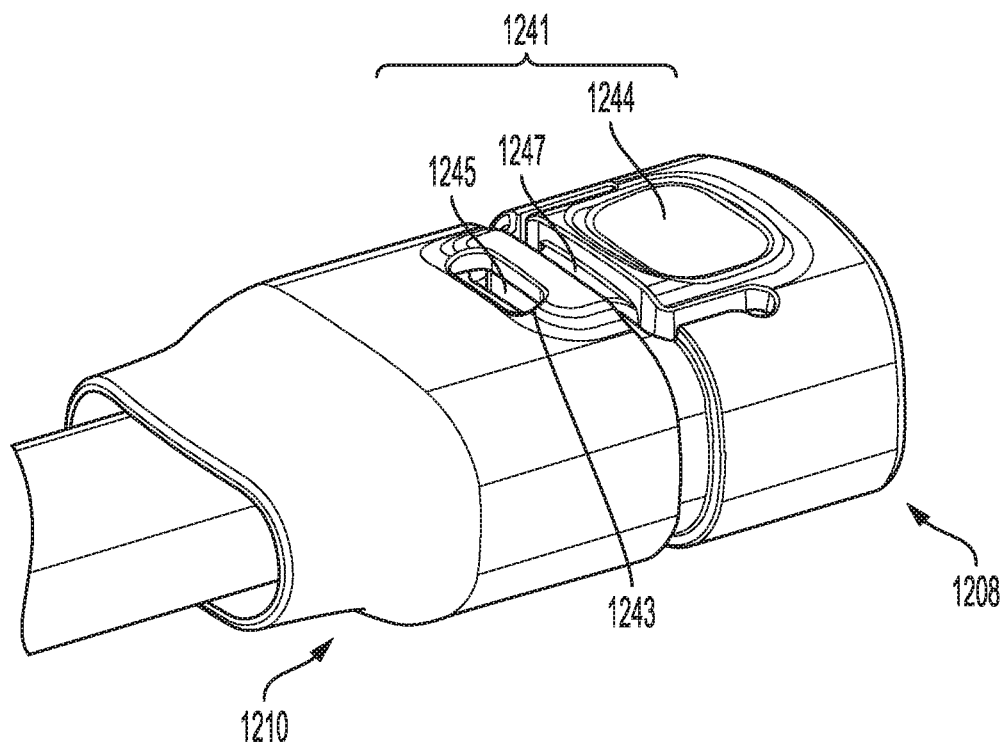
FIGS. 12*a* and 12*b* are perspective views of the reversible connector in a non-engaged position and in a fully engaged position in accordance with aspects of the present disclosure.
Figure 12B:
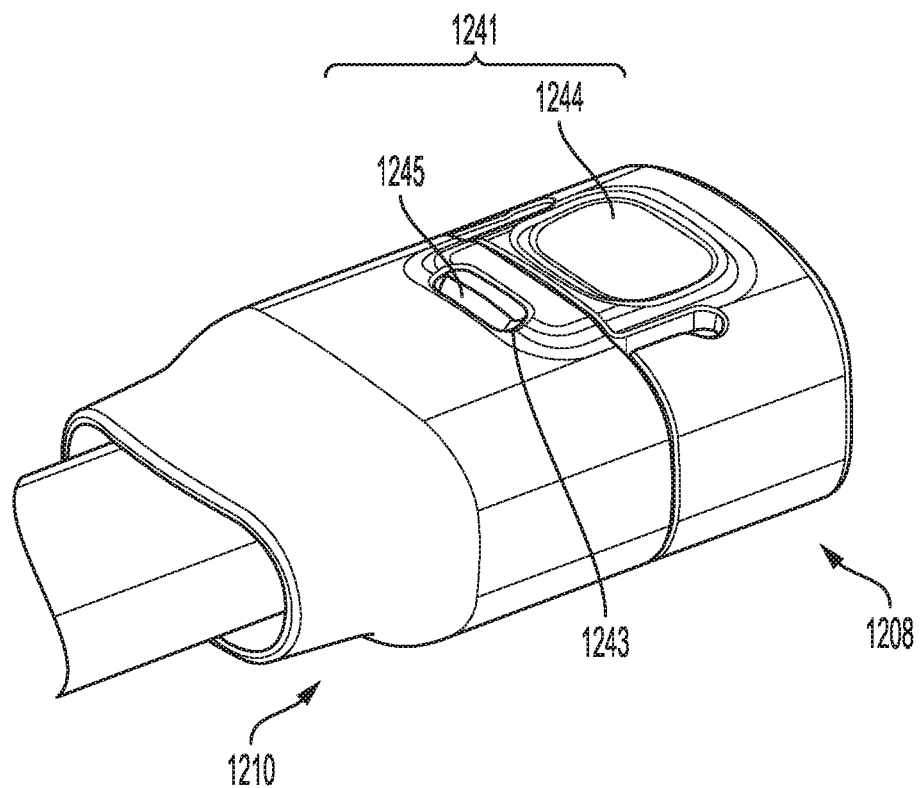

FIGS. 12*a* and 12*b* show examples of locking features with a visual indicator for confirmation that two or more of the aforementioned reversible connector portions are properly connected. A first connector portion 1208 (also interchangeably referred to as first connection portion and/or first connector) and second connector portion 1210 (also interchangeably referred to as second connection portion, second connector and/or second connector) are shown. The first connector portion 1208 and second connector portion 1210 may be analogous to the controller side first connector portion 108*a* and sleeve side reversible second connector portion 110*a* shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1208 may for example be analogous with the sleeve side connection portion 110*a* in FIG. 1. Additionally, the second connector portion 1210 may be analogous with the first reversible connection portion 108*b* and the third connector portion 912 may be analogous with the second reversible connector portion 110*b*. The first reversible connection portion 1208 may also be analogous with the third connector portion 912 in FIGS. 9*a*, 9*d*, 9*j*, 9*k*, and 9*l* and may be connectable to a controller (e.g., controller 102 in FIG. 1 and/or controller 902 in FIGS. 9*q*-9*s*) and/or may be configured to connect to a controller side reversible connector portion (e.g., controller side reversible first connection portion 108*a* in FIG. 1 and/or controller side reversible connection portions 941*a* and/or 941*b* in FIGS. 9*q*-9*s*). The first connector portion 1208 and/or second connector portion 1210 may also be analogous with connector portion 1008 in FIG. 10*b*, 1112 and/or 1110 in FIG. 11*a*.

The locking feature 1241 of the first connector 1208 may include at least one pressing portion 1244 and a locking portion 1245 connected via an elastic or semi-elastic connection portion 1247. Either one of or both the pressing portion 1244 and/or the locking portion 1245 may be biased or otherwise tensioned so that pressing the pressing portion 1244 causes the locking portion 1245 to move into or out of engagement with a locking portion of the second connector 1210. In one example, the pressing portion 1244 and/or the locking portion 1245 may be connected to the first connection portion 1208 via a plastic biasing member or other element configured to plastically deform or deflect when a user presses the pressing portion 1244. The second connector locking feature may for example include an opening or openings 1245 configured to lockingly receive the locking portion 1245 of the first connector portion 1208. The aforementioned locking features may for example cause the first connector portion 1208 to lock into place once the first connector portion 1208 and second connector portion 1210 are connected and in sealing engagement. The first connector portion 1208 and second connector portion 1210 may lock when a user presses the first connector 1208 into the second connector 1210 until the locking portion 1245 is lockingly received within the opening or openings 1243. When a user wishes to remove the first connector portion 1208 from the second connector portion 1210, applying a pressing force to the pressing portion 1244 moves the locking portion 1245 downward and out of locking engagement with the opening or openings 1243 thus allowing a user to separate the first connection portion 1208 from the second connector portion 1210. Any one of the locking features described above may include a visual, tactile, and/or audible indicator to indicate to a user that the connectors are properly connected. For example, as shown in FIG. 12*b*, the locking portion 1245 of the first connector portion 1208 may for example include a visual indicator as a colored, brightly colored, or contrastingly colored feature to provide visual confirmation that the locking portion 1245 of the first connector is fully engaged and lockingly received within the opening 1243 of the second connector portion 1210. Thus the aforementioned visual indicator may provide a user with confirmation that the first connector 1208 is properly connected to the second connector 1210 and that a fluid seal is established between the two connectors. In addition, pressing the first connector portion 1208 into the second connector may cause the locking portion 1245 to be pressed downward thus placing tension against the elastic or semi-elastic connection portion 1247 until the locking portion 1245 is aligned with the opening 1243. Once the locking portion 1245 is aligned with the openings 1243, the locking portion 1245 may spring to a relaxed state which may provide a "snapping" or similar tactile or audible indicator that the first connector 1208 is properly connected to the second connector 1210 and that a fluid seal is established between the two connectors. While locking features are preferred, one of ordinary skill in the art would understand that aspects of the disclosure still provide advantages to connector(s) that include a single locking feature or that do not include any locking features.

Figure 13A:
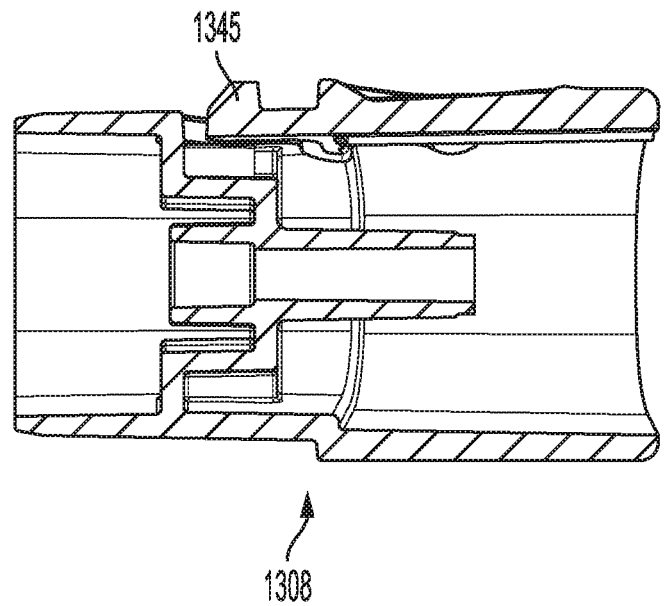
FIG. 13*a* is a cross-section of a first connector portion usable with the reversible connector in accordance with aspects of the present disclosure.
Figure 13B:
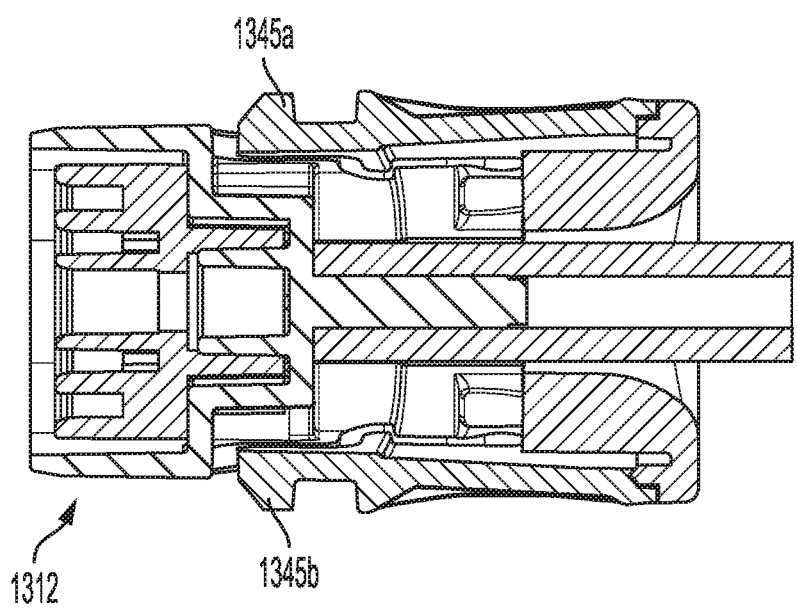
FIG. 13*b* is a cross-section of a third connector portion usable with the reversible connector in accordance with aspects of the present disclosure.

As shown in FIGS. 13*a* and 13*b*, any one of the aforementioned connectors may include a first or top locking feature 1345, a second or bottom locking feature 1345*b* or both top and bottom locking features 1345*a* and 1345*b*. A first connector portion 1308 (also interchangeably referred to as first reversible connection portion and/or first connection portion) and a third connector portion 1312 are shown in FIGS. 13*a* and 13*b* as examples. The first connector portion 1308 and third connector portion 1312 may be analogous to the controller side first connector portion 108*a* and sleeve side reversible second connector portion 110*a* shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1308 may for example be analogous with the sleeve side connection portion 110*a* in FIG. 1. Additionally, the third connector portion 1312 may be analogous with the first reversible connection portion 108*b* and the third connector portion 1312 may be analogous with the second reversible connector portion 110b. The first reversible connection portion 1308 may also be analogous with the third connector portion 912 in FIGS. 9a, 9d, 9j, 9k, and 9l and may be connectable to a controller (e.g., controller 102 in FIG. 1 and/or controller 902 in FIGS. 9q-9s) and/or may be configured to connect to a controller side reversible connector portion (e.g., controller side reversible first connection portion 108a in FIG. 1 and/or controller side reversible connection portions 941a and/or 941b in FIGS. 9q-9s). The first connector portion 1308 or third connector portion 1312 may also be analogous with connector portion 1008 in FIG. 10b, 1112 and/or 1110 in FIG. 11a and/or 1208 or 1210 in FIGS. 12A and 12B.

In one example, when a connection portion, such as third connector portion 1312 is intended to be connected to a surface mount or rigid connector (e.g., a controller side reversible connection portion or portion(s) 941a and/or 941b in FIGS. 9q-9s) the third connector portion 1312 may include both a first or top feature 1345a and a second or bottom feature 1345b so that a user may easily install the third connector portion in either orientation. In some examples, such as the first connection portion 1308 shown in FIG. 13a, the connection portion may be intended to be connected to a non-fixed or surface mount connector (e.g., a sleeve side reversible connector portion 110a in FIG. 1) that is connected to additional tubing. In such a case, it may only be necessary to include a first or top locking feature 1345 on the connection portions since the two connection portions that are to be connected can easily be flipped or otherwise aligned before connection.

Figure 14A:
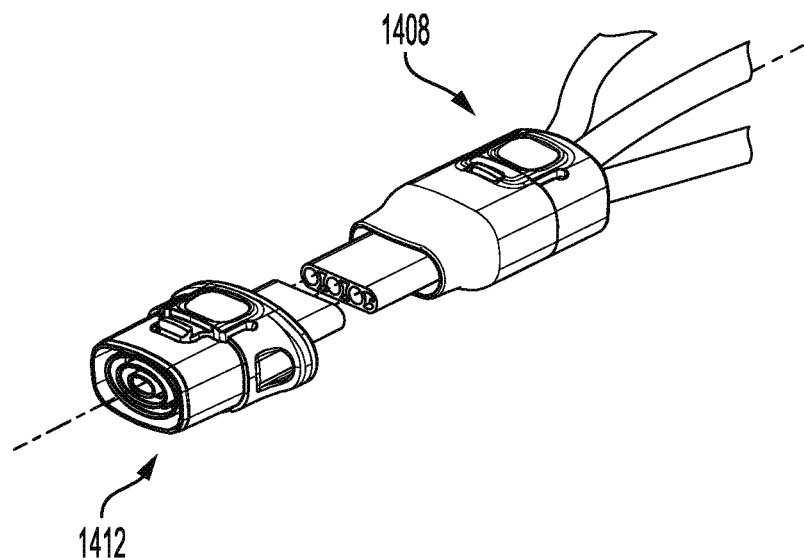
FIG. 14*a* shows a perspective view of an example extension in accordance with aspects of the present disclosure.
Figure 14B:
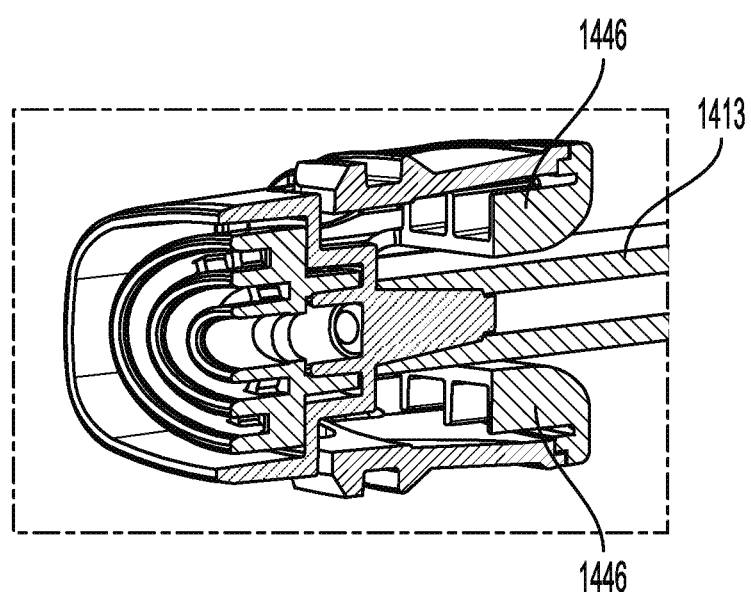
FIG. 14*b* shows a perspective cross-section view showing details of the connection portion of the extension in FIG. 14*a* in accordance with aspects of the present disclosure.

FIGS. 14a and 14b show examples of a strain relief portion 1446 that is usable with any of the connection portions described throughout the disclosure. As an example, the strain relief portion 1446 is shown with a first connector portion 1408 and a third connector portion 1412. The first connector portion 1408 and third connector portion 1412 may be analogous to the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1408 may for example be analogous with the sleeve side connection portion 110a in FIG. 1. Additionally, the third connector portion 1412 may be analogous with the first reversible connection portion 108b and the third connector portion 912 may be analogous with the second reversible connector portion 110b. The first reversible connection portion 1410 may also be analogous with the third connector portion 912 in FIGS. 9a, 9d, 9j, 9k, and 9l and may be connectable to a controller (e.g., controller 102 in FIG. 1 and/or controller 902 in FIGS. 9q-9s) and/or may be configured to connect to a controller side reversible connector portion (e.g., controller side reversible first connection portion 108a in FIG. 1 and/or controller side reversible connection portions 941a and/or 941b in FIGS. 9q-9s). The first connector portion 1408 and/or third connector portion 1412 may also be analogous with connector portion 1008 in FIG. 10b, 1112 and/or 1110 in FIG. 11a, 1208 or 1210 in FIGS. 12a and 12b and 1308 and 1312 in FIGS. 13a and 13b.

The strain relief portion 1446 may for example include an annular radiused section that is configured to control movement and prevent kinking or other potentially damaging bending of tubing 1413. In one example, the strain relief portion 1446 may be molded, additively manufactured, and/or machined from any one or a combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene Terephthalate (PBT), Polyetheretherketone (PEEK), PEI (Ultem), PET, PETG, PMMA (Acrylic), POM (Acetal/Delrin), PP (Polypropylene), Polyphenylene Ether (PPE), Polyphenylene Sulfide (PPS), Polystyrene (PS), PTFE (Teflon); High-density polyethylene (HDPE), Liquid Crystal Polymer (LCP), Low-density Polyethylene (LLDPE), Linear Low-density Polyethylene (LLDPE), Ultra-high-molecular-weight Polyethylene (UHMW) or similar. In a preferred aspect, the outer housing 915a is an injection molded Acrylonitrile Butadiene Styrene (ABS). In some aspects, the strain relief portion 1446 may be formed of a lower-durometer material. For example, the strain relief portion 1446 may be any one or a combination of Liquid Silicone Rubber (LSR), polyvinyl chloride (PVC), Thermoplastic Elastomer (TPE), Thermoplastic Vulcanisates (TPV), Closed Cell PU Foam, Open Cell PU Foam, Closed cell PE Foam and/or open cell PE Foam or similar.

The strain relief portion 1446 allows for flexibility between the tubing 1413 and the third connector portion 1412, while preventing kinking of the tubing which may block fluid flow and/or cause damage to the tubing 1413.

Figure 15A:
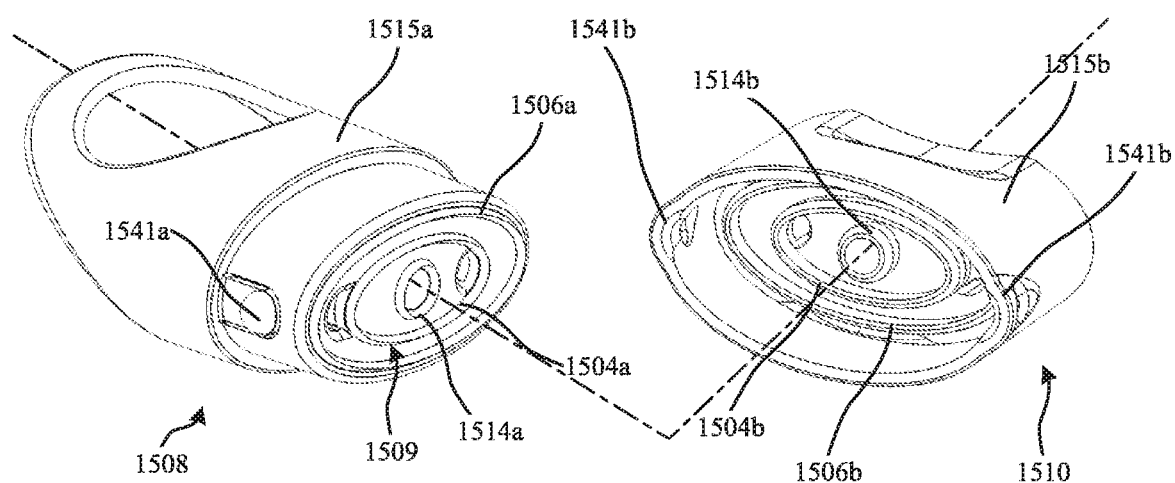
FIG. 15*a* shows a perspective view of a reversible connector in a non-engaged position in accordance with aspects of the present disclosure.
Figure 15B:
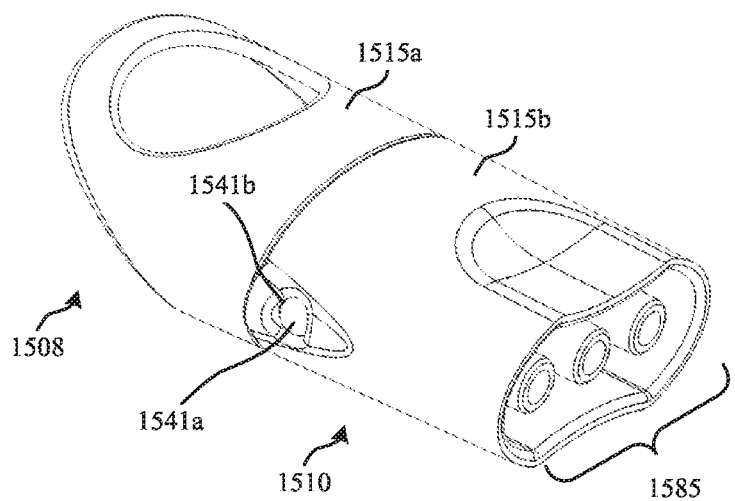
FIG. 15*b* shows a perspective view the reversible connector of FIG. 15*a* in an engaged position in accordance with aspects of the present disclosure.
Figure 15C:
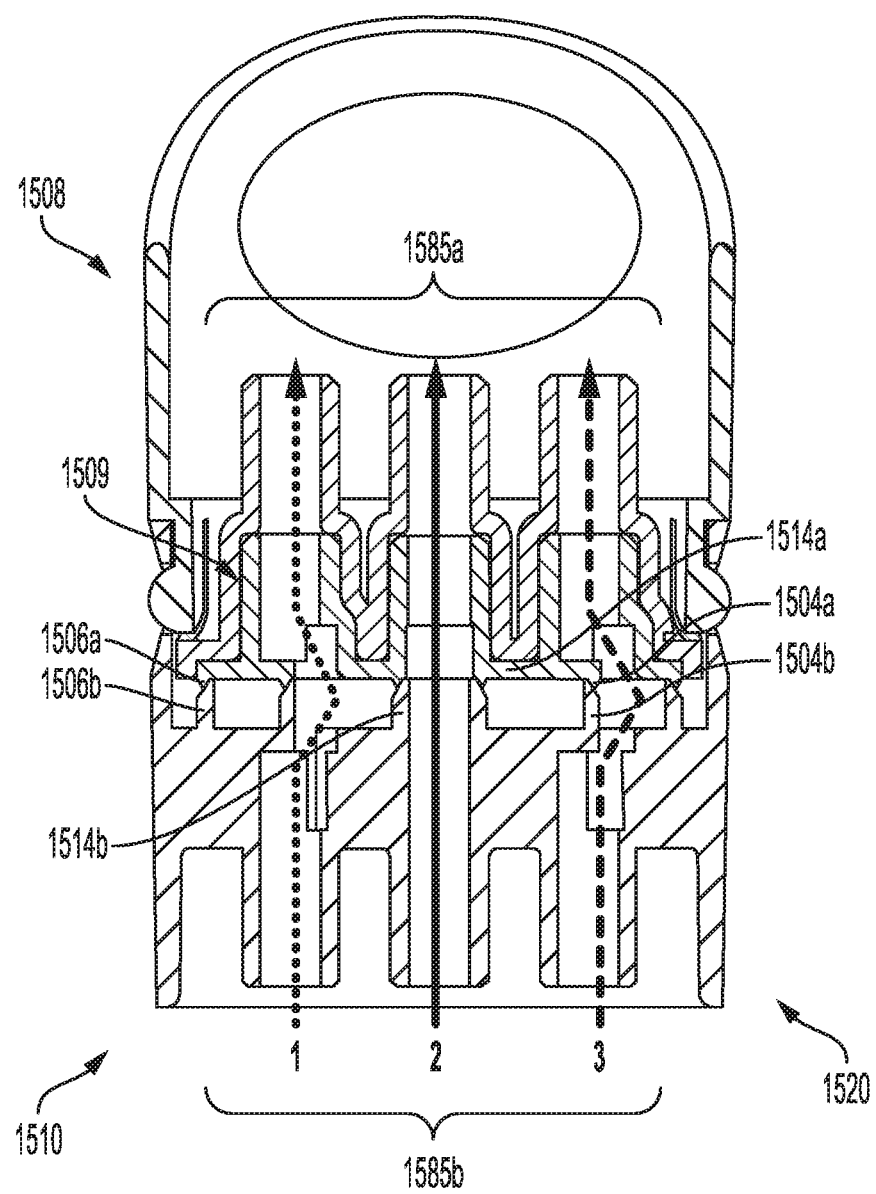
FIG. 15*c* shows an example top down cross-section view of the reversible connector of FIGS. 15*a* and 15*b* in an engaged position and fluid flow connection channels showing the direction of the fluid flow from the fluid source of the controller to the compression garment, in accordance with aspects of the present disclosure.
Figure 15D:
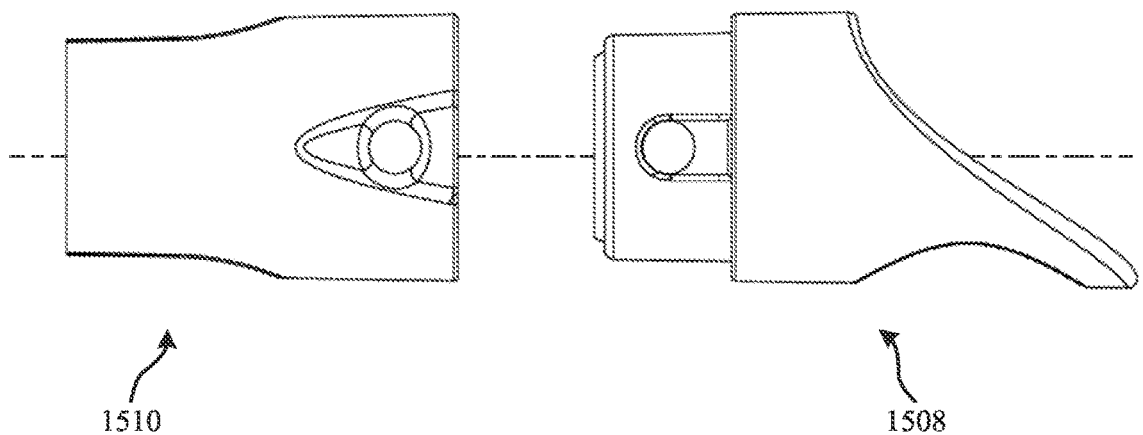
FIG. 15*d* shows an example right side view of the reversible connector of FIGS. 15*a* and 15*b* in accordance with aspects of the present disclosure.
Figure 15E:
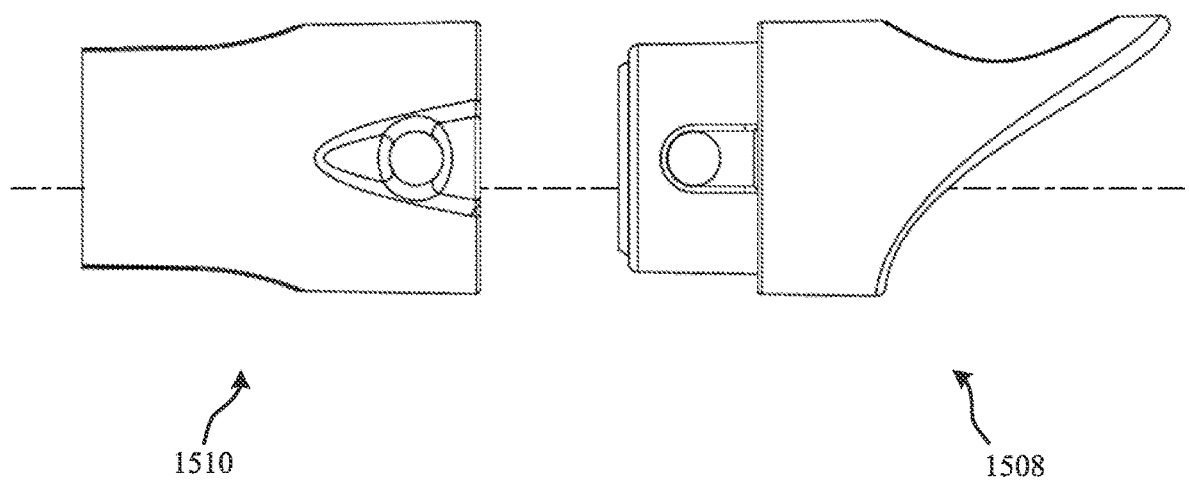
FIG. 15*e* shows an example left side view of the reversible connector of FIGS. 15*a*, 15*b*, and 15*d* in accordance with aspects of the disclosure.
Figure 15F:
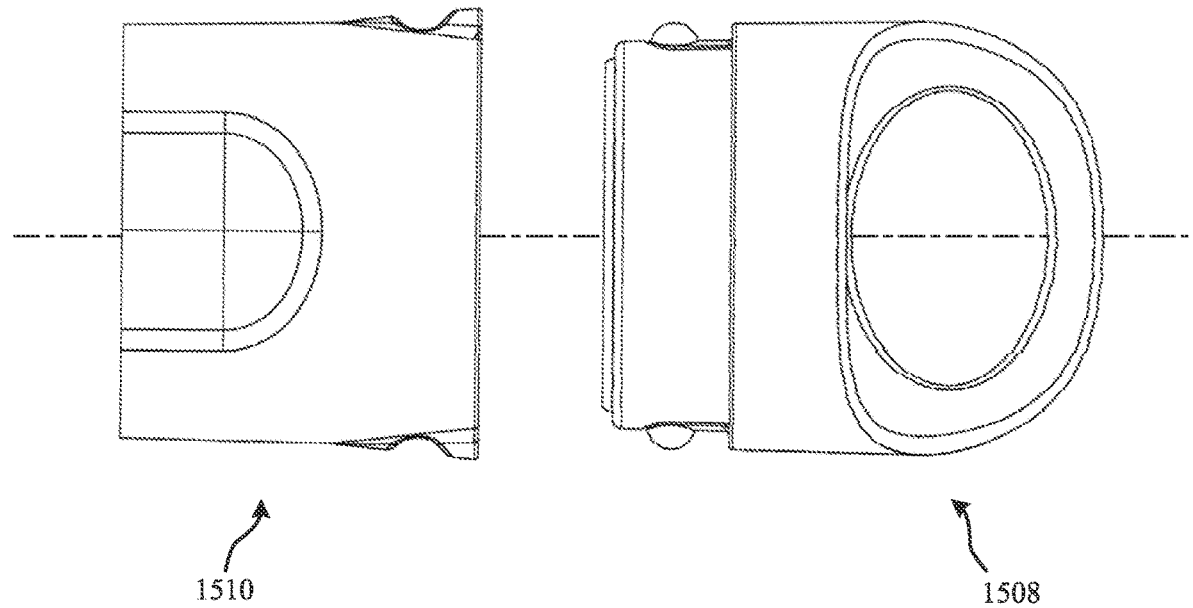
FIG. 15*f* shows an example top view of the reversible connector of FIGS. 15*a*, 15*b*, 15*d*, and 15*e* in accordance with aspects of the disclosure.
Figure 15G:
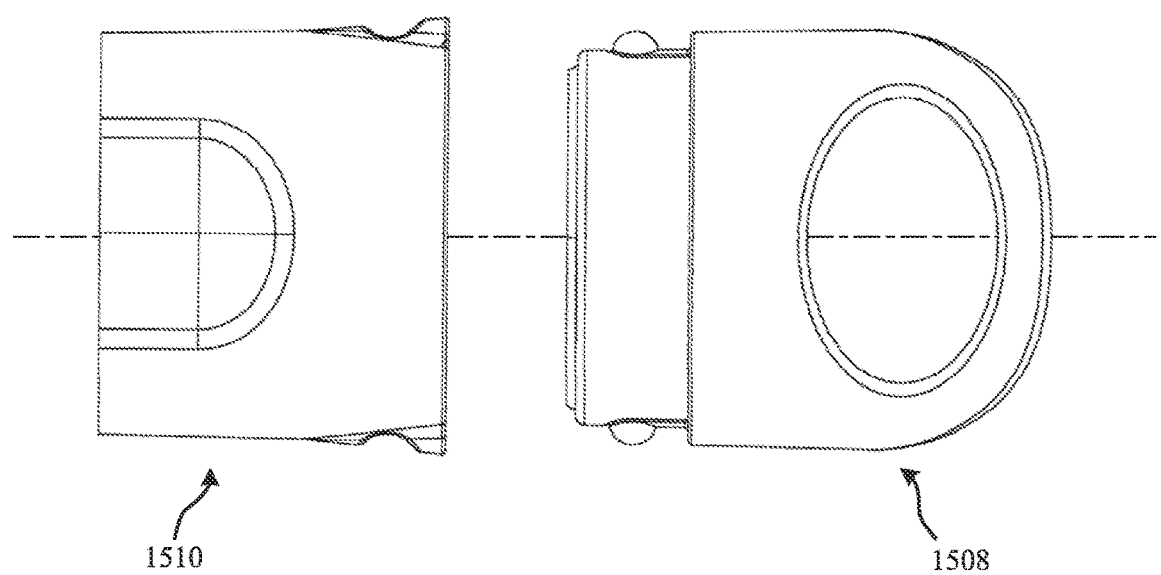
FIG. 15*g* shows an example bottom view of the reversible connector of FIGS. 15*a*, 15*b*, and 15*d*-15*f* in accordance with aspects of the disclosure.
Figure 15H:
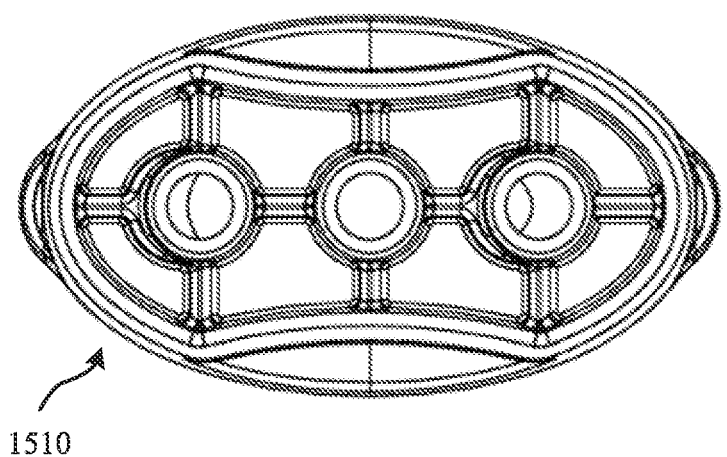
FIG. 15*h* shows a rear view of the second connector portion of the reversible connector of FIGS. 15*a*, 15*b*, and 15*d*-15*g* in accordance with aspects of the disclosure.
Figure 15I:
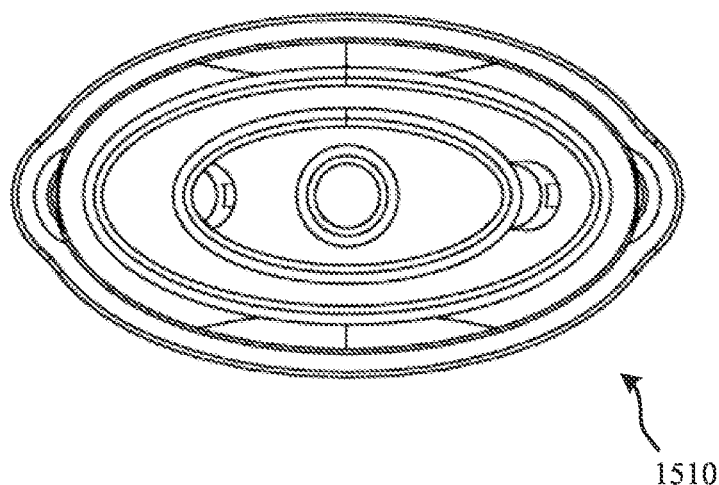
FIG. 15*i* shows a front view of the second connector portion of the reversible connector of FIGS. 15*a*, 15*b*, 15*d*-15*h* in accordance with aspects of the disclosure.
Figure 15J:
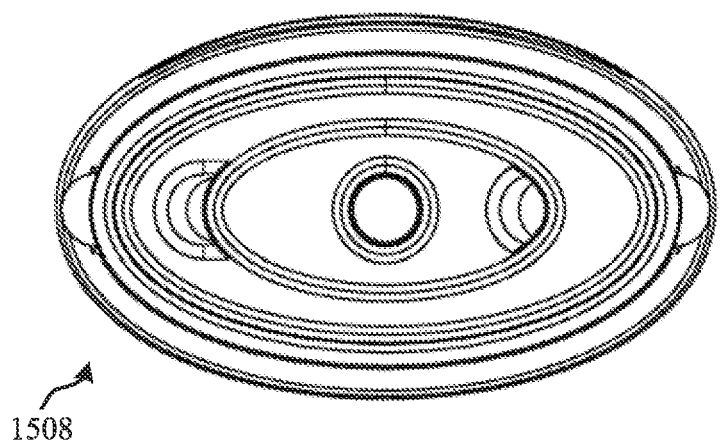
FIG. 15*j* shows a front view of the first connector portion of the reversible connector of FIGS. 15*a*, 15*b*, and 15*d*-15*g* in accordance with aspects of the disclosure.
Figure 15K:
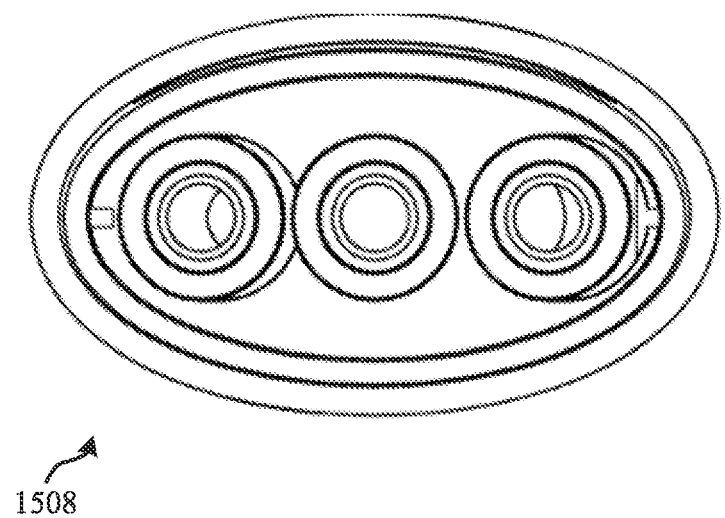
FIG. 15*k* shows a rear view of the second connector portion of the reversible connector portion of FIGS. 15*a*, 15*b*, 15*d*-15*g* and 15*j* in accordance with aspects of the disclosure.

FIGS. 15a, 15b, and 15c show example connector portions usable with aspects of the current disclosure. FIGS. 15a, 15b, and 15c show a first connector portion 1508 (also interchangeably referred to as first connector and/or first reversible connection portion) and a second connector portion 1510 (also interchangeably referred to as second connector) which may alternatively be referred to as a male connector and female connector, respectively. The first connector portion 1508 and second connector portion 1510 may be analogous to or include features of the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1408 may for example be analogous with or include features of the sleeve side connection portion 110a in FIG. 1. Additionally, the second connector portion 1510 may be analogous with or include features of the first reversible connection portion 108b and the third connector portion 912 may be analogous with or include features of the second reversible connector portion 110b. The first reversible connection portion 1508 may also be analogous with or include features of the third connector portion 912 in FIGS. 9a, 9d, 9j, 9k, and 9l and may be connectable to a controller (e.g., controller 102 in FIG. 1 and/or controller 902 in FIGS. 9q-9s) and/or may be configured to connect to a controller side reversible connector portion (e.g., controller side reversible first connection portion 108a in FIG. 1 and/or controller side reversible connection portions 941a and/or 941b in FIGS. 9q-9s). The first connector portion 1508 and/or second connector portion 1510 may also be analogous with or include features of the connector portion 1008 in FIG. 10b, 1112 and/or 1110 in FIG. 11a, 1208 or 1210 in FIGS. 12a and 12b, 1308 and 1312 in FIGS. 13a and 13b, and 1408 and 1412 in FIGS. 14a and 14b.

As shown in FIG. 15a, the first connector portion 1508 may include a first connector outer housing 1515a. The outer housing 1515a may be a separate component from the sealing member 1509 (e.g. similar to the aspects describe in FIGS. 9f and 9g). Turning to FIG. 15c, the sealing member 1509 may be a single unitary structure and may include the outer concentric wall 1506a, intermediate concentric wall 1504a, and inner concentric wall 1514a. The inner concentric wall 1514a may be positioned within the intermediate concentric wall 1504a, and the intermediate concentric wall 1504a may be positioned within the outer concentric wall 1506a in the first connector portion 1508. The sealing member 1509a may be formed of a flexible or semi-flexible material. The first connector outer housing 1515a may for example be formed of a rigid or semi-rigid material. In one example, the sealing member may be molded, additively manufactured, extruded, and/or machined from any one or a combination of Liquid Silicone Rubber (LSR), polyvinyl chloride (PVC), Thermoplastic Elastomer (TPE), Thermoplastic Vulcanisates (TPV), Closed Cell PU Foam, Open Cell PU Foam, Closed cell PE Foam and/or open cell PE Foam or similar. For example, the outer housing 1515a may be molded, additively manufactured, and/or machined from any one or combination of polyvinyl chloride (PVC), polyurethane, Acrylonitrile Butadiene Styrene (ABS) or similar.

Referring now to FIGS. 15a and 15b, the second connector portion 1510 may include a second connector outer housing 1515b, an outer concentric wall 1506b, an intermediate concentric wall 1504b and an inner concentric wall 1514b. The inner concentric wall 1514b may be positioned within the intermediate concentric wall 1504b and the intermediate concentric wall 1504b may be positioned within the outer concentric wall 1506b of the second connector portion 1510. In one example implementation, the second connector outer housing 1515b, the outer concentric wall 1506b, an intermediate concentric wall 1504b and an inner concentric wall 1514b may be formed as a unitary component. In one example, the second connector outer housing 1515b, outer concentric wall 1506b, intermediate concentric wall 1504b, and inner concentric wall 1514b may for example be formed of a rigid or semi-rigid material. For example, the second connector outer housing 1515b, outer concentric wall 1506b, intermediate concentric wall 1504b, and inner concentric wall 1514b may be molded, additively manufactured, extruded, and/or machined from any one or combination of Acrylonitrile Butadiene Styrene (ABS), Polycarbonate (PC), Polyvinyl Chloride (PVC), Nylon (PA), Polyurethane (PU), ABS-Like Resin, PC-Like Resin, Polybutylene terephthalate (PBT), polyetheretherketone (PEEK), PEI (Ultem), PET, PETG, PMMA (Acrylic), POM (Acetal/Delrin), PP (Polypropylene), Polyphenylene Ether (PPE), Polyphenylene sulfide (PPS), Polystyrene (PS), PTFE (Teflon); High-density polyethylene (HDPE), Liquid crystal polymer (LCP), low-density polyethylene (LLDPE), Linear low-density polyethylene (LLDPE), Ultra-high-molecular-weight polyethylene (UHMW) or similar. In a preferred aspect, the second connector outer housing 1515b, outer concentric wall 1506b, intermediate concentric wall 1504b, and inner concentric wall 1514b are injection molded Acrylonitrile Butadiene Styrene (ABS).

Turning now to FIG. 15c, examples of fluid paths are described below. The first connector portion 1508 may have a tubing connection section 1585a and the second connector portion 1510 may have a tubing connection section 1585b. The first connector portion 1608 may have a tubing connection portion 1685 which may be removably or permanently connectable to tubing 112b, 112c, and/or 112a in FIG. 1, tubing 212 or 213 in FIGS. 2a and 2b, tubing 422a-422c in FIGS. 4a-4b, tubing 722a-722c in FIGS. 7a-7b, tubing 913 and/or 942 in FIGS. 9a and 9r, for example. In some aspects, the outer concentric wall 1506a, the intermediate concentric wall 1504a and the inner concentric wall 1514a of the first connector portion 1508 may be adapted (i.e., sized) to engage with the outer concentric wall 1506b, the intermediate concentric wall 1504b and the inner concentric wall 1514b of the second connector portion 1510 shown in FIG. 15c to form the reversible connector 1520 in an engaged configuration. The aforementioned configuration allows the first connector portion 1508 and the second connector portion 1510 to be connected in a first configuration (e.g., as shown in FIG. 15c) to follow a first fluid flow channel or a second engaged configuration (e.g., a "reversed" configuration) to follow a second fluid flow channel within the connector without changing the order of the path of fluid communication of the three separate fluid paths (e.g., paths 1, 2, and 3). With the connection "reversed" (e.g., one of the first connector 1508 or the second connector 1510 flipped 180 degrees), the fluid paths 1, 2, and 3 of the first connector 1508 and the second connector 1510 are still matched due to concentric wall arrangement described above.

As shown in FIGS. 15a and 15b, the first connector portion 1508 and the second connector portions 1510 may have a respective first connector engagement portion 1516a and a second connector engagement portion 1516b. The first connector engagement portion 1516a may be configured to fit within the second connector engagement portion 1516b. The engagement between the first connector engagement portion 1516a and the second connector engagement portion 1516b may for example function as a guide for connection of the first connector portion 1508 to the second connector portion 1510.

In one example, the first connector portion 1508 may have one or more locking features 1541a (one locking feature 1541a hidden from view in FIG. 15a) (also interchangeably referred to as locking portion) that are configured to lockingly engage with one or more locking features 1541b (also interchangeably referred to as locking portion) of the second connector portion. In one example, the one or more locking features 1541b of the second connector portion may be openings that are dimensioned to receive respective ones of the locking features 1541a of the first connector portion 1508. In one aspect the locking features 1541a and 1541b of the first connection portion and the second connector portion may include features described in FIGS. 12a-13b above. In the examples shown, the locking feature 1541a of the first connector portion 1508 includes at least one pressing portion. The pressing portion of the locking feature 1541a of the first connector 1508 may be biased or otherwise tensioned so that pressing the pressing portion causes the locking portion 1541a to move into or out of engagement with a locking portion 1541b of the second connector 1510. In one example, the pressing portion or locking portion 1541a of the first connector 1508 may be connected to the first connection portion via plastic biasing member or other element configured to plastically deform or deflect when a user presses the locking portion. The second connector locking feature may for example include an opening or openings 1541b configured to lockingly receive the locking portion 1541a of the first connector portion 1508. When a user wishes to remove the first connector portion 1908 from the second connector portion 1910, applying a pressing force to the pressing portion of the locking portion 1541*a* moves the locking portion 1541*a* downward and out of locking engagement with the opening or openings of the locking portion 1541*b* of the second connector portion thus allowing a user to separate the first connector portion 1508 from the second connector portion 1510. Any one of the locking features described above may include a visual, tactile, and/or audible indicator to indicate to a user that the connectors are properly connected. One example of a visual indicator is described further with respect to FIGS. 12*a* and 12*b* above.

Additional views of the first connector portion 1508 and the second connector portion 1510 of the reversible connector are shown in FIGS. 15*d*-15*k*.

FIGS. 16*a*-16*d* show example connector portions usable with aspects of the current disclosure. FIGS. 16*a*, 16*b*, 16*c*, and 16*d* show a first connector portion 1608 (also interchangeably referred to as first reversible connection portion) and a second connector portion 1610 which may alternatively be referred to as a male connector and female connector, respectively. The first connector portion 1608 and second connector portion 1610 may be analogous to or include features of the controller side first connector portion 108*a* and sleeve side reversible second connector portion 110*a* shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1608 may for example be analogous with or include features of the sleeve side connection portion 110*a* in FIG. 1. Additionally, the second connector portion 1610 may be analogous with or include features of the first reversible connection portion 108*b* or may be analogous with or include features of the second reversible connector portion 110*b* in FIG. 1. The first reversible connection portion 1608 may also be analogous with or include features of the third connector portion 912 in FIGS. 9*a*, 9*d*, 9*j*, 9*k*, and 9*l* and may be 1585*a* portion 108*a* in FIG. 1 and/or controller side reversible connection portions 941*a* and/or 941*b* in FIGS. 9*q*-9*s*). The first connector portion 1608 and/or second connector portion 1610 may also be analogous with or include features of the connector portion 1008 in FIG. 10*b*, 1112 and/or 1110 in FIG. 11*a*, 1208 or 1210 in FIGS. 12*a* and 12*b*, 1308, 1312 in FIGS. 13*a* and 13*b*, 1408 and 1412 in FIGS. 14*a* and 14*b*, and 1508 or 1510 in FIGS. 15*a*-15*c*. The first connector portion 1608 may have a tubing connection portion 1685*a* and the second connector portion may have a tubing connection portion 1685*b*. The tubing connection portions 1685*a* and/or 1685*b* may be removably or permanently connectable to tubing 112*b*, 112*c*, and/or 112*a* in FIG. 1, tubing 212 or 213 in FIGS. 2*a* and 2*b*, tubing 422*a*-422*c* in FIGS. 4*a*-4*b*, tubing 722*a*-722*c* in FIGS. 7*a*-7*b*, tubing 913 and/or 942 in FIGS. 9*a* and 9*r*, for example. The first connector portion 1608 may for example include a main body portion 1615*a*. The first connector portion 1608 may further include a first sealing portion 1642*a*, a second sealing portion 1642*b* and/or a third sealing portion 1642*c*. Each one of the first sealing portion 1642*a*, second sealing portion 1642*b* and/or third sealing portion 1642*c* may for example be comprised of a seal (e.g., an o-ring or other flexible seal) contained within a respective channel in the main body portion 1615*a* of the first connector portion 1608.

Figure 16A:
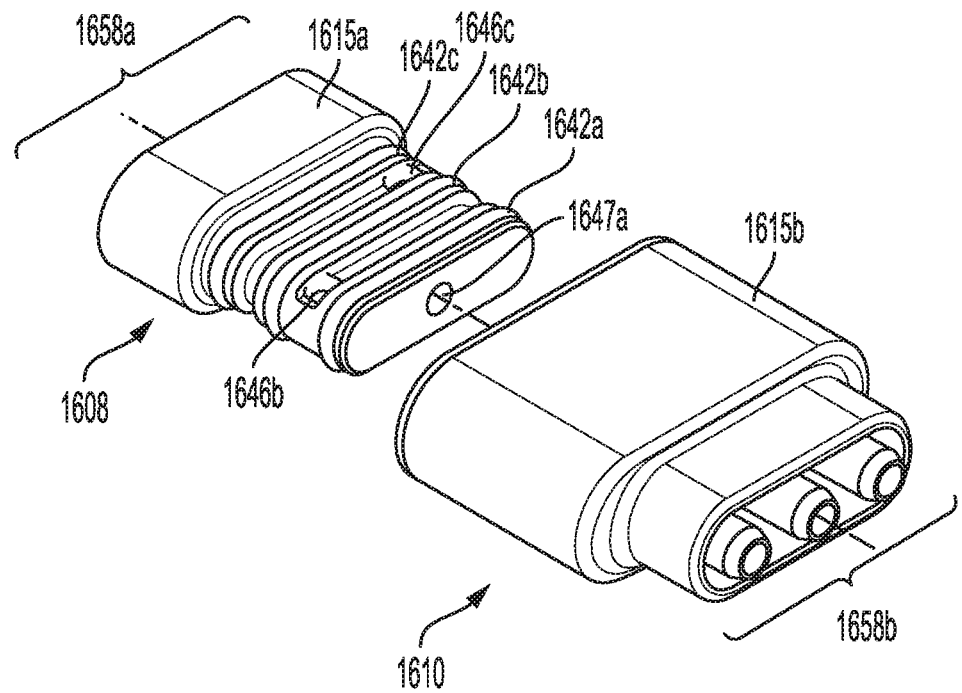
FIG. 16*a* shows a perspective view of a reversible connector in a non-engaged position in accordance with aspects of the present disclosure.
Figure 16B:
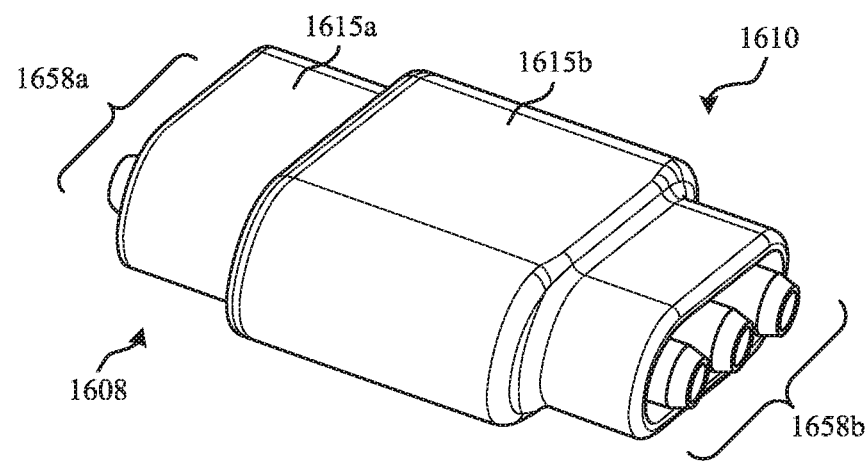
FIG. 16*b* shows a perspective view of the reversible connector of FIG. 16*a* in an engaged position in accordance with aspects of the present disclosure.
Figure 16C:
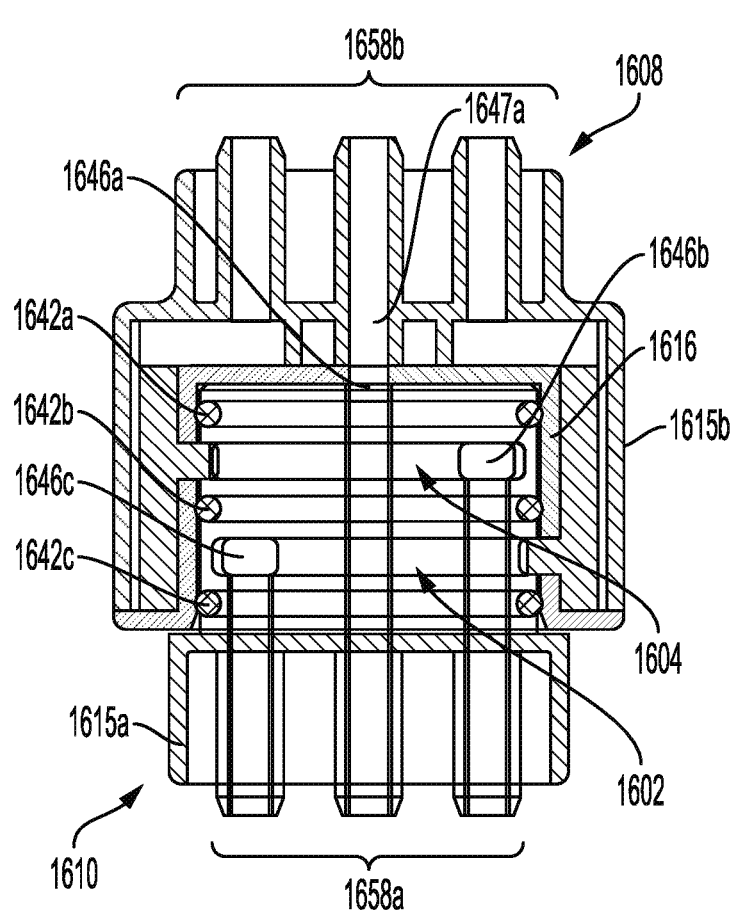
FIG. 16*c* shows an example top down cross-section view of the reversible connector of FIGS. 16*a* and 16*b* in an engaged position in accordance with aspects of the present disclosure.
Figure 16D:
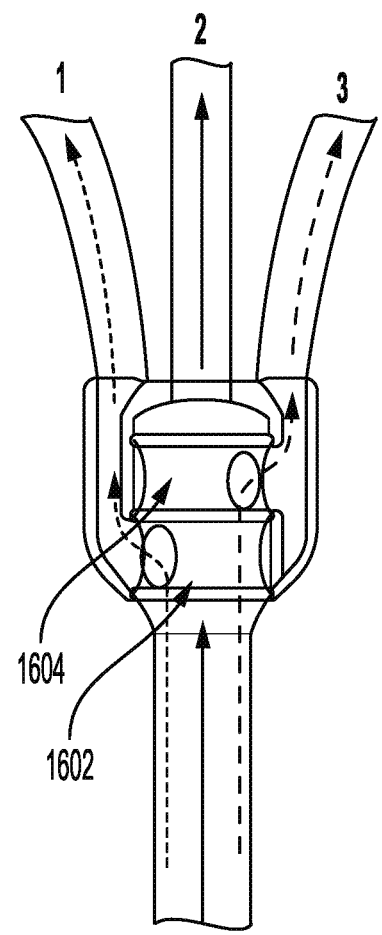
FIG. 16*d* shows an example top down diagram view of the reversible connector of FIGS. 16*a*-16*c* showing fluid flow connection channels showing the direction of the fluid flow, in accordance with aspects of the present disclosure.
Figure 16E:
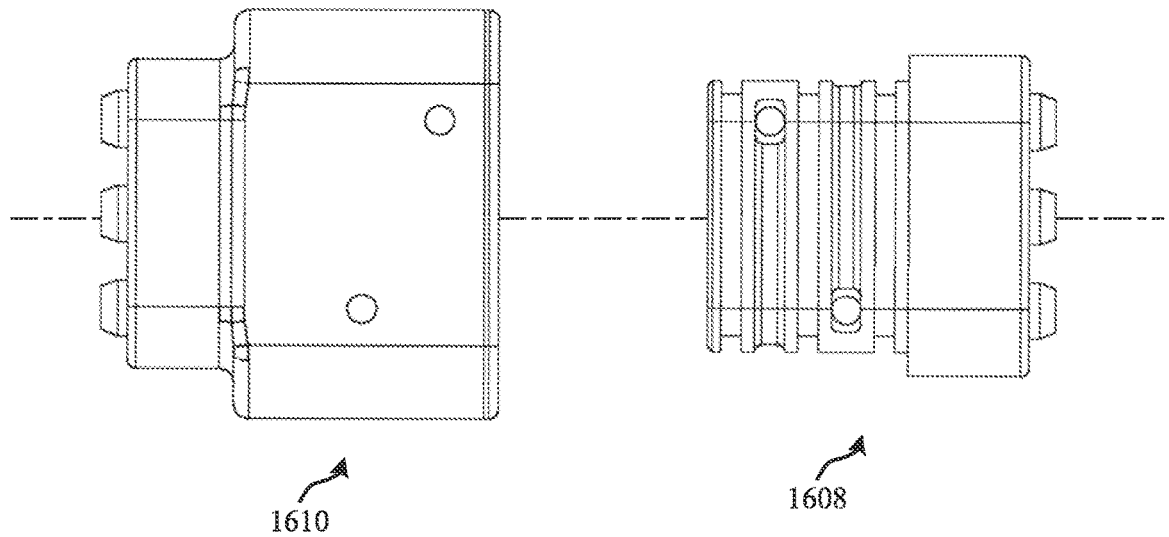
FIG. 16*e* shows an example top view of the reversible connector of FIGS. 16*a* and 16*b* in accordance with aspects of the present disclosure.
Figure 16F:
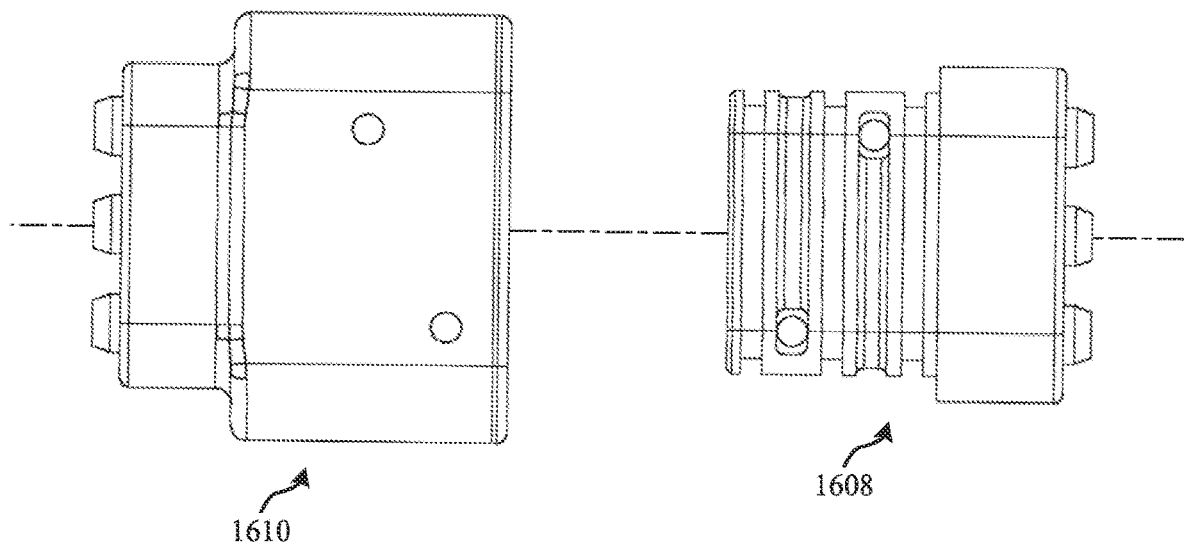
FIG. 16*f* shows an example bottom view of the reversible connector of FIGS. 16*a*, 16*b*, and 16*e* in accordance with aspects of the present disclosure.
Figure 16G:
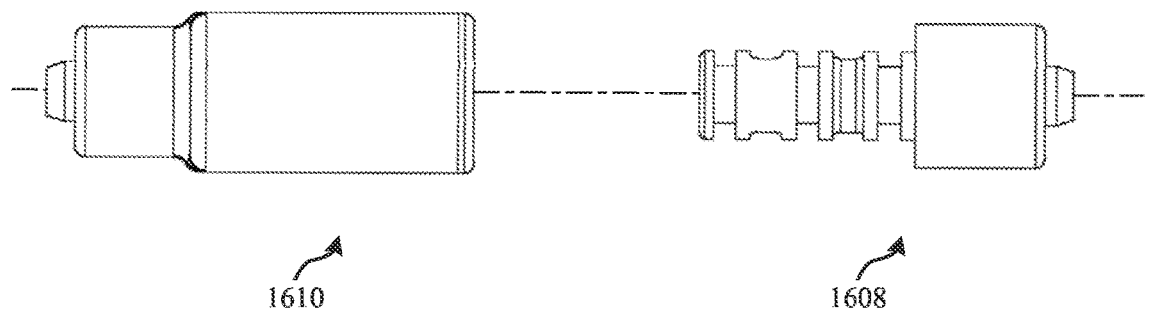
FIG. 16*g* shows an example right side view of the reversible connector of FIGS. 16*a*, 16*b*, 16*e*, and 16*f* in accordance with aspects of the present disclosure.
Figure 16H:
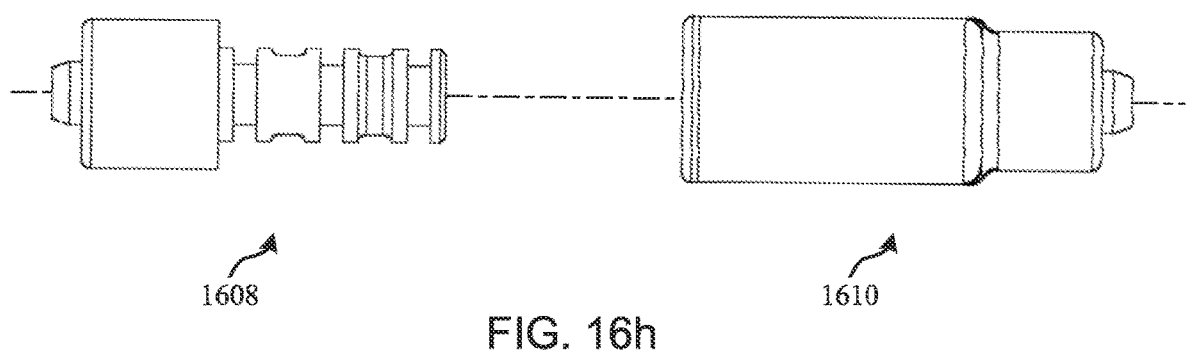
FIG. 16*h* shows an example left side view of the reversible connector of FIGS. 16*a*, 16*b*, and 16*f*-16*f* in accordance with aspects of the present disclosure.
Figure 16I:
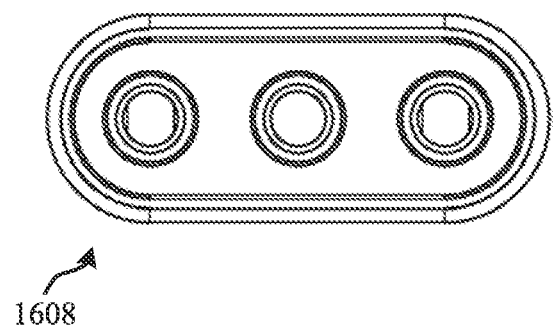
FIG. 16*i* shows an example rear view of the first connector portion of FIGS. 16*a*, 16*b*, and 16*f*-16*h* in accordance with aspects of the present disclosure.
Figure 16J:
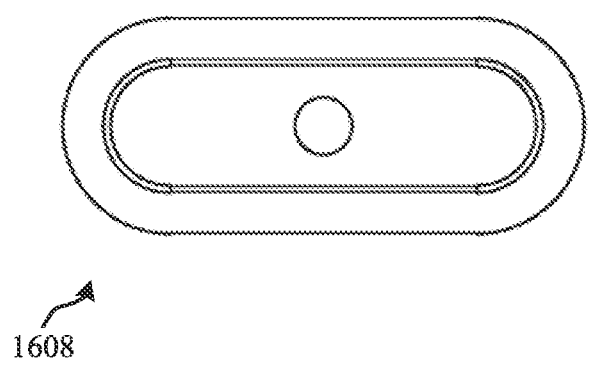
FIG. 16*j* shows an example front view of the first connector portion of FIGS. 16*a*, 16*b*, and 16*f*-16*i* in accordance with aspects of the present disclosure.
Figure 16K:
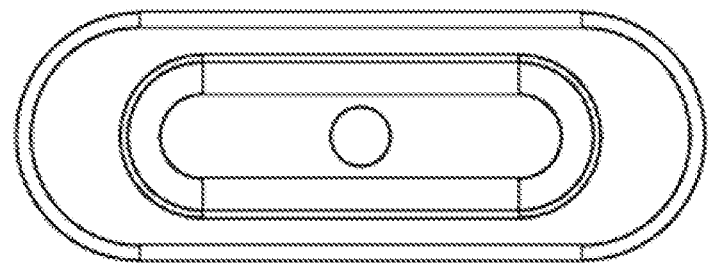
FIG. 16*k* shows an example rear view of the second connector portion of FIGS. 16*a*, 16*b*, and 16*f*-16*h* in accordance with aspects of the present disclosure.
Figure 16L:
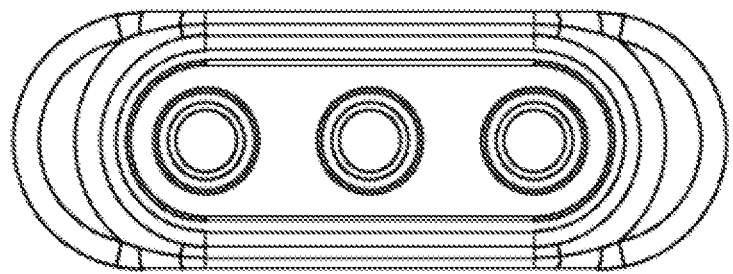
FIG. 16*l* shows an example front view of the second connector portion of FIGS. 16*a*, 16*b*, 16*f*-16*h*, and 16*k* in accordance with aspects of the present disclosure.

As shown in FIGS. 16*b* and 16*c*, when the first connector portion 1608 is engaged with the second connector portion 1610, interaction between the first sealing portion 1642*a*, 1642*b*, and 1642*c* and an inner sealing portion 1616 of the second connector portion 1610 forms a first chamber 1604 between the first sealing portion 1642*a* corresponding with a first opening 1646*b* in the first connection portion and second sealing portion 1642*c* and a second chamber 1602 between the first sealing portion 1642*b* and 1642*c* which corresponds with a second opening 1646*c*. The first chamber 1604 and second chamber 1602 allows fluid, e.g., air, to pass from the first connector portion 1608 to the second connector portion 1610. The first connector and second connector may additionally include a third opening 1646*a* and 1647*a*, respectively that are in direct fluid communication when the first connector portion 1608 is connected to the second connector portion 1610. The aforementioned features allow the first and second connectors to provide fluid communication that follows respective paths 1, 2, and 3 regardless of the orientation of the first connector portion 1608 when in engagement and connected to the second connector portion 1610. For example, as shown in FIG. 16*d*, the first chamber 1604, the second chamber 1602 and fluid communication between the third opening 1646*a* of the first connector portion 1608 and third opening 1647*a* of the second connector portion 1610 provides fluid communication paths (1), (2), and (3) from the first connector portion 1608 to the second connector portion 1610 regardless of whether they are connected in a first orientation (e.g., as shown in FIG. 16*c* and/or 16*d*) or if they are flipped 180 degrees and connected in a second orientation.

Additional views of the first connector portion 1608 and the second connector portion 1610 of the reversible connector are shown in FIGS. 16*e*-16*l*.

Figure 17:
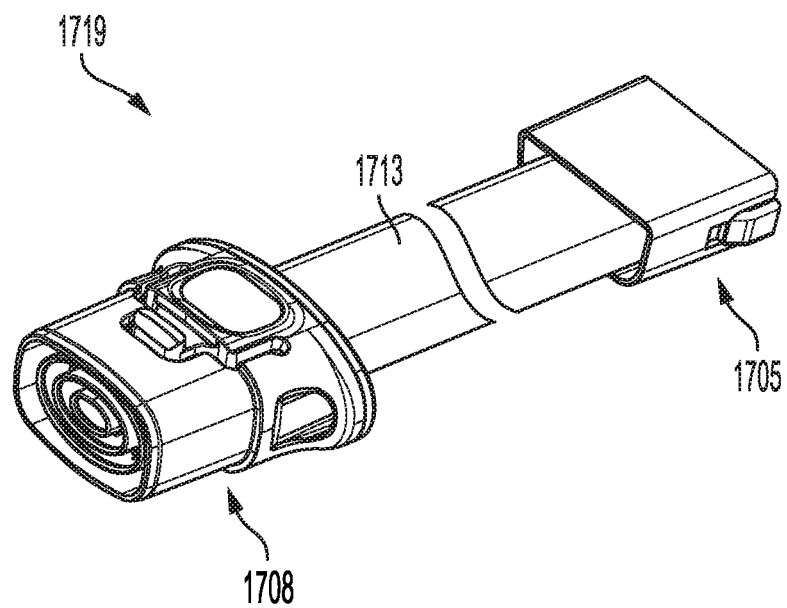
FIG. 17 shows an example adapter utilizing a reversible connector in accordance with aspects of the present disclosure.
Figure 18:
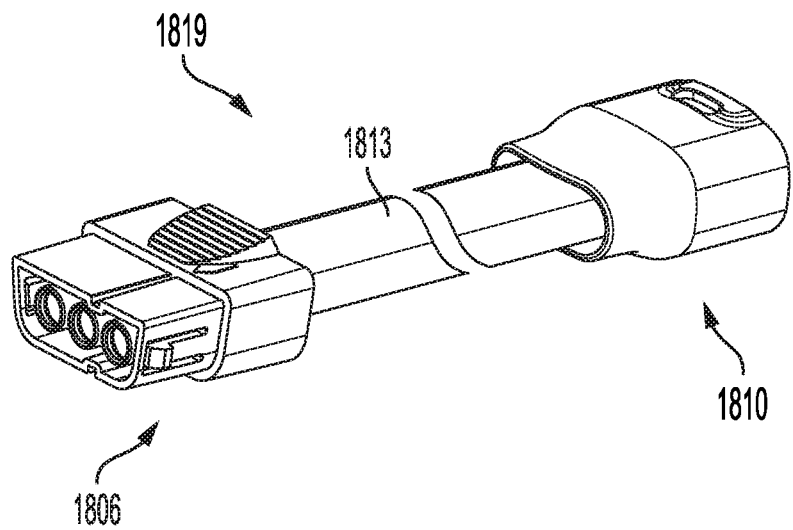
FIG. 18 shows an example adapter utilizing a reversible connector in accordance with aspects of the present disclosure.

FIGS. 17 and 18 show examples of adapters in accordance with aspects of the disclosure. The adapters may incorporate features described throughout the disclosure and/or may be usable with aspects of the disclosure. It is noted that while specific examples are provided below, any adapter that adapts or converts a non-reversible component to a reversible component that is described herein is within the scope of this disclosure.

Turning to FIG. 17, an adapter 1719 utilizing a reversible connector (e.g., 1708/1712) and a non-reversible connector 1705 is disclosed. In one example implementation, the adapter 1719 may for example be configured to connect or adapt a compression article (e.g., compression garment 104 in FIG. 1) that utilizes a non-reversible connector to a system in accordance with the disclosure that utilizes one or more reversible connectors. The adapter 1719 may have a non-reversible connection portion 1705 at a first end and a reversible connection portion 1708/1712 at a second end. The adapter 1719 may also include tubing 1713 for providing fluid communication between each of the fluid passages at the non-reversible connection portion 1705 and/or the reversible connection portion 1708/1717. While not limited to a specific tubing profile, in a preferred embodiment, the tubing may include any one of the tubing profiles described in FIGS. 2*a*-2*c* above. The non-reversible connection portion 1705 may include any known connector that is connectable to a second corresponding connector but must normally be connected to the corresponding connector in a single orientation (e.g., cannot be "flipped" 180 degrees). The aforementioned aspects provide the advantage of allowing the system, method, and apparatus of the current disclosure to be usable with products on the market (e.g., compression garments, tubing extensions, and/or controllers) or products that include non-reversible connectors or connectors that have differing connection interfaces. In one example, the reversible connection portion 1708/1712 of the adapter 1719 may be a male connector. Further, the reversible connection portion 1708/1712 may be analogous to or include features of the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. Additionally, the reversible connection portion 1708/1712 may be analogous with or include features of the first reversible connection portion 108b or may be analogous with or include features of the second reversible connector portion 110b in FIG. 1. The reversible connection portion 1708/1712 may also be analogous with or include features of the third connector portion 912 in FIGS. 9a, 9d, 9j, 9k, and 9l and may be 1585a portion 108a in FIG. 1 and/or controller side reversible connection portions 941a and/or 941b in FIGS. 9q-9s). The reversible connection portion 1708/1712 may also be analogous with or include features of the connector portion 1008 in FIG. 10b, 1112 and/or 1110 in FIG. 11a, 1208 or 1210 in FIGS. 12a and 12b, 1308, 1312 in FIGS. 13a and 13b, 1408 and 1412 in FIGS. 14a and 14b, and 1508 or 1510 in FIGS. 15a-15c. The reversible connection portion 1708/1712 and/or the non-reversible connection portion 1705 may have a tubing connection portion (e.g., as described and shown in reference no. 1685a and 1685b in FIGS. 16a and 16b).

Turning to FIG. 18, an adapter 1819 utilizing a reversible connector (e.g., null 1810/1841) and a non-reversible connector 1806 is disclosed. In one example implementation, the adapter 1819 may for example be configured to connect or adapt a controller (e.g., controller 102 in FIG. 1 and/or controller 902 in FIGS. 9q-9s) that utilizes a non-reversible connector to a system in accordance with the disclosure that utilizes one or more reversible connectors. The adapter 1819 may have a non-reversible connection portion 1806 at a first end and a reversible connection portion 1810/1841 at a second end. The adapter 1819 may also include tubing 1813 for providing fluid communication between each of the fluid passages at the non-reversible connection portion 1806 and/or the reversible connection portion 1810/1841. While not limited to a specific tubing profile, in a preferred embodiment, the tubing may include any one of the tubing profiles described in FIGS. 2a-2c above. The non-reversible connection portion 1806 may include any known connector that is connectable to a second corresponding connector but must normally be connected to the corresponding connector in a single orientation (e.g., cannot be "flipped" 180 degrees when connected to a corresponding connector). The aforementioned aspects provide the advantage of allowing the system, method, and apparatus of the current disclosure to be usable with products on the market (e.g., compression garments, tubing extensions, and/or controllers) or products that include non-reversible connectors or connectors that have differing connection interfaces. In one example, the reversible connection portion 1810/1841 of the adapter 1819 may be a female connector. Further, the reversible connection portion 1810/1841 may be analogous to or include features of the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. Additionally, the reversible connection portion 1810/1841 may be analogous with or include features of the first reversible connection portion 108b or may be analogous with or include features of the second reversible connector portion 110b in FIG. 1. The reversible connection portion 1708/1712 may also be analogous with or include features of the third connector portion 912 in FIGS. 9a, 9d, 9j, 9k, and 9l and may be 1585a portion 108a in FIG. 1 and/or controller side reversible connection portions 941a and/or 941b in FIGS. 9q-9s). The reversible connection portion 1810/1841 may also be analogous with or include features of the connector portion 1008 in FIG. 10b, 1112 and/or 1110 in FIG. 11a, 1208 or 1210 in FIGS. 12a and 12b, 1308, 1312 in FIGS. 13a and 13b, 1408 and 1412 in FIGS. 14a and 14b, and 1508 or 1510 in FIGS. 15a-15c. The reversible connection portion 1810/1841 and/or the non-reversible connection portion 1806 may have a tubing connection portion (e.g., as described and shown in reference no. 1685a and 1685b in FIGS. 16a and 16b).

Figure 19D:
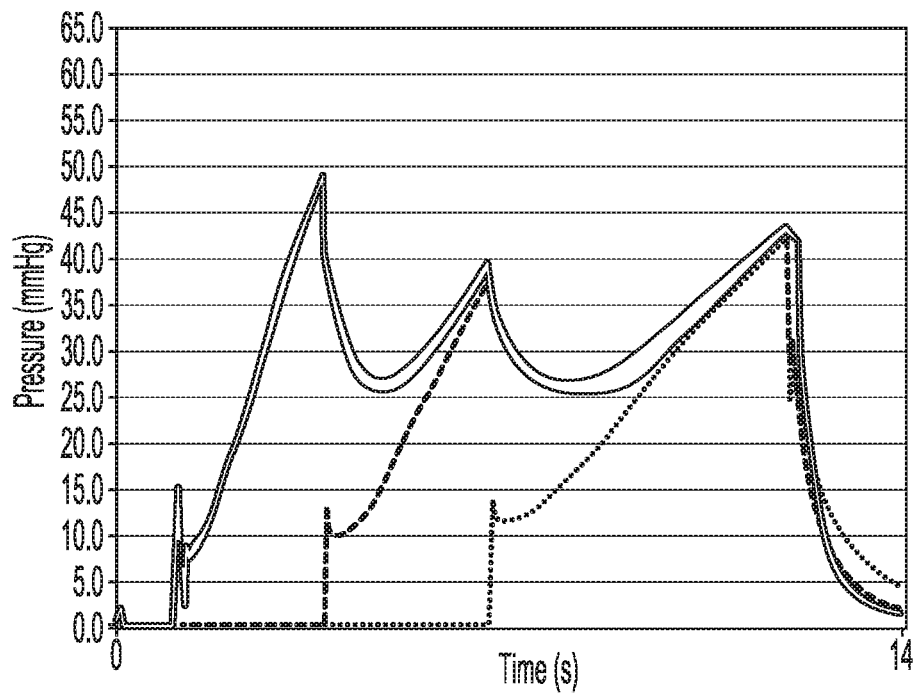
FIG. 19d is a pressure chart showing pressure with respect to time during operation of the controller when the reversible connector according to aspects of the disclosure are in an engaged position and in a first orientation defining a first configuration of mutually cooperating first and second fluid flow connection channels showing the direction of the fluid flow from the fluid source of the controller to the compression garment, in accordance with aspects of the present disclosure.
Figure 19E:
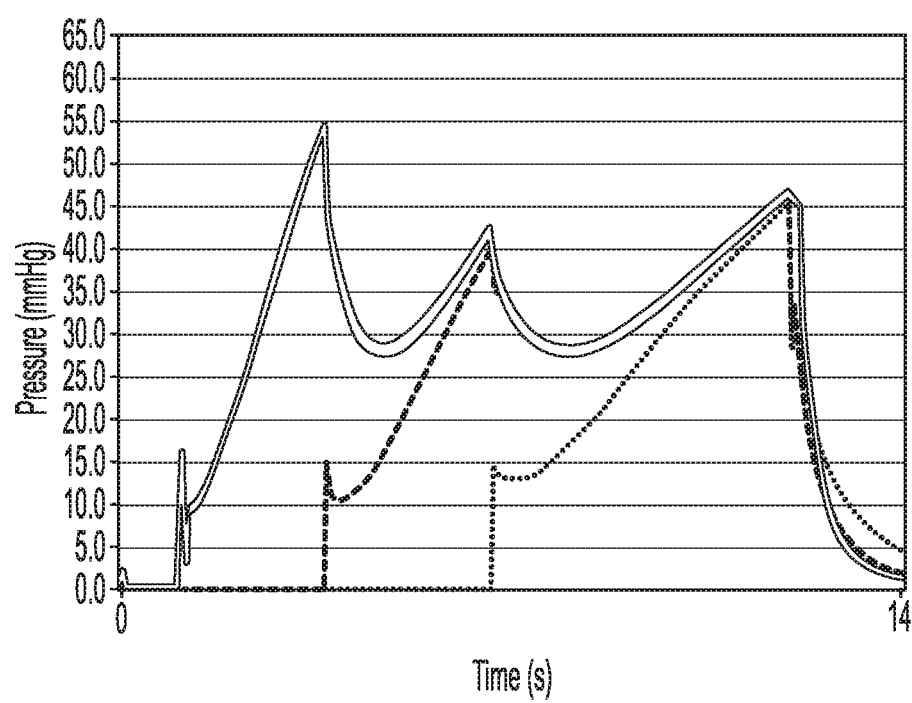
FIG. 19e is a pressure chart showing pressure with respect to time during operation of the controller when the reversible connector in an engaged position in a second orientation defining a second configuration of mutually cooperating first and second fluid flow connection channels showing the direction of the fluid flow from the fluid source of the controller to the compression garment, in accordance with aspects of the present disclosure.

FIGS. 19c-19e are pressure charts showing pressure at each inflatable bladder (e.g., inflatable bladders 106a, 106b and 106c in FIG. 1) of a compression garment provided through reversible connector with respect to time during operation of the controller (e.g. controller 102 in FIG. 1 or 902 in FIGS. 9q-9s). The flow paths within the connectors described throughout the disclosure provide for consistent performance when the connectors are connected in a first configuration 1900a (shown in FIG. 19a) and/or a second configuration 1900b (e.g., when one of the two connectors or connector portions are flipped 180 degrees and shown in FIG. 19b). For example, the fluid pressure chart in FIG. 19c, shows the fluid pressure in the inflatable bladders, e.g., Bladder 1, Bladder 2 and Bladder 3. For example, the fluid pressure chart in FIG. 19d, shows fluid pressure provided through the first fluid path (1), second fluid path (2), and third fluid path (3) when a first connector portion 1908 is connected to a second connector portion 1910 in a first orientation 1900a. The fluid pressure chart in FIG. 19e, shows fluid pressure provided through the first fluid path (1), second fluid path (2), and third fluid path (3) when a first connector portion 1808 is connected to a second connector portion 1910 in a second orientation 1900b (e.g., "flipped" or oriented 180 degree from the first orientation shown in FIG. 19d. As shown, switching either one of the first connector 1908 and/or second connector portion 1910 from the first orientation to the second orientation has a negligible effect on pressure provided by the controller to each bladder through the reversible connector. In a preferred configuration, the first connector portion 1908 and/or second connector portion 1910 are analogous with the first connector portion 908 and second connector portion 910 and/or third connector portion 912 and controller side connector portion 941 described above with respect to FIGS. 9a-9s. In another aspect the first connector portion 1708 and second connector portion may be analogous to or include features of the controller side first connector portion 108a and sleeve side reversible second connector portion 110a shown in FIG. 1, first connector portion 308 and second connector portion 310 shown in FIGS. 3A-3C, first connector portion 408 and second connector portion 410, shown in FIGS. 4A-4B, first connector portion 508 and second connector portion 510 shown in FIGS. 5A-5C, first connector portion 708 and second connector portion 710 in FIGS. 7A-7B, and/or first connector portion 808 and second connector portion 810 in FIGS. 8A-8D. In addition, the first connector portion 1908 may for example be analogous with or include features of the sleeve side connection portion 110*a* in FIG. 1. Additionally, the second connector portion 1910 may be analogous with or include features of the first reversible connection portion 108*b* or may be analogous with or include features of the second reversible connector portion 110*b* in FIG. 1. The first connector portion 1908 and/or second connector portion 1910 may also be analogous with or include features of the connector portion 1008 in FIG. 10*b*, 1112 and/or 1110 in FIG. 11*a*, 1208 or 1210 in FIGS. 12*a* and 12*b*, 1308, 1312 in FIGS. 13*a* and 13*b*, 1408 and 1412 in FIGS. 14*a* and 14*b*, and 1508 or 1510 in FIGS. 15*a*-15*c*.

Some further aspects are provided in the clauses below.

Clause 1: A compression garment selectively engageable and operable by a controller for inflation via a reversible connector, the compression garment comprising:
a plurality of bladders;
compression garment tubing comprising a plurality of garment tubes in fluid communication with the plurality of bladders at a first compression garment tubing end and having a second compression garment tubing end opposite the first compression garment tubing end; and,
a first connector portion located at the second compression garment tubing end;
wherein the controller controls communication with a source of fluid flow via controller tubing having a plurality of controller tubes in selective communication with the source of the fluid flow at a first controller tubing end and having a second controller tubing end opposite the first controller tubing end;
wherein the controller tubing has a second connector portion located at the second controller tubing end;
wherein the first connector portion and the second connector portion are selectively reversibly connectable together to form the reversible connector;
wherein a plurality of fluid flow passageways extend within each of the first connector portion and the second connector portion to form a first fluid flow channel when the first connector portion is coupled to the second connector portion in a first orientation;
wherein the plurality of fluid flow passageways within the first connector portion and within the second connector portion cooperatively form a second fluid flow channel when the first connector portion is coupled to the second connector portion in a second orientation; and
wherein a fluid flow between a first one of the plurality of controller tubes and a first one of a plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in a second orientation.

Clause 2: The compression garment of clause 1, wherein the controller tubing has a third connector at the first controller tubing end, and wherein compression garment is connectable or disconnectable from the controller via at least one of the second connector portion and a third connector portion.

Clause 3: The compression garment of any one of the above clauses, wherein the controller comprises a monitor side connection portion and wherein the third connector is configured to connect to the controller side connection portion and provide fluid communication between the controller and the controller tubing, wherein the third connector portion and the controller side connector portion are selectively reversibly connectable together and the second connector portion and first connector portion are selectively reversibly connectable together to form the reversible connector.

Clause 4: The compression garment of any of the above clauses, wherein a plurality of fluid flow passageways extend within each of the controller side connection portion and the third connector portion to form a third fluid flow channel when the third connector portion is coupled to the monitor side connector portion in a first orientation;
wherein the plurality of fluid flow passageways within the third connector portion and within the controller side connection portion cooperatively form a fourth fluid flow channel when the third connector portion is coupled to the monitor side connector portion in a second orientation; and
wherein a fluid flow between a first one of the plurality of fluid flow passageways in the controller side connection portion and a first one of a plurality controller tubing passageways is communicated in a first fluid flow direction via the third fluid flow channel when the third connector portion and monitor side connection portion are connected in the first orientation, and wherein the fluid flow through the first one of the plurality fluid flow passageways in the controller side connection portion and the first one of the plurality of controller tubes is communicated in the first fluid flow direction via the fourth fluid flow channel when the third connector portion and the monitor side connector portion are connected in a second orientation.

Clause 5: The compression garment of any one of the above clauses:
wherein the first connector portion is a male connector and comprises an outer concentric wall, an intermediate concentric wall and an inner concentric wall with each of the concentric walls having a corresponding fluid flow passageway;
wherein the second connector portion is a female connector and comprises an outer concentric wall, an intermediate concentric wall and an inner concentric wall with each of the concentric walls having a corresponding fluid flow passageway; and
wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 6: The compression garment of any of the above clauses, wherein the outer concentric wall, intermediate concentric wall, and inner concentric wall of the male connector is made of a flexible material and a body of the male connector portion are made of a rigid material.

Clause 7: The compression garment of any of the above clauses, wherein the outer concentric wall, intermediate concentric wall, and inner concentric wall of the female connector are made of material that is more rigid that the outer concentric wall, intermediate concentric wall, and inner concentric wall of the male connector.

Clause 8: The compression garment of any of the above clauses, wherein the male connector comprises a sealing member that is a unitary structure and includes the outer concentric wall, intermediate concentric wall, and inner concentric wall of the male connector.

Clause 9: The compression garment of any of the above clauses, wherein the male connector comprises a first engagement portion configured to be slidinglly received within a female connector engagement portion.

Clause 10: The compression garment of any of the above clauses, wherein concentric walls of the male connector and the concentric walls of the female connector form an outer chamber, an intermediate chamber, and an inner chamber when the male connector is slidingly engaged with the female connector in the first orientation and the second orientation.

Clause 11: The compression garment of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 12: The compression garment of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 13: The compression garment of any of the above clauses, wherein: the male connector further comprises a base with each of the concentric walls extending from the base on a first side and three inlets extending from the base on a second side, with the first side and second side being opposite of each other, and each of the three inlets in fluid connection with a corresponding fluid flow passageway of the male connector; and
the female connector further comprises a base with each of the concentric walls extending from the base on a first side and three inlets extending from the base on a second side, with the first side and second side being opposite of the other, and each of three inlets in fluid connection with a corresponding fluid flow passageway of the female connector.

Clause 14: The compression garment of any of the above clauses, wherein each of the three inlets of both the male connector and the female connector is adapted to receive a tube over an outer edge of each of the three inlets.

Clause 15: The compression garment of claim of any of the above clauses, wherein the male connector provides fluid to the female connector via the chambers.

Clause 16: The compression garment of any of the above clauses wherein the third connector portion is a male connector and comprises an outer concentric wall, an intermediate concentric wall and an inner concentric wall with each of the concentric walls having a corresponding fluid flow passageway;

wherein the monitor side connection portion is a female connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 17: The compression garment of any of the above clauses, wherein the outer concentric wall, intermediate concentric wall, and inner concentric wall of the male connector is made of a flexible material and a body of the male connector portion is made of a rigid material.

Clause 18: A compression garment selectively engageable and operable by a controller for inflation via a reversible connector, the compression garment comprising: at least one inflatable bladder;

compression garment tubing comprising at least one garment tube in fluid communication with the at least one inflatable bladder at a first compression garment tubing end and having a second compression garment tubing end opposite the first compression garment tubing end; and a first connector portion located at the second compression garment tubing end;

wherein the controller controls communication with a source of fluid flow is configured to be connected to the compression garment via controller tubing having a plurality of controller tubes in selective communication with the source of the fluid flow at a first controller tubing end and having a second controller tubing end opposite the first controller tubing end;

wherein the controller comprises a second connector portion located at the second controller tubing end;

wherein the first connector portion and the second connector portion are selectively reversibly connectable together to form the reversible connector;

wherein a plurality of fluid flow passageways extend within the second connector portion to form a first fluid flow channel when the first connector portion is coupled to the second connector portion in a first orientation;

wherein the plurality of fluid flow passageways within the second connector portion cooperatively form a second fluid flow channel when the first connector portion is coupled to the second connector portion in a second orientation; and wherein a fluid flow between a first one of the plurality of controller tubes and the at least one compression garment tube is communicated in a first fluid flow direction via the first fluid flow channel when the first connector portion and the second connector portion are connected in the first orientation, and wherein the fluid flow through the at least one compression garment tube and the first one of the plurality of controller tubes is communicated in the first fluid flow direction via the second fluid flow channel when the first connector portion and the second connector portion are connected in a second orientation.

Clause 19: The compression garment of any of the above clauses, wherein the controller controls communication with the source of fluid flow via a third connector at the first controller tubing end, and wherein compression garment is connectable or disconnectable from the controller via at least one of the second connector portion and a third connector portion.

Clause 20: The compression garment of any of the above clauses, wherein the controller comprises a monitor side connection portion and wherein the third connector is configured to connect to the controller side connection portion and provide fluid communication between the controller and the controller tubing, wherein the third connector portion and the controller side connector portion are selectively reversibly connectable together and the second connector portion and first connector portion are selectively reversibly connectable together to form the reversible connector.

Clause 21: The compression garment of any of the above clauses, wherein a plurality of fluid flow passageways extend within each of the controller side connection portion and the third connector portion to form a third fluid flow channel when the third connector portion is coupled to the monitor side connector portion in a first orientation;

wherein the plurality of fluid flow passageways within the third connector portion and within the controller side connection portion cooperatively form a fourth fluid flow channel when the third connector portion is coupled to the monitor side connector portion in a second orientation; and wherein a fluid flow between a first one of the plurality of fluid flow passageways in the controller side connection portion and a first one of a plurality controller tubing passageways is communicated in a first fluid flow direction via the third fluid flow channel when the third connector portion and monitor side connection portion are connected in the first orientation, and wherein the fluid flow through the first one of the plurality fluid flow passageways in the controller side connection portion and the first one of the plurality of controller tubes is communicated in the first fluid flow direction via the fourth fluid flow channel when the third connector portion and the monitor side connector portion are connected in a second orientation.

Clause 22: The compression garment of any of the above clauses: wherein the first connector portion is a male connector and comprises an outer concentric wall, an intermediate concentric wall and an inner concentric wall with each of the concentric walls having a corresponding fluid flow passageway;

wherein the second connector portion is a female connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 23: The compression garment of any of the above clauses, wherein the outer concentric wall, intermediate concentric wall, and inner concentric wall of the male connector is made of a flexible material and a body of the male connector portion are made of a rigid material.

Clause 24: The compression garment of any of the above clauses, wherein the outer concentric wall, intermediate concentric wall, and inner concentric wall of the female connector are made of material that is more rigid that the outer concentric wall, intermediate concentric wall, and inner concentric wall of the male connector.

Clause 25: The compression garment of any of the above clauses, wherein the male connector comprises a sealing member that is a unitary structure and includes the outer concentric wall, intermediate concentric wall, and inner concentric wall of the male connector.

Clause 26: The compression garment of any of the above clauses, wherein the male connector comprises a first engagement portion configured to be slidinglly received within a female connector engagement portion.

Clause 27: The compression garment of any of the above clauses, wherein concentric walls of the male connector and the concentric walls of the female connector form an outer chamber, an intermediate chamber, and an inner chamber when the male connector is slidingly engaged with the female connector in the first orientation and the second orientation.

Clause 28: The compression garment of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 29: The compression garment of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 30: The compression garment of any of the above clauses, wherein: the male connector further comprises a base with each of the concentric walls extending from the base on a first side and three inlets extending from the base on a second side, with the first side and second side being opposite of each other, and each of the three inlets in fluid connection with a corresponding fluid flow passageway of the male connector; and the female connector further comprises a base with each of the concentric walls extending from the base on a first side and three inlets extending from the base on a second side, with the first side and second side being opposite of the other, and each of three inlets in fluid connection with a corresponding fluid flow passageway of the female connector.

Clause 31: The compression garment of any of the above clauses, wherein each of the three inlets of both the male connector and the female connector is adapted to receive a tube over an outer edge of each of the three inlets.

Clause 32: The compression garment of claim of any of the above clauses, wherein the male connector provides fluid to the female connector via the chambers.

Clause 33: The compression garment of any of the above clauses, wherein the third connector portion is a male connector and comprises an outer concentric wall, an intermediate concentric wall and an inner concentric wall with each of the concentric walls having a corresponding fluid flow passageway;

wherein the monitor side connection portion is a female connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 34: The compression garment of any of the above clauses, wherein the outer concentric wall, intermediate concentric wall, and inner concentric wall of the male connector is made of a flexible material and a body of the male connector portion is made of a rigid material.

Clause 35: A controller for controlling a source of fluid flow to a compression garment, the controller being selectively connectable to the compression garment via a first reversible connector portion, the controller comprising:

a fluid source for providing fluid flow to the first reversible connector portion, wherein the first reversible connector is configured to be reversibly connected to a second connector portion of the compression garment, wherein the compression garment includes a plurality of bladders, a plurality of garment tubes in fluid communication with the plurality of bladders and the second reversible connector portion in fluid communication with the plurality of garment tubes wherein the first connector portion and the second connector portion are selectively reversibly connectable together to form the reversible connector;

wherein a plurality of fluid flow passageways extend within each of the first connector portion and the second connector portion to form a first fluid flow channel when the first connector portion is coupled to the second connector portion in a first orientation;

wherein the plurality of fluid flow passageways within the first connector portion and within the second connector portion cooperatively form a second fluid flow channel when the first connector portion is coupled to the second connector portion in a second orientation; and wherein a fluid flow between a first one of the plurality of controller tubes and a first one of a plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in a second orientation.

Clause 36: The controller of any of the above clauses, wherein the first connector portion is a controller side connector portion configured to be directly reversibly connected to the second connector portion.

Clause 37: The controller of any of the above clauses, wherein the monitor further comprises a plurality of controller tubes in selective communication with the source of the fluid flow at a first controller tubing end and having a second controller tubing end opposite the first controller tubing end, wherein the first connector is connected to and provides fluid communication with the second controller tubing end.

Clause 38: The controller of any of the above clauses, wherein the first connector portion is a controller side connector portion, wherein the controller side connector portion is configured to have an extension member connected thereto, wherein the extension member is configured to connect to the second connector portion and provide fluid communication between the controller and the compression garment.

Clause 39: The controller of any of the above clauses, wherein the first connector portion is female connector portion and comprises an outer concentric wall, an intermediate concentric wall and an inner concentric wall with each of the concentric walls having a corresponding fluid flow passageways;

wherein the second connector portion is a male connector portion and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 40: The controller of any of the above clauses, wherein the outer concentric wall, intermediate concentric wall, and inner concentric wall of the female connector are made of a material that is more rigid than the outer concentric wall, intermediate concentric wall, and inner concentric wall of the male connector portion.

Clause 41: The controller of any of the above clauses, wherein the female connector comprises a sealing member that is a unitary structure and includes the outer concentric wall, intermediate concentric wall, and inner concentric wall of the female connector.

Clause 42: The controller of any of the above clauses, wherein the female connector comprises a first engagement portion configured to slidingly receive an engagement portion of the male connector portion.

Clause 43: The controller of any of the above clauses, wherein concentric walls of the female connector and the concentric walls of the male connector form an outer chamber, an intermediate chamber, and an inner chamber when the male connector is slidingly engaged with the female connector in the first orientation and the second orientation.

Clause 44: The controller of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 45: The controller of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 46: A system for applying compression treatment to a limb of a patient, comprising:

a compression garment positionable about the limb of the patient and selectively engageable and operable by controller for inflation via a reversible connector, the compression garment comprising:

a plurality of bladders; and compression garment tubing comprising a plurality of garment tubes in fluid communication with the plurality of bladders at a first compression garment tubing end and having a second compression garment tubing end opposite the first compression garment tubing end; and, a first connector portion located at the second compression garment tubing end;

wherein the controller controls communication with a source of fluid flow via controller tubing having a plurality of controller tubes in selective communication with the source of the fluid flow at a first controller tubing end and having a second controller tubing end opposite the first controller tubing end; and a second connector portion located at the second controller tubing end;

wherein the first connector portion and the second connector portion are selectively reversibly connectable together to form the reversible connector;

wherein a plurality of fluid flow passageways extend within each of the first connector portion and the second connector portion to form a first fluid flow channel when the first connector portion is coupled to the second connector portion in a first orientation;

wherein the plurality of fluid flow passageways within the first connector portion and within the second connector portion cooperatively form a second fluid flow channel when the first connector portion is coupled to the second connector portion in a second orientation; and wherein a fluid flow between a first one of the plurality of controller tubes and a first one of a plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in a second orientation.

Clause 47: The system of any of the above clauses, wherein the controller tubing has a third connector at the first controller tubing end, and wherein compression garment is connectable or disconnectable from the controller via at least one of the second connector portion and a third connector portion.

Clause 48: The system of any of the above clauses, wherein the controller comprises a monitor side connection portion and wherein the third connector is configured to connect to the controller side connection portion and provide fluid communication between the controller and the controller tubing, wherein the third connector portion and the controller side connector portion are selectively reversibly connectable together and the second connector portion and first connector portion are selectively reversibly connectable together to form the reversible connector.

Clause 49: The system of any of the above clauses, wherein a plurality of fluid flow passageways extend within each of the controller side connection portion and the third connector portion to form a third fluid flow channel when the third connector portion is coupled to the monitor side connector portion in a first orientation;

wherein the plurality of fluid flow passageways within the third connector portion and within the controller side connection portion cooperatively form a fourth fluid flow channel when the third connector portion is coupled to the monitor side connector portion in a second orientation; and wherein a fluid flow between a first one of the plurality of fluid flow passageways in the controller side connection portion and a first one of a plurality controller tubing passageways is communicated in a first fluid flow direction via the third fluid flow channel when the third connector portion and monitor side connection portion are connected in the first orientation, and wherein the fluid flow through the first one of the plurality fluid flow passageways in the controller side connection portion and the first one of the plurality of controller tubes is communicated in the first fluid flow direction via the fourth fluid flow channel when the third connector portion and the monitor side connector portion are connected in a second orientation.

Clause 50: The system of any of the above clauses, wherein the first connector portion is a male connector and comprises an outer concentric wall, an intermediate concentric wall and an inner concentric wall with each of the concentric walls having a corresponding fluid flow passageway;

wherein the second connector portion is a female connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 51: The system of any of the above clauses, wherein the outer concentric wall, intermediate concentric wall, and inner concentric wall of the male connector is made of a flexible material and a body of the male connector portion are made of a rigid material.

Clause 52: The system of any of the above clauses, wherein the outer concentric wall, intermediate concentric wall, and inner concentric wall of the female connector are made of material that is more rigid that the outer concentric wall, intermediate concentric wall, and inner concentric wall of the male connector.

Clause 53: The system of any of the above clauses, wherein the male connector comprises a sealing member that is a unitary structure and includes the outer concentric wall, intermediate concentric wall, and inner concentric wall of the male connector.

Clause 54: The system of any of the above clauses, wherein the male connector comprises a first engagement portion configured to be slidingly received within a female connector engagement portion.

Clause 55: The system of any of the above clauses, wherein concentric walls of the male connector and the concentric walls of the female connector form an outer chamber, an intermediate chamber, and an inner chamber when the male connector is slidingly engaged with the female connector in the first orientation and the second orientation.

Clause 56: The system of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 57: The system of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 58: The system of any of the above clauses, wherein the male connector further comprises a base with each of the concentric walls extending from the base on a first side and three inlets extending from the base on a second side, with the first side and second side being opposite of each other, and each of the three inlets in fluid connection with a corresponding fluid flow passageway of the male connector; and the female connector further comprises a base with each of the concentric walls extending from the base on a first side and three inlets extending from the base on a second side, with the first side and second side being opposite of the other, and each of three inlets in fluid connection with a corresponding fluid flow passageway of the female connector.

Clause 59: The system of any of the above clauses, wherein each of the three inlets of both the male connector and the female connector is adapted to receive a tube over an outer edge of each of the three inlets.

Clause 60: The system of any of the above clauses, wherein the male connector provides fluid to the female connector via the chambers.

Clause 61: The system of any of the above clauses, wherein the third connector portion is a male connector and comprises an outer concentric wall, an intermediate concentric wall and an inner concentric wall with each of the concentric walls having a corresponding fluid flow passageway;
wherein the monitor side connection portion is a female connector and comprises an outer concentric wall, an intermediate concentric wall and an inner concentric wall with each of the concentric walls having a corresponding fluid flow passageway; and
wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 62: An adapter for providing selectively engageable fluid communication between a compression garment and a controller for inflation bladders of the compression garment, the adapter comprising:
a first non-reversible connector configured to provide fluid communication from the controller to the adapter, wherein the controller controls communication with a source of fluid flow via adapter tubing having a plurality of tubes in selective communication with the source of the fluid flow at a first adapter tubing end and having a second adapter tubing end opposite the first adapter tubing end; wherein the adapter tubing has a first reversible connector portion located at the second adapter tubing end; wherein the first connector portion is selectively reversibly connectable to a second reversible connection portion to form a reversible connector, wherein the second reversible connection portion provide fluid communication with the bladders of the compression garment via a plurality of garment tubes in fluid communication with the plurality of bladders at a first compression garment tubing end and having a second compression garment tubing end opposite the first compression garment tubing end, wherein the second reversible connection portion is at the second garment tubing end;
wherein a plurality of fluid flow passageways extend within each of the first connector portion and the second connector portion to form a first fluid flow channel when the first connector portion is coupled to the second connector portion in a first orientation;
wherein the plurality of fluid flow passageways within the first connector portion and within the second connector portion cooperatively form a second fluid flow channel when the first connector portion is coupled to the second connector portion in a second orientation; and
wherein a fluid flow between a first one of the plurality of controller tubes and a first one of a plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in a second orientation.

Clause 63: The adapter of any of the above clauses, wherein the first reversible connector portion is a female connector and comprises an outer concentric wall, an intermediate concentric wall and an inner concentric wall with each of the concentric walls having a corresponding fluid flow passageway;

wherein the second reversible connector portion is a male connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 64: The adapter of any of the above clauses, wherein the outer concentric wall, intermediate concentric wall, and inner concentric wall of the female connector are made of material that is more rigid that the outer concentric wall, intermediate concentric wall, and inner concentric wall of the male connector.

Clause 65: The adapter of any of the above clauses, wherein the male connector comprises a sealing member that is a unitary structure and includes the outer concentric wall, intermediate concentric wall, and inner concentric wall of the male connector.

Clause 66: The adapter of any of the above clauses, wherein the female connector comprises a first engagement portion configured to slidingly receive a male connector engagement portion.

Clause 67: The adapter of any of the above clauses, wherein concentric walls of the male connector and the concentric walls of the female connector are configured to form an outer chamber, an intermediate chamber, and an inner chamber when the male connector is slidingly engaged with the female connector in the first orientation and the second orientation.

Clause 68: The adapter of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 69: The adapter of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 70: The adapter of any of the above clauses, wherein the female connector further comprises a base with each of the concentric walls extending from the base on a first side and three inlets extending from the base on a second side, with the first side and second side being opposite of the other, and each of three inlets in fluid connection with a corresponding fluid flow passageway of the female connector.

Clause 71: The adapter of any of the above clauses, wherein the first non-reversible connector portion further comprises a base and three inlets extending from the base, wherein each of three inlets in fluid connection with a corresponding fluid flow passageway of the female connector portion, wherein each of the three inlets of both the female connector portion and the first non-reversible connection portion is adapted to receive a tube over an outer edge of each of the three inlets.

Clause 72: The adapter of any of the above clauses, wherein the male connector provides fluid to the female connector via the chambers.

Clause 73: An adapter for providing selectively engageable fluid communication between a compression garment and a controller for inflation bladders of the compression garment, the adapter comprising: a first non-reversible connector configured to provide fluid communication from the compression garment to the controller via the adapter, wherein the controller controls communication with a source of fluid flow via adapter tubing having a plurality of tubes in selective communication with the source of the fluid flow at a first adapter tubing end and having a second adapter tubing end opposite the first adapter tubing end;

wherein the adapter tubing has the non-reversible connection portion located at the second adapter tubing end and a first reversible connector portion at the first adapter tubing end that is selectively reversibly connectable to a second reversible connection portion, wherein the first connector portion is selectively reversibly connectable to a second reversible connection portion to form a reversible connector, wherein the second reversible connection portion provides fluid communication with the controller via controller tubes in fluid communication with controller;

wherein a plurality of fluid flow passageways extend within each of the first connector portion and the second connector portion to form a first fluid flow channel when the first connector portion is coupled to the second connector portion in a first orientation;

wherein the plurality of fluid flow passageways within the first connector portion and within the second connector portion cooperatively form a second fluid flow channel when the first connector portion is coupled to the second connector portion in a second orientation; and wherein a fluid flow between a first one of the plurality of controller tubes and a first one of a plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in a second orientation.

Clause 74: The adapter of any of the above clauses, wherein the first reversible connector portion is a male connector and comprises an outer concentric wall, an intermediate concentric wall and an inner concentric wall with each of the concentric walls having a corresponding fluid flow passageway;

wherein the second reversible connector portion is a female connector and comprises an outer concentric wall, an intermediate concentric wall and an inner concentric wall with each of the concentric walls having a corresponding fluid flow passageway; and wherein each of the concentric walls of the male connector are adapted to slidingly engage with a corresponding concentric wall of the female connector in a first orientation and in a second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

Clause 75: The adapter of any of the above clauses, wherein the outer concentric wall, intermediate concentric wall, and inner concentric wall of the male adapter are made of a material that is more rigid that the housing of the male adapter.

Clause 76: The adapter of any of the above clauses, wherein the outer concentric wall, intermediate concentric wall, and inner concentric wall of the male connector are made of material that is more rigid that the outer concentric wall, intermediate concentric wall, and inner concentric wall of the female connector.

Clause 77: The adapter of any of the above clauses, wherein the male connector comprises a sealing member that is a unitary structure and includes the outer concentric wall, intermediate concentric wall, and inner concentric wall of the male connector.

Clause 78: The adapter of any of the above clauses, wherein the male connector comprises a first engagement portion configured to be slidingly received by a female connector engagement portion.

Clause 79: The adapter of any of the above clauses, wherein concentric walls of the female connector and the concentric walls of the male connector are configured to form an outer chamber, an intermediate chamber, and an inner chamber when the male connector is slidingly engaged with the female connector in the first orientation and the second orientation.

Clause 80: The adapter of any of the above clauses, wherein the fluid flow passageway for the outer chamber is formed in the outer concentric wall and the fluid flow passageway for the intermediate chamber is formed in the intermediate concentric wall for both the male connector and the female connector.

Clause 81: The adapter of any of the above clauses, wherein the fluid flow passageways of the outer chamber substantially align and the fluid flow passageways of the intermediate chamber substantially align in the first orientation and the fluid flow passageways of the outer chamber and the fluid flow passageways of the intermediate chamber are offset in the second orientation.

Clause 82: The adapter of any of the above clauses, wherein the male connector further comprises a base with each of the concentric walls extending from the base on a first side and three inlets extending from the base on a second side, with the first side and second side being opposite of the other, and each of three inlets in fluid connection with a corresponding fluid flow passageway of the female connector.

Clause 83: The adapter of any of the above clauses, wherein the first non-reversible connector portion further comprises a base and three inlets extending from the base, wherein each of three inlets in fluid connection with a corresponding fluid flow passageway of the male connector portion, wherein each of the three inlets of both the female connector portion and the first non-reversible connection portion is adapted to receive a tube over an outer edge of each of the three inlets.

Clause 84: The adapter of any of the above clauses, wherein the female connector provides fluid to the male connector via the chambers.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects illustrated herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A compression garment selectively engageable with and operable by a controller for inflation via a reversible connector, the compression garment comprising:
   a plurality of bladders;
   a compression garment tubing comprising a plurality of garment tubes in fluid communication with the plurality of bladders at a first compression garment tubing end and having a second compression garment tubing end opposite the first compression garment tubing end; and,
   a first connector portion located at the second compression garment tubing end;
   wherein the controller controls communication with a source of fluid flow via a controller tubing having a plurality of controller tubes in selective communication with the source of the fluid flow at a first controller tubing end and having a second controller tubing end opposite the first controller tubing end;
   wherein the controller tubing has a second connector portion located at the second controller tubing end;
   wherein the first connector portion and the second connector portion are selectively, reversibly connectable together to form the reversible connector through rotation of the second connector portion about an axis parallel to the fluid flow resulting in the reversible connector being in a first orientation or a second orientation;
   wherein the first connector portion and the second connector portion are rectangular, elliptical, or oblong shaped;
   wherein a plurality of fluid flow passageways extend within each of the first connector portion and the second connector portion to form a first fluid flow channel when the first connector portion is coupled to the second connector portion in the first orientation;
   wherein the plurality of fluid flow passageways extend within each of the first connector portion and the second connector portion to form a second fluid flow channel when the first connector portion is coupled to the second connector portion in the second orientation; and
   wherein a fluid flow between a first one of the plurality of controller tubes and a first one of the plurality of compression garment tubes is communicated in a first fluid flow direction via the first fluid flow channel when the first connector portion and the second connector portion are connected in the first orientation, and wherein the fluid flow through the first one of the plurality of compression garment tubes and the first one of the plurality of controller tubes is communicated in the first fluid flow direction via the second fluid flow channel when the first connector portion and the second connector portion are connected in the second orientation.

2. The compression garment of claim 1, wherein the controller tubing has a third connector portion at the first controller tubing end, and wherein the compression garment is connectable or disconnectable from the controller via at least one of the second connector portion and a third connector portion.

3. The compression garment of claim 2, wherein the controller comprises a controller side connection portion, and wherein the third connector is configured to connect to the controller side connection portion and provide fluid communication between the controller and the controller tubing, wherein the third connector portion and the controller side connector portion are selectively, reversibly connectable together and the second connector portion and first connector portion are selectively, reversibly connectable together to form the reversible connector.

4. The compression garment of claim 3, wherein a plurality of fluid flow passageways extend within each of the controller side connection portion and the third connector portion to form a third fluid flow channel when the third connector portion is coupled to the controller side connector portion in the first orientation;
   wherein the plurality of fluid flow passageways within the third connector portion and within the controller side connection portion to extemd form a fourth fluid flow channel when the third connector portion is coupled to the controller side connector portion in the second orientation; and
   wherein a fluid flow between a first one of the plurality of fluid flow passageways in the controller side connection portion and a first one of a plurality of controller tubing passageways is communicated in the first fluid flow direction via the third fluid flow channel when the third connector portion and controller side connection portion are connected in the first orientation, and wherein the fluid flow through the first one of the plurality of fluid flow passageways in the controller side connection portion and the first one of the plurality of controller tubes is communicated in the first fluid flow direction via the fourth fluid flow channel when the third connector portion and the controller side connector portion are connected in the second orientation.

5. The compression garment of claim 4 wherein the third connector portion is a male connector and comprises an outer concentric wall, an intermediate concentric wall and an inner concentric wall with each of the concentric walls having a corresponding fluid flow passageway;
   wherein the controller side connection portion is a female connector and comprises an outer concentric wall, an intermediate concentric wall and an inner concentric wall with each of the concentric walls having a corresponding fluid flow passageway; and
   wherein each of the concentric walls of the male connector is adapted to slidingly engage with a corresponding concentric wall of the female connector in the first orientation and in the second orientation, and adapted to allow fluid to flow from each of the fluid flow passageways of the male connector to a corresponding fluid flow passageway of the female connector in the first orientation, and adapted to allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

6. The compression garment of claim 5, wherein the outer concentric wall, intermediate concentric wall, and inner concentric wall of the male connector is made of a flexible material and a body of the male connector portion is made of a rigid material.

7. The compression garment of claim 1:
   wherein the first connector portion is a male connector and comprises an outer concentric wall, an intermediate concentric wall and an inner concentric wall with each of the concentric walls having a corresponding fluid flow passageway;
wherein the second connector portion is a female connector and comprises an outer concentric wall, an intermediate concentric wall and an inner concentric wall with each of the concentric walls having a corresponding fluid flow passageway; and
wherein each of the concentric walls of the male connector are adapted to slidingly engage with a corresponding concentric wall of the female connector in the first orientation and in the second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

8. The compression garment of claim 7, wherein the outer concentric wall, intermediate concentric wall, and inner concentric wall of the male connector is made of a flexible material and a body of the male connector portion is made of a rigid material.

9. The compression garment of claim 8, wherein the outer concentric wall, intermediate concentric wall, and inner concentric wall of the female connector are made of material that is more rigid that the outer concentric wall, intermediate concentric wall, and inner concentric wall of the male connector.

10. The compression garment of claim 9, wherein the male connector further comprises a sealing member that is a unitary structure and includes the outer concentric wall, intermediate concentric wall, and inner concentric wall of the male connector.

11. The compression garment of claim 10, wherein the male connector comprises a first engagement portion configured to be slidingly received within a female connector engagement portion.

12. The compression garment of claim 10, wherein the concentric walls of the male connector and the concentric walls of the female connector form an outer chamber, an intermediate chamber, and an inner chamber when the male connector is slidingly engaged with the female connector in the first orientation and the second orientation.

13. The compression garment of claim 12, wherein the fluid flow passageway for the outer chamber is formed in the outer concentric wall, and the fluid flow passageway for the intermediate chamber is formed in the intermediate concentric wall for both the male connector and the female connector.

14. The compression garment of claim 13, wherein the fluid flow passageways of the outer chamber substantially align, and the fluid flow passageways of the intermediate chamber substantially align in the first orientation, and the fluid flow passageways of the outer chamber and the fluid flow passageways of the intermediate chamber are offset in the second orientation.

15. The compression garment of claim 13, wherein:
the male connector further comprises a base with each of the concentric walls extending from the base on a first side and three inlets extending from the base on a second side, with the first side and second side being opposite of each other, and each of the three inlets in fluid connection with a corresponding fluid flow passageway of the male connector; and
the female connector further comprises a base with each of the concentric walls extending from the base on a first side and three inlets extending from the base on a second side, with the first side and second side being opposite of the other, and each of the three inlets in fluid connection with a corresponding fluid flow passageway of the female connector.

16. The compression garment of claim 15, wherein each of the three inlets of both the male connector and the female connector is adapted to receive a tube over an outer edge of each of the three inlets.

17. The compression garment of claim 12, wherein the male connector provides fluid to the female connector via the chambers.

18. A compression garment selectively engageable with and operable by a controller for inflation via a reversible connector, the compression garment comprising:
at least one inflatable bladder;
a compression garment tubing comprising at least one garment tube in fluid communication with the at least one inflatable bladder at a first compression garment tubing end and having a second compression garment tubing end opposite the first compression garment tubing end; and
a first connector portion located at the second compression garment tubing end;
wherein the controller controls communication with a source of fluid flow is configured to be connected to the compression garment via controller tubing having a plurality of controller tubes in selective communication with the source of the fluid flow at a first controller tubing end and having a second controller tubing end opposite the first controller tubing end;
wherein the controller comprises a second connector portion located at the second controller tubing end;
wherein the first connector portion and the second connector portion are selectively, reversibly connectable together to form the reversible connector through rotation of the second connector portion about an axis parallel to the fluid flow resulting in the reversible connector being in a first orientation or a second orientation;
wherein the first connector portion and the second connector portion are rectangular, elliptical, or oblong shaped;
wherein a plurality of fluid flow passageways extend within the second connector portion to form a first fluid flow channel when the first connector portion is coupled to the second connector portion in the first orientation;
wherein the plurality of fluid flow passageways extend within the second connector portion to form a second fluid flow channel when the first connector portion is coupled to the second connector portion in the second orientation; and
wherein a fluid flow between a first one of the plurality of controller tubes and the at least one compression garment tube is communicated in a first fluid flow direction via the first fluid flow channel when the first connector portion and the second connector portion are connected in the first orientation, and wherein the fluid flow through the at least one compression garment tube and the first one of the plurality of controller tubes is communicated in the first fluid flow direction via the second fluid flow channel when the first connector portion and the second connector portion are connected in the second orientation.

19. The compression garment of claim 18, wherein the controller controls communication with the source of fluid flow via a third connector at the first controller tubing end, and wherein the compression garment is connectable or disconnectable from the controller via at least one of the second connector portion and a third connector portion.

20. The compression garment of claim 19, wherein the controller comprises a controller side connection portion, and wherein the third connector is configured to connect to the controller side connection portion and provide fluid communication between the controller and the controller tubing, wherein the third connector portion and the controller side connector portion are selectively, reversibly connectable together and the second connector portion and first connector portion are selectively, reversibly connectable together to form the reversible connector.

21. The compression garment of claim 20, wherein a plurality of fluid flow passageways extend within each of the controller side connection portion, and the third connector portion to form a third fluid flow channel when the third connector portion is coupled to the controller side connector portion in the first orientation;
wherein the plurality of fluid flow passageways within the third connector portion and within the controller side connection portion form a fourth fluid flow channel when the third connector portion is coupled to the controller side connector portion in the second orientation; and
wherein a fluid flow between a first one of the plurality of fluid flow passageways in the controller side connection portion and a first one of a plurality of controller tubing passageways is communicated in the first fluid flow direction via the third fluid flow channel when the third connector portion and controller side connection portion are connected in the first orientation, and wherein the fluid flow through the first one of the plurality of fluid flow passageways in the controller side connection portion and the first one of the plurality of controller tubes is communicated in the first fluid flow direction via the fourth fluid flow channel when the third connector portion and the controller side connector portion are connected in the second orientation.

22. The compression garment of claim 21 wherein the third connector portion is a male connector and comprises an outer concentric wall, an intermediate concentric wall and an inner concentric wall with each of the concentric walls having a corresponding fluid flow passageway;
wherein the controller side connection portion is a female connector and comprises an outer concentric wall, an intermediate concentric wall and an inner concentric wall with each of the concentric walls having a corresponding fluid flow passageway; and
wherein each of the concentric walls of the male connector is adapted to slidingly engage with a corresponding concentric wall of the female connector in the first orientation and in the second orientation, and adapted to allow fluid to flow from each of the fluid flow passageways of the male connector to a corresponding fluid flow passageway of the female connector in the first orientation, and adapted to allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

23. The compression garment of claim 22, wherein the outer concentric wall, intermediate concentric wall, and inner concentric wall of the male connector is made of a flexible material and a body of the male connector portion is made of a rigid material.

24. The compression garment of claim 18:
wherein the first connector portion is a male connector and comprises an outer concentric wall, an intermediate concentric wall and an inner concentric wall with each of the concentric walls having a corresponding fluid flow passageway;
wherein the second connector portion is a female connector and comprises an outer concentric wall, an intermediate concentric wall and an inner concentric wall with each of the concentric walls having a corresponding fluid flow passageway; and
wherein each of the concentric walls of the male connector are adapted to slidingly engage with a corresponding concentric wall of the female connector in the first orientation and in the second orientation, and allow fluid to flow from each of the fluid flow passageways of the male connector to a corresponding fluid flow passageway of the female connector in the first orientation, and allow fluid to flow from each of the fluid flow passageways of the male connector to a corresponding fluid flow passageway of the female connector in the second orientation with the fluid flows in two of the fluid flow passageways of the female connector being different in the second orientation compared to the first orientation.

25. The compression garment of claim 24, wherein the outer concentric wall, intermediate concentric wall, and inner concentric wall of the male connector is made of a flexible material and a body of the male connector portion is made of a rigid material.

26. The compression garment of claim 25, wherein the outer concentric wall, intermediate concentric wall, and inner concentric wall of the female connector are made of material that is more rigid that the outer concentric wall, intermediate concentric wall, and inner concentric wall of the male connector.

27. The compression garment of claim 26, wherein the male connector further comprises a sealing member that is a unitary structure and includes the outer concentric wall, intermediate concentric wall, and inner concentric wall of the male connector.

28. The compression garment of claim 27, wherein the male connector comprises a first engagement portion configured to be slidingly received within a female connector engagement portion.

29. The compression garment of claim 27, wherein the concentric walls of the male connector and the concentric walls of the female connector form an outer chamber, an intermediate chamber, and an inner chamber when the male connector is slidingly engaged with the female connector in the first orientation and the second orientation.

30. The compression garment of claim 29, wherein the fluid flow passageway for the outer chamber is formed in the outer concentric wall, and the fluid flow passageway for the intermediate chamber is formed in the intermediate concentric wall for both the male connector and the female connector.

31. The compression garment of claim 30, wherein the fluid flow passageways of the outer chamber substantially align, and the fluid flow passageways of the intermediate chamber substantially align in the first orientation, and the fluid flow passageways of the outer chamber and the fluid flow passageways of the intermediate chamber are offset in the second orientation.

32. The compression garment of claim 31, wherein:
the male connector further comprises a base with each of the concentric walls extending from the base on a first side and three inlets extending from the base on a second side, with the first side and second side being opposite of each other, and each of the three inlets in fluid connection with a corresponding fluid flow passageway of the male connector; and
the female connector further comprises a base with each of the concentric walls extending from the base on a first side and three inlets extending from the base on a second side, with the first side and second side being opposite of the other, and each of the three inlets in fluid connection with a corresponding fluid flow passageway of the female connector.

33. The compression garment of claim 32, wherein each of the three inlets of both the male connector and the female connector is adapted to receive a tube over an outer edge of each of the three inlets.

34. The compression garment of claim 32, wherein the male connector provides fluid to the female connector via the chambers.

\* \* \* \* \*